US012355669B2

(12) United States Patent
Singh et al.

(10) Patent No.: US 12,355,669 B2
(45) Date of Patent: *Jul. 8, 2025

(54) EFFICIENT FLOW MANAGEMENT UTILIZING UNIFIED LOGGING

(71) Applicant: Oracle International Corporation, Redwood Shores, CA (US)

(72) Inventors: Brijesh Singh, Mercer Island, WA (US); Leonard Thomas Tracy, Bothell, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/657,055

(22) Filed: May 7, 2024

(65) Prior Publication Data

US 2024/0291762 A1    Aug. 29, 2024

Related U.S. Application Data

(63) Continuation of application No. 17/389,219, filed on Jul. 29, 2021, now Pat. No. 12,015,557.

(51) Int. Cl.
*H04L 47/125*    (2022.01)
*H04L 45/00*    (2022.01)
(Continued)

(52) U.S. Cl.
CPC ............ *H04L 47/125* (2013.01); *H04L 45/38* (2013.01); *H04L 45/74* (2013.01); *H04L 47/2441* (2013.01); *H04L 47/33* (2013.01)

(58) Field of Classification Search
CPC ....... H04L 47/125; H04L 45/38; H04L 45/74; H04L 47/2441; H04L 47/33
See application file for complete search history.

(56) References Cited

U.S. PATENT DOCUMENTS 8,930,690 B2    1/2015 Zuo et al.
9,674,090 B2    6/2017 Caulfield et al.
(Continued)

FOREIGN PATENT DOCUMENTS

EP    3621251 A1    3/2020
WO    2020068725 A1    4/2020

OTHER PUBLICATIONS

U.S. Appl. No. 17/394,300 , "Final Office Action", Oct. 1, 2024.
(Continued)

*Primary Examiner* — Kibrom T Hailu
(74) *Attorney, Agent, or Firm* — Kilpatrick Townsend & Stoctkon LLP

(57) ABSTRACT

Techniques are disclosed for a smart network interface card (smartNIC) performing a unified logging process. In one example, an accelerator transmits a packet to a programming data plane of the smart network interface card. The programming data plane determines whether the packet is to be forwarded. In accordance with a determination that the packet is not be forwarded, the programming data plane modifies the packet to include an instruction that instructs the accelerator to log the packet and to not forward the packet. The programming data plane transmits the modified packet to the accelerator. The accelerator logs data associated with the modified packet to a unified log based at least in part on the instruction.

20 Claims, 17 Drawing Sheets

(51) Int. Cl.
*H04L 45/74* (2022.01)
*H04L 47/2441* (2022.01)
*H04L 47/33* (2022.01)

(56) References Cited

U.S. PATENT DOCUMENTS

| | | | |
|---|---|---|---|
| 10,841,243 | B2 | 11/2020 | Levi et al. |
| 11,157,422 | B2 | 10/2021 | Bernat et al. |
| 11,388,225 | B1 | 7/2022 | Duraj et al. |
| 11,456,951 | B1* | 9/2022 | Wu .................. H04L 45/38 |
| 11,496,599 | B1 | 11/2022 | Singh |
| 11,593,136 | B2 | 2/2023 | Galles |
| 11,960,919 | B2 | 4/2024 | Niu et al. |
| 12,010,195 | B2 | 6/2024 | Singh |
| 12,015,557 | B2* | 6/2024 | Singh .................. H04L 47/2441 |
| 12,015,562 | B2 | 6/2024 | Singh |
| 2016/0232019 | A1 | 8/2016 | Shah et al. |
| 2016/0330112 | A1 | 11/2016 | Raindel et al. |
| 2016/0380896 | A1 | 12/2016 | Caulfield et al. |
| 2017/0187640 | A1 | 6/2017 | Vasudevan et al. |
| 2017/0289067 | A1 | 10/2017 | Lu et al. |
| 2018/0285288 | A1 | 10/2018 | Bernat et al. |
| 2019/0042741 | A1 | 2/2019 | Abodunrin et al. |
| 2019/0044866 | A1 | 2/2019 | Chilikin et al. |
| 2019/0044879 | A1 | 2/2019 | Richardson et al. |
| 2019/0109793 | A1 | 4/2019 | Dalal |
| 2019/0394066 | A1 | 12/2019 | Lin et al. |
| 2020/0021532 | A1 | 1/2020 | Borikar et al. |
| 2020/0174954 | A1 | 6/2020 | Pope |
| 2020/0201624 | A1 | 6/2020 | Halder et al. |
| 2020/0267082 | A1 | 8/2020 | Dong |
| 2020/0278892 | A1 | 9/2020 | Nainar et al. |
| 2020/0314011 | A1 | 10/2020 | Deval et al. |
| 2021/0019270 | A1 | 1/2021 | Li et al. |
| 2021/0112132 | A1 | 4/2021 | Paliwal et al. |
| 2021/0117360 | A1 | 4/2021 | Kutch et al. |
| 2022/0100546 | A1 | 3/2022 | Cherian et al. |
| 2022/0164451 | A1 | 5/2022 | Bagwell |
| 2022/0303137 | A1 | 9/2022 | Brogle et al. |
| 2022/0329520 | A1 | 10/2022 | Degrace et al. |
| 2022/0329528 | A1 | 10/2022 | Degrace et al. |
| 2022/0353197 | A1 | 11/2022 | Singh |
| 2022/0353240 | A1 | 11/2022 | McDowall et al. |
| 2022/0353339 | A1 | 11/2022 | Singh |
| 2023/0029796 | A1 | 2/2023 | Li |
| 2023/0041806 | A1 | 2/2023 | Singh |
| 2023/0300075 | A1 | 9/2023 | Peri |

OTHER PUBLICATIONS

"An Introduction to SmartNICs", Available Online at: https://www.nextplatform.com/2019/03/04/an-introduction-to-smartnics/, Mar. 4, 2019, 3 pages.
"Best Practices for Client IP Address Preservation", Available Online at: https://docs.aws.amazon.com/global-accelerator/latest/dg/best-practices-aga.html, Accessed from Internet on Nov. 11, 2020, 2 pages.
"Flow Logs in AWS Global Accelerator", Available Online at: https://docs.aws.amazon.com/global-accelerator/latest/dg/monitoring-global-accelerator.flow-logs.html, Accessed from Internet on Nov. 11, 2020, 7 pages.
"What is AWS Global Accelerator?", Available Online at: https://docs.aws.amazon.com/global-accelerator/latest/dg/what-is-global-accelerator.html, Accessed from Internet on Nov. 11, 2020, 1 page.
"What Makes a NIC a SmartNIC, and Why is it Needed?", Available Online at: https://www.netronome.com/blog/what-makes-a-nic-a-smartnic-and-why-is-it-needed/, Sep. 13, 2016, 8 pages.
U.S. Appl. No. 17/244,723 , Non-Final Office Action, Mailed On Sep. 15, 2023, 11 pages.
U.S. Appl. No. 17/244,727 , Notice of Allowance, Mailed On Jul. 5, 2022, 10 pages.
U.S. Appl. No. 17/389,219 , Notice of Allowance, Mailed On Feb. 15, 2024, 8 pages.
U.S. Appl. No. 17/394,300 , Non-Final Office Action, Mailed On Feb. 28, 2023, 14 pages.
U.S. Appl. No. 17/394,300 , Non-Final Office Action, Mailed On Mar. 20, 2024, 16 pages.
U.S. Appl. No. 17/959,941 , Non-Final Office Action, Mailed On Jun. 1, 2023, 12 pages.
Chawla , "Is it Time for NICs to get Smarter?", Available Online at: https://www.delltechnologies.com/en-us/blog/smart-nics-smarter/, Sep. 18, 2019, 3 pages.
Deierling , "Achieving a Cloud Scale Architecture with DPU based Smart NICs", Available Online at: https://blog.mellanox.com/2018/09/why-you-need-dpu-based-smart-nic-use-cases/, Sep. 11, 2018, 5 pages.
Firestone et al., "Azure Accelerated Networking: SmartNICs in the Public Cloud", 15th USENIX Symposium on Networked Systems Design and Implementation, Apr. 2018, 14 pages.
Gwennap , "Single-Chip Control/Data-Plane Processors Trends, Features, Deployment", Available Online at: http://linleygroup.com/cms_builder/uploads/WP_SCDP.pdf, Jun. 2008, 10 pages.
Kumar , "Taming Latency in Data Center Applications", Available Online at: https://smartech.gatech.edu/bitstream/handle/1853/61693/KUMAR-DISSERTATION-2019.pdf, Aug. 2019, 156 pages.
Le et al., "UNO: Uniflying Host and Smart NIC Offload for Flexible Packet Processing", Proceedings of the 2017 Symposium on Cloud Computing, Available Online at: https://dl.acm.org/doi/pdf/10.1145/3127479.3132252, Sep. 2017, pp. 506-519.
Schweitzer , "SmartNIC Architectures: A Shift to Accelerators and Why FPGAs are Poised to Dominate", Available Online at: https://www.electronicdesign.com/markets/automation/article/21136402/xilinx-smartnic-architectures-a-shift-to-accelerators-and-why-fpgas-are-poised-to-dominate, Jul. 10, 2020, 19 pages.
U.S. Appl. No. 17/952,519, "Non-Final Office Action", Apr. 3, 2025, 12 pages.
U.S. Appl. No. 18/656,436, "Non-Final Office Action", Mar. 25, 2025, 17 pages.
U.S. Appl. No. 17/394,300, "Non-Final Office Action", Apr. 10, 2025, 14 pages.

* cited by examiner

| | Date | Time | Type | Packet Type | Action | In/Outbound | Protocol | Source Address | Dest Address | Other |
|---|---|---|---|---|---|---|---|---|---|---|
| 602 | 5/24/2021 | 6:59:00 AM | info | Data | Forward | Inbound | IP | 10.0.1.146 | 10.0.1.201 | Web server |
| 604 | 5/24/2021 | 6:59:20 AM | info | Data | Forward | Outbound | IP | 10.0.1.201 | 10.0.1.146 | Switch #1 |
| 606 | 5/24/2021 | 6:59:10 AM | alert | Modified Data | Drop | Inbound | IP | 10.0.1.147 | 10.0.1.201 | Security List |
| 608 | 5/24/2021 | 6:59:30 AM | new | Modified Data | Forward | Inbound | IP | 10.0.1.148 | 10.0.1.201 | QoS class A |
| 610 | 5/24/2021 | 6:59:35 AM | alert | Modified Data | Drop | Inbound | IP | 10.0.1.148 | 10.0.1.201 | Flow policy |
| 612 | 5/24/2021 | 6:59:50 AM | alert | Modified Data | Drop | Outbound | IP | 10.0.1.202 | 10.0.1.147 | Security List |

FIG. 6

EFFICIENT FLOW MANAGEMENT UTILIZING UNIFIED LOGGING

CROSS-REFERENCE TO RELATED APPLICATIONS

This application is a continuation of U.S. application Ser. No. 17/389,219, filed Jul. 29, 2021, which is incorporated by reference.

This application is related to U.S. Non-Provisional application Ser. No. 17/244,723, entitled, "Port Addressing Via Packet Header Modification," filed Apr. 29, 2021. This application is also related to U.S. Non-Provisional application Ser. No. 17/244,727, entitled, "Efficient Flow Management Utilizing Control Packets," filed Apr. 29, 2021. This application is related to U.S. Non-Provisional application Ser. No. 17/394,300, entitled "Location-Independent Programming Data Plane For Packet Processing," filed Aug. 4, 2021. The full disclosures of which are each incorporated by reference herein in their entirety for all purposes.

BACKGROUND

Cloud services computing systems are often tasked with, among other computing operations, processing packets. For example, packet processing operations may include routing and/or forwarding packets, implementing security list functionality to only forward certain packets, determining rules for subsequent processing of packets for a particular flow, etc. As the amount of network traffic has grown substantially in recent years, modern cloud computing systems often need to process a large number of packets per second. To help process packets efficiently, techniques and/or devices have been utilized to offload some of the processing burden from a server processor (e.g., a central processor unit (CPU)).

For example, some network devices (e.g., smart network interface cards (smartNICs)) may include specialized hardware that is dedicated to performing packet processing, thus helping to relieve the server CPU of at least some packet processing computing tasks. In one example, a smartNIC may include a data plane that includes hardware for accelerating the routing and/or forwarding of packets for known traffic flows. Some smartNICs may also include a programming data plane. While the programming data plane may also be enabled to process packets (e.g., similar to the accelerator), the programming data plane may additionally be configured to offload more complex processing tasks from the accelerator, so that the accelerator may be even more optimized to perform packet forwarding. For example, some of these more complex tasks may include programming the data plane with new instructions, determining instructions for handling new flows, analyzing packets to generate flow statistics, etc. While separating the data plane and the programming data plane of a smartNIC has enabled packet processing efficiency gains, challenges remain with respect to efficiently coordinating tasks between the different components (e.g., planes) of a smartNIC. For example, it may be challenging to coordinate packet logging between the data plane and the programming data plane.

BRIEF SUMMARY

Techniques are provided for enabling a network virtualization device (NVD) to perform a unified logging process that logs data that is associated with network traffic and processed by one or more planes of the NVD to a unified log.

In an embodiment, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method. The computer—implemented method also includes receiving, by an accelerator of a smart network interface card (smartNIC), a packet that is intended to be forwarded by the smart network interface card to another device. The method also includes determining, by the accelerator, that the packet is a candidate for rejection based at least in part on the packet not being associated with an authorized flow, the accelerator being configured to log traffic to a unified log for authorized flows that are forwarded by the accelerator. The method also includes transmitting, by the accelerator, the packet to a programming data plane of the smart network interface card. The method also includes determining, by the programming data plane, whether the packet should be forwarded. The method also includes in accordance with a determination that the packet should not be forwarded: modifying, by the programming data plane, the packet to include an instruction that instructs the accelerator to log the packet and to not forward the packet; transmitting, by the programming data plane, the modified packet to the accelerator; and logging, by the accelerator, data associated with the modified packet to the unified log based at least in part on the instruction. Other embodiments of this aspect include corresponding computer systems, apparatus, and computer programs recorded on one or more computer storage devices, each configured to perform the actions of the methods.

One general aspect includes a smart network interface card. The smart network interface card also includes a programming data plane may include a first set of one or more processors of a plurality of processors. The card also includes an accelerator may include a second set of one or more processors of the plurality of processors and a cache. The card also includes a memory may include computer-executable instructions that, when executed by one or more of the plurality of processors, cause the smart network interface card to: receive, by the accelerator, a packet that is intended to be forwarded by the smart network interface card to another device; determine, by the accelerator, that the packet is a candidate for rejection, the accelerator being configured to log traffic to a unified log for authorized flows that are forwarded by the accelerator; transmit, by the accelerator, the packet to the programming data plane; modify, by the programming data plane, the packet to include an instruction that instructs the accelerator to log the packet; transmit, by the programming data plane, the modified packet to the accelerator; and log, by the accelerator, data associated with the modified packet to the unified log based at least in part on the instruction. Other embodiments of this aspect include corresponding computer systems, apparatus, and computer programs recorded on one or more computer storage devices, each configured to perform the actions of the methods.

One general aspect includes one or more non-transitory computer-readable storage media may include computer-executable instructions that. The one or more non-transitory computer-readable storage media also includes receive, by an accelerator of the smart network interface card, a packet that is intended to be forwarded by the smart network interface card to another device. The media also includes determine, by the accelerator, that the packet is a candidate for rejection, the accelerator being configured to log traffic to a unified log for authorized flows that are forwarded by the accelerator. The media also includes transmit, by the accelerator, the packet to a programming data plane of the smart network interface card. The media also includes modify, by the programming data plane, the packet to include an instruction that instructs the accelerator to log the packet. The media also includes transmit, by the programming data plane, the modified packet to the accelerator. The media also includes log, by the accelerator, data associated with the modified packet to the unified log based at least in part on the instruction. Other embodiments of this aspect include corresponding computer systems, apparatus, and computer programs recorded on one or more computer storage devices, each configured to perform the actions of the methods.

BRIEF DESCRIPTION OF DRAWINGS

FIG. 6 is another simplified block diagram illustrating an example technique for coordinating unified logging by an NVD, according to some embodiments.

DETAILED DESCRIPTION

Figure 1:
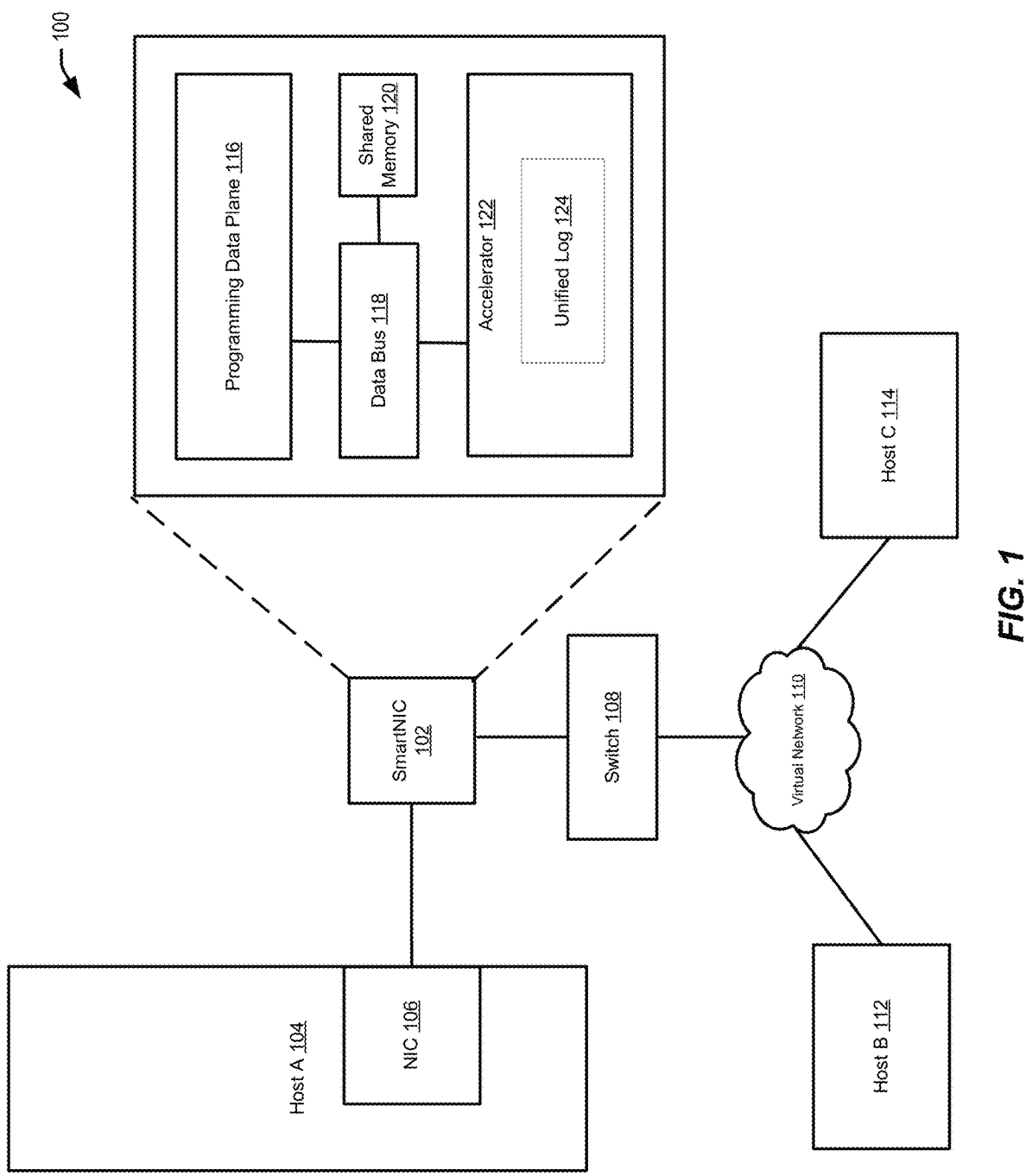
FIG. 1 is a simplified block diagram illustrating an example environment for enabling a network virtualization device (NVD) to efficiently coordinate, among a plurality of planes of the NVD, the logging of traffic data to a unified log, according to some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure provide techniques for enabling a network virtualization device (NVD) to efficiently coordinate, between at least a first plane and a second plane of the NVD, a unified logging of traffic data. Consider an example in which the NVD corresponds to a smartNIC device. The smartNIC device may include a first plane (e.g., which may be referred to herein a "programming data plane" or a "programming plane") and a second plane (e.g., which may be referred to herein as an "accelerator" or a "data plane"). The accelerator may include software and/or hardware that is collectively enabled (e.g., optimized) to perform tasks associated with packet routing and/or packet forwarding at high processing rates (e.g., 50, 100, or 200 Gigabits (Gb)/s). The programming data plane also may include software and/or hardware (e.g., including one or more processors) that is collectively enabled to perform tasks associated with packet routing and/or packet forwarding (e.g., tasks similar to those performed by the data plane). Each processor of the programming data plane may also be enabled to control the accelerator by programming the accelerator with instructions associated with processing packets that are subsequently received by the accelerator.

In this example, the accelerator of the smartNIC may receive a packet (e.g., a data packet). For example, the data packet may have been transmitted from a first host device (e.g., a user device) to the smartNIC, and intended for forwarding by the smartNIC to a second host device (e.g., a web server). The accelerator may maintain a unified log, and may typically log packet data (e.g., statistical information) to the unified log for authorized flows that are forwarded by the smartNIC to the respectively intended hosts. In this example, the accelerator determines that the packet is a candidate for rejection (e.g., being dropped, instead of forwarding the packet to the second host device). For example, the accelerator may determine that the packet is not associated with an already-authorized flow. Accordingly, the accelerator may transmit the packet to the programming data plane to request further instructions for how to process the packet. The programming data plane then may analyze the packet and determine that the packet should be dropped (e.g., based on a security policy list). Instead of the programming data plane itself directly logging the packet (e.g., to a separate log), the programming data plane may modify the packet to include an instruction to log the packet and to not forward the packet. The programming data plane transmits the modified packet to the accelerator, whereby the accelerator obtains the instruction, logs data associated with the modified packet to the unified log, and then drops the packet. In at least this way, and, as described further herein, techniques enable a smartNIC to efficiently coordinate a unified logging process between a plurality of planes of the smartNIC. For example, by utilizing modified packets to communicate information (e.g., logging instructions) between planes, techniques enable maintaining a unified (e.g., single) log that includes information associated with both packets that are processed by the accelerator (e.g., associated with an already-authorized flow) and also packets that are processed by the programming data plane.

In an illustrative example, consider a scenario in which a cloud services provider provides a cloud computing service (e.g., infrastructure as a service (IaaS)) that enables customers to, among other things, transmit and/or receive data over a network. The cloud computing service may include one or more host machines, memory resources, and network resources that form a physical network. In this example, a virtual network may be created on top of the physical network by utilizing one or more software virtualization technologies (e.g., including one or more network virtualization devices (NVDs), such as a smartNIC, a top-of-rack (TOR) switch, etc.) to create layers of network abstraction that can be run on top of the physical network. The cloud computing service may be responsible for processing a large amount of network traffic, some of which may be transmitted over the virtual network and may require additional processing steps to handle the traffic. For example, customer traffic may be encapsulated and/or decapsulated to facilitate routing in the virtual network. Accordingly, to facilitate more efficient processing (e.g., streamlining) of the large amount of network traffic, the cloud services provider may determine to offload some tasks of the packet processing pipeline from one or more devices to another one or more other devices. In this example, the cloud services provider may determine that the host machine (e.g., CPU) may process more complex functions such as processing Hypertext Transfer Protocol (HTTP) requests for serving web pages, etc. In the meantime, other tasks may be performed by a smartNIC type of NVD. The smartNIC may correspond to any suitable device (e.g., including hardware and/or software) that may be used to accelerate functionality and offload processing from the host machine (or storage) CPU. Some non-limiting examples of such tasks performed by the smartNIC may include handling encapsulation/decapsulation of packets, handling encryption/decryption of packets, performing security list functions (e.g., maintaining a firewall to block unauthorized traffic), performing packet routing/forwarding functions, etc. It should be understood that any suitable tasks may be performed by the host machine and/or otherwise offloaded to the smartNIC NVD.

In this example, the cloud services provider may determine to further streamline the processing of packet data within the smartNIC itself. As described in an earlier example, the smartNIC may include a programming data plane and a data plane (e.g., an accelerator). As described further herein, one or more processors of the data plane may be tasked with efficiently processing (e.g., routing and/or forwarding) packets. In some embodiments, for example, in the case of processing packets within a virtual network environment, the data plane may also be responsible for encapsulation and decapsulation of packets to facilitate forwarding or routing in the virtual network. The data plane may maintain a cache that stores, among other things, state information associated with one or more flows (e.g., timeout data, statistical data about the flow, routing information, etc.). The data plane may utilize the cache to determine how to process incoming packets. For example, a packet that is received by the data plane may be compared against cache entries of the cache to determine if the packet is associated with an authorized flow and/or otherwise authorized to be forwarded by the smartNIC. If so, the data plane may forward the packet to the intended destination. If not, the data plane may forward the packet to the programming data plane for further processing and/or requesting further instructions.

In some embodiments, the accelerator may log data associated with the processing (e.g., forwarding) of a particular packet to a log (e.g., unified log). In some embodiments, and, as described herein, the unified log may incorporate data associated with packet traffic that is processed by a plurality of planes of the smartNIC. For example, the accelerator may be programmed to log packet data associated with flows for which the accelerator is already programmed (e.g., by the programming data plane) to be able to process. In at least this way, the unified log may enable the smartNIC to keep track of statistical information related to flows that are processed primarily by the accelerator (e.g., without involving the programming data plane). It should be understood that the accelerator may determine whether to log data and/or what data should be logged according to any suitable technique. Correspondingly, as described further herein, the accelerator may further determine when to forward packets to the programming data plane according to any suitable method (e.g., according to administratively programmed instructions).

As described above, in cases where the accelerator may request further information to be able to process the packet (e.g., prior to determining whether and/or how to log the packet), the accelerator may transmit the packet (e.g., via a highly optimized data bus for transmitting packets, such as a network-on-a-chip (NOC)) to the programming data plane. Some non-limiting cases where further information may be requested include, for example, when an incoming packet is not associated with an existing accelerator cache entry (e.g., and/or an existing authorized flow) for which instructions are programmed in memory of the accelerator. In another example, even in a case where an incoming packet may be associated with an existing accelerator cache entry, the packet may (or may not) be in conformance with certain policy rules that are programmed to the accelerator. For example, one policy may limit the rate which a packets associated with a particular flow (e.g., limiting the bandwidth consumed by a flow) may be transmitted by a sending device to be processed by the smartNIC. If a new packet is received that exceeds the allowed rate for the associated flow, the accelerator may forward the packet to the programming data plane to request further instructions for how to process the packet.

Meanwhile, the programming data plane may be responsible for, among other things, determining (e.g., programming) instructions for the data plane to process future packets associated with a flow. For example, the programming data plane may determine if a new packet (e.g., part of a new flow) should be allowed, and, if so, may program the data plane to forward subsequent packets associated with this flow to an intended destination host. For example, the programming data plane may instruct the data plane (e.g., accelerator) to add this flow to the data plane cache (e.g., an accelerator cache). Subsequent packets associated with this newly allowed flow may thereby not need to be processed by the programming data plane, and, instead can be more efficiently processed by the accelerator that is optimized for efficient encapsulation/decapsulation and/or routing/forwarding of packets.

In some embodiments, the programming data plane may determine that a particular packet should not be forwarded. For example, the programming data plane may determine that packets from a particular sending Internet Protocol (IP) address, identified in the IP header of the packet, should not be forwarded (e.g., based on the particular IP address being absent from a security list). In another example, the programming data plane may determine that the particular packet, although associated with an authorized flow, should be dropped because the associated flow is not in conformance with a particular policy (e.g., a maximum flow rate, a maximum payload size, etc.). It should be understood that any suitable method may be used by the programming data plane to determine how to process packets. In this way, while the programming data plane may itself be enabled to process packets (e.g., with similar features as the data plane), the programming data plane may offload tasks from the accelerator so that the accelerator may be optimized for more efficient performance of packet processing tasks (e.g., forwarding and/or routing of packets for known flows).

In some embodiments, the programming data plane may determine to log data to a similar (e.g., the same) unified log that the accelerator may use for packet logging, as described above. In some embodiments, the programming data plane may log any suitable data to the unified log. This may include, for example, data associated with instructions to drop (or forward) a particular packet, packet header information, payload data, statistical information related to an associated flow, etc. In some embodiments, to facilitate the unified logging process, and, as described further herein, the programming data plane may modify a packet that was received (e.g., via the data bus) to include instructions associated with logging the packet to the unified log. The programming data plane may then transmit to the accelerator (e.g., via the data bus and/or via an Application Programming Interface (API) call) the modified packet. Upon receiving the modified packet, the accelerator may obtain the instructions from the modified packet and then log data to the unified log according to the instructions. In this way, the programming data plane may be enabled to effectuate logging to the same unified log that the accelerator also use for logging.

Embodiments of the present disclosure provide several technical advantages over conventional techniques. For example, techniques described herein improve the efficiency and/or reliability of existing network virtualization devices (e.g., NVD's such as smartNICs). In some cases, as described herein, an NVD may include more than one plane (e.g., a data plane, a programming data plane, etc.) that may be, respectively, involved in processing packets. Accordingly, because both the programming data plane and the data plane may be involved in processing packets, logging may be desired for packets processed by both planes. In some cases, it may be desirable to enable logging to a unified log, instead of having each plane log data to a separate log. For example, the NVD may be able to more efficiently analyze packet statistics via the unified log. In some cases, maintaining separate logs may necessitate a more complex synchronization process (e.g., coordinating between separate modules operating in each plane), which may reduce efficiency and/or reduce reliability (e.g., due in part to increased complexity and maintenance costs).

As described herein, techniques described herein improve efficiency and/or reliability of an NVD at least in part by facilitating a unified logging process (e.g., to a single unified log). For example, a single module operating in the data plane (i.e., an accelerator module) may be utilized to log both packets processed in the data plane and packets processed by the programming data plane. In particular, in the case where packets are forwarded by the data plane to the programming data plane for further processing, the programming data plane may indicate to the data plane that a packet should be logged, whereby the programming data plane modifies the packet (e.g., modifying metadata of the packet), and then sends the modified packet back to the accelerator. In an example embodiment, the modified packet may contain an instruction that tells the accelerator to log the packet, but not to forward the packet (i.e., the accelerator should drop the packet). This may indicate that the programming data plane is rejecting the packet (e.g., it should be dropped and not forwarded by the data plane), but that the packet should still be logged (e.g., whereby the dropped packet may not have otherwise been logged by the accelerator if it had not received the instruction to log the packet from the programming data plane). In at least this way, the accelerator may not only handle logging for packets processed by the accelerator, but also handle logging for packets processed by the programming data plane. Thus, the NVD may enable a more efficient and reliable (e.g., less complex) logging process (e.g., to a single log) that utilizes an existing communication mechanism (e.g., transmitting logging instructions via an existing highly optimized data bus that used to transmit packets between the planes). This improved logging process may further enable the NVD to more efficiently perform other functions, for example, related to compiling and/or reporting statistics data (and/or other data) related to packet processing by one or more planes of the NVD.

For clarity of illustration, embodiments described herein may typically refer to an accelerator (e.g., a data plane) of a smartNIC device communicating with a programming data plane of the smartNIC (and/or vice versa). However, embodiments should not be construed to be so limited. For example, techniques described herein may enable more efficient (e.g., unified) logging among any suitable number and/or type(s) of planes of a smartNIC. Also, although embodiments described herein may typically refer to communication being performed via a highly optimized data bus (e.g., a NOC), any suitable communication channel may be used (e.g., an API) and/or combination thereof. Also, although the NVD type of device described herein primarily refers to a smartNIC device, any suitable NVD that enables transmission of information (e.g., instructions) between a plurality of planes of the NVD may be utilized to perform techniques described herein. Furthermore, although embodiments herein primarily described logging instructions being transmitted via an instruction header that is added (e.g., prepended/appended) to a data packet, embodiments, should not be construed to be so limited. For example, as described further herein, a control packet may be used to transmit instructions to log a separate data packet, whereby the control packet may include information suitable for identifying the data packet.

FIG. 1 is a simplified block diagram illustrating an example environment for enabling a network virtualization device (NVD) to efficiently coordinate, among a plurality of planes of the NVD, the logging of traffic data to a log (e.g., a unified log), according to some embodiments. In the diagram 100 of FIG. 1, a host machine A 104, a smart network interface card (smartNIC) 102, a switch 108, a virtual network 110, a host machine B 112, and a host machine C 114 are depicted. The host machine (or "host") A 104 includes a network interface card (NIC) 106, and is connected to the smartNIC 102, for example, via an Ethernet cable. The smartNIC 102 is connected to the switch 108 (e.g., via an Ethernet cable), and the switch 108 is further connected to host B 112 and host C 114 (e.g., via the virtual network 110). Although embodiments described herein may typically refer to computing devices being connected via Ethernet cables, it should be understood that any suitable medium (e.g., physical medium, wireless medium) may be used to connect any one or more computing devices.

Turning to the elements of FIG. 1 in further detail, the host A 104 may be any suitable computing device that includes the NIC 106. For example, host A 104 (e.g., as a representative example of a host machine) may be a physical computer, similar to as described further herein (e.g., with reference to FIG. 17). The physical computer may include physical resources (e.g., memory, a CPU, the NIC 106, etc.). In some embodiments, as described further herein, the host A 104 may execute a hypervisor, whereby one or more compute instances may be created, executed, and managed on the host A 104 by the hypervisor. In some embodiments, host A 104 may be associated with a cloud services provider (CSP), for example, as part of a CSP infrastructure (CSPI), as described further herein. For example, the host A 104 may be a computing resource in a data center of the CSPI. The host A 104 may communicate with other resources within the CSPI (e.g., the smartNIC 102, switch 108, and/or the virtual network 110) via the NIC 106. The NIC 106 may be any suitable NIC that connects the host A 104 to the computer network (e.g., a physical network and/or a virtual network that is overlaid on the physical network). In the illustration of FIG. 1, the host B 112 and host C 114 may be similar to host A 104, for example, both being connected to the virtual network 110 and in communication with one or more other devices via the virtual network 110. It should be understood that host B 112 and host C 114 are representative computing devices, and that the CSPI may contain any suitable number of physical computing devices and/or compute instances (e.g., within a single physical computing device). Any one or more of these devices may be in communication with other devices over the physical network and/or the virtual network 110 that is overlaid on the physical network, as described further herein.

Turning to the smartNIC 102 in further detail, the smartNIC 102 may correspond to any suitable network virtualization device (NVD) that offloads processing tasks (e.g., network processing tasks) from a computing device (e.g., host A 104, as depicted in FIG. 1). As described further herein, an NVD may correspond to a device that implements a network virtualization technology, including, for example, a smartNIC, a top-of-rack (TOR) switch, a smart TOR switch, etc. As depicted in FIG. 1, in some embodiments, the smartNIC 102 may include, among other elements, a programming data plane 116, a data bus 118, a shared memory 120, and an accelerator 122. In some embodiments, as illustrated further with respect to FIG. 2, the smartNIC 102 may also include one or more packet queues that interface between the accelerator 122 and the programming data plane 116. As depicted in FIG. 1, the smartNIC 102 may be connected to the virtual network 110 via the switch 108.

In some embodiments, the accelerator 122 may include (e.g., stored within memory) one or more logs. In some embodiments, a log may correspond to a data structure (e.g., a data container such as a file) that records data associated with packet traffic processed by the smartNIC 102. In some embodiments, the one or more logs may include a unified log (e.g., unified log 124). In some embodiments, a unified log may correspond to a log that records data associated with network traffic (e.g., packet data) that is processed by more than one plane of the smartNIC 102. For example, the unified log 124 may log traffic data that is processed by both the accelerator 122 and the programming data plane 116. It should be understood that, in some embodiments, the unified log 124 may be configured (e.g., by an administrator) to log data that is processed by only one plane. In some embodiments, a unified log may store information based on network traffic data processed by any suitable number and/or combination of planes of a smartNIC. As described herein, techniques may utilize a packet modification mechanism to facilitate coordination of logging (e.g., by the accelerator 122) of traffic data that is processed by either (or both) of the accelerator 122 or the programming data plane 116.

In one illustrative embodiment, consider a scenario in which a compute instance executing on host A 104 executes a web server, serving web content (e.g., video streaming, web pages, etc.) to client applications. Host B 112, as a representative host device, may execute a client application that exchanges data packets (e.g., associated with a particular flow) with host A 104. The client application on host B 112 transmits a first packet (e.g., requesting a web page) over the virtual network 110 that arrives at the switch 108, and is subsequently routed to a physical port (e.g., a switch port) of the smartNIC 102. The accelerator 122 of the smartNIC 102 receives the first packet from the port and analyzes the first packet to determine flow information (e.g., a five-tuple obtained from one or more headers of the first packet, and/or other flow-identifying information).

In some embodiments, the accelerator 122 determines that the first packet is associated with an authorized flow. For example, as described further herein (e.g., with respect to FIG. 3), the accelerator 122 may determine a hash from the flow information, which is used to perform a look-up into a memory (e.g., an accelerator cache) of the accelerator 122. The cache may be used by the accelerator 122 to efficiently determine how to route/forward packets that are associated with flows that are known by the accelerator. The accelerator 122 determines that a cache entry for a flow associated with the first packet is located within the cache. In some embodiments, this may indicate that the particular flow is currently managed by the accelerator as an allowed flow. In some embodiments, the accelerator 122 may further determine that the first packet conforms to one or more traffic policies that are previously programmed (e.g., by the programming data plane 116) for the accelerator 122 to enforce. For example, an example policy may be associated with a maximum throughput for a particular flow type of the flow (e.g., according to a particular level of quality of service (QoS) that is granted to the flow type). In this example, the accelerator 122 determines that the first packet is both associated with an authorized flow and conforms to relevant traffic policies for this flow. Accordingly, the accelerator 122 forwards the first packet to the intended destination, which, in this case, is host A 104 (e.g., via NIC 106).

In accordance with forwarding the first packet, the accelerator 122 may further log the first packet to the unified log 124. For example, as described further herein (e.g., with respect to FIG. 4), the accelerator 122 may log data associated with the packet and/or the associated flow. Some non-limiting examples of traffic data that may be logged include the date and/or time that the packet was received and/or forwarded, the type of log entry (e.g., an alert/warning entry, an informational entry, etc.), a particular action that was performed on the first packet (e.g., dropping the packet, forwarding the packet), a particular path via which the first packet was received (e.g., a particular switch that is connected to a port of the smartNIC 102), IP header information such as the source address or destination address, etc. As described herein, the unified log 124 may be stored within the accelerator 122 via any suitable format and using any suitable data structure. For example, the unified log 124 may be stored as a file within memory that includes a list of log entries. In some embodiments, the accelerator 122 may be programmed to log entries to the unified log 124 for packets that are subsequently forwarded by the accelerator 122. This may, in part, enable the smartNIC 102 to efficiently aggregate and/or compute flow statistics regarding flow traffic that is forwarded by the smartNIC 102.

Continuing with the illustration, suppose that at a later time, the smartNIC 102 receives a second packet from host C 114. For example, the suppose that host C 114 executes a client application that requests a video stream to be provided by the host A 104 to the host C 114. Accordingly, the client application transmits (e.g., via the network stack of host C 114) the second packet over the virtual network 110 that arrives at the switch 108, and is subsequently routed to a physical port of the smartNIC 102. It should be understood that the first packet and the second packet may be associated with any suitable traffic characteristics, which may be similar (or different) between the associated packets (and/or respective flows). For example, some non-limiting traffic characteristics may include: the client application that is associated with the particular packet, the type of flow (e.g., video stream, web page, etc.), the type of bit rate (e.g., variable bit rate, constant bit rate), the IP address (e.g., physical and/or virtual address) of the host, the particular switch that handles (e.g., routes/forwards) the packet, the particular port of the smartNIC 102 that receives the packet, etc.

In some embodiments, the accelerator 122 determines that this second packet requires further processing by the programming data plane 116. For example, the accelerator 122 may determine that the second packet is not associated with an authorized (e.g., allowed) flow. For example, the accelerator 122 may determine that a cache entry for a flow associated with the second packet is not located within the accelerator cache. In some embodiments, this may indicate that the particular flow is not currently managed by the accelerator as an allowed flow, and thus the accelerator may request for instructions from the programming data plane 116 on how to process the second packet. The accelerator 122 then forwards the second packet via the data bus 118 (e.g., a NOC) to the programming data plane 116 for further processing.

For example, the second packet may be queued by the accelerator 122 for subsequent de-queueing by one of the processors of the programming data plane 116. A processor of the programming data plane 116 may then receive (e.g., retrieve) and analyze the second packet. In this example, the programming data plane 116 may determine that the second packet should not be forwarded by the smartNIC 102 to host A 104 (e.g., the second packet should be dropped). For example, the programming data plane 116 may determine that one or more of the characteristics of the second packet (and/or the corresponding flow) does not conform to a predefined (e.g., pre-programmed) policy. In one non-limiting example, the predefined policy may indicate that the client application of host C 114 is not authorized to receive video streaming data from host A 104. In any case, the programming data plane 116 may determine to transmit an instruction to the accelerator 122. In some embodiments, the instruction may instruct the accelerator 122 to not forward (e.g., to drop) the packet. In some embodiments, the instruction may instruct the accelerator 122 to log the packet (e.g., to the unified log 124). In some embodiments, the instruction may instruct the accelerator 122 to perform any suitable actions and/or combinations thereof, including, but not limited to, programming the accelerator memory with additional instructions, modifying the accelerator cache, etc. In some embodiments, as described further herein (e.g., with respect to FIG. 6), the second packet may be modified to include the instruction (e.g., within an instruction header). For example, the instruction header may be prepended (or appended) to the packet.

In some embodiments, upon generating a modified packet that includes the instruction with the second packet, the programming data plane 116 may transmit the modified packet to the accelerator 122. In some embodiments, the modified packet may be transmitted to the accelerator 122 via a similar (e.g., same) data bus 118, such as the NOC. In some embodiments, the programming data plane 116 may additionally (and/or alternatively) transmit the modified packet by invoking an Application Programming Interface (API) of the shared memory 120. In this case, the accelerator 122 may receive a notification (e.g., via the API call and/or a polling mechanism) that the modified packet is available for processing.

Continuing with the illustration, the accelerator 122 may analyze the modified packet and then perform operations according to the instructions within the modified packet. For example, as described, the instructions may instruct the accelerator 122 to not forward the packet (e.g., to drop the packet). The instructions may also instruct the accelerator 122 to log packet and/or flow related data to the unified log 124. In some embodiments, the accelerator 122 may log this information utilizing a similar method as described above (e.g., with respect to the first packet), for example, adding a new log entry to the unified log 124. In some embodiments, as described herein, the information that is logged with respect to the modified packet may be similar or different than compared to the first packet. For example, the instruction may instruct the accelerator 122 to log a reason why the second packet is rejected (e.g., whereas the first packet was automatically forwarded based on being determined to be associated with an approved flow and/or being in conformance with one or more policies). In some embodiments, the instruction may instruct the accelerator 122 to forward the second packet (e.g., similar to the forwarding of the first packet). In this case, the instruction to log the second packet may request the accelerator 122 to note in the log that a cache entry for an approved flow (e.g., corresponding to the second packet) is being added and/or updated in the accelerator cache. It should be understood that the programming data plane 116 may instruct the accelerator 122 to log any suitable information via the instruction that is included in the modified packet.

As illustrated above, and, as described further herein, techniques may thus facilitate an efficient unified logging process. In some embodiments, the smartNIC 102 may utilize the resulting unified log 124 for any suitable purpose. In one example, the unified log 124 may be used to generate a statistics report (e.g., by the programming data plane 116). For example, the programming data plane 116 may retrieve the unified log 124 (e.g., having been copied by the accelerator 122 to shared memory 120), and then may analyze the unified log 124 to compile statistics per flow based on the packet data that is logged. In one example, this statistics report may then be sent to another device (e.g., another host machine connected via the virtual network 110) for presentation to an administrator. The administrator may use the statistics report, for example, to adjust policies of the smartNIC, to contact a customer and alert them to determined traffic patterns, and/or for any suitable purpose.

Figure 2:
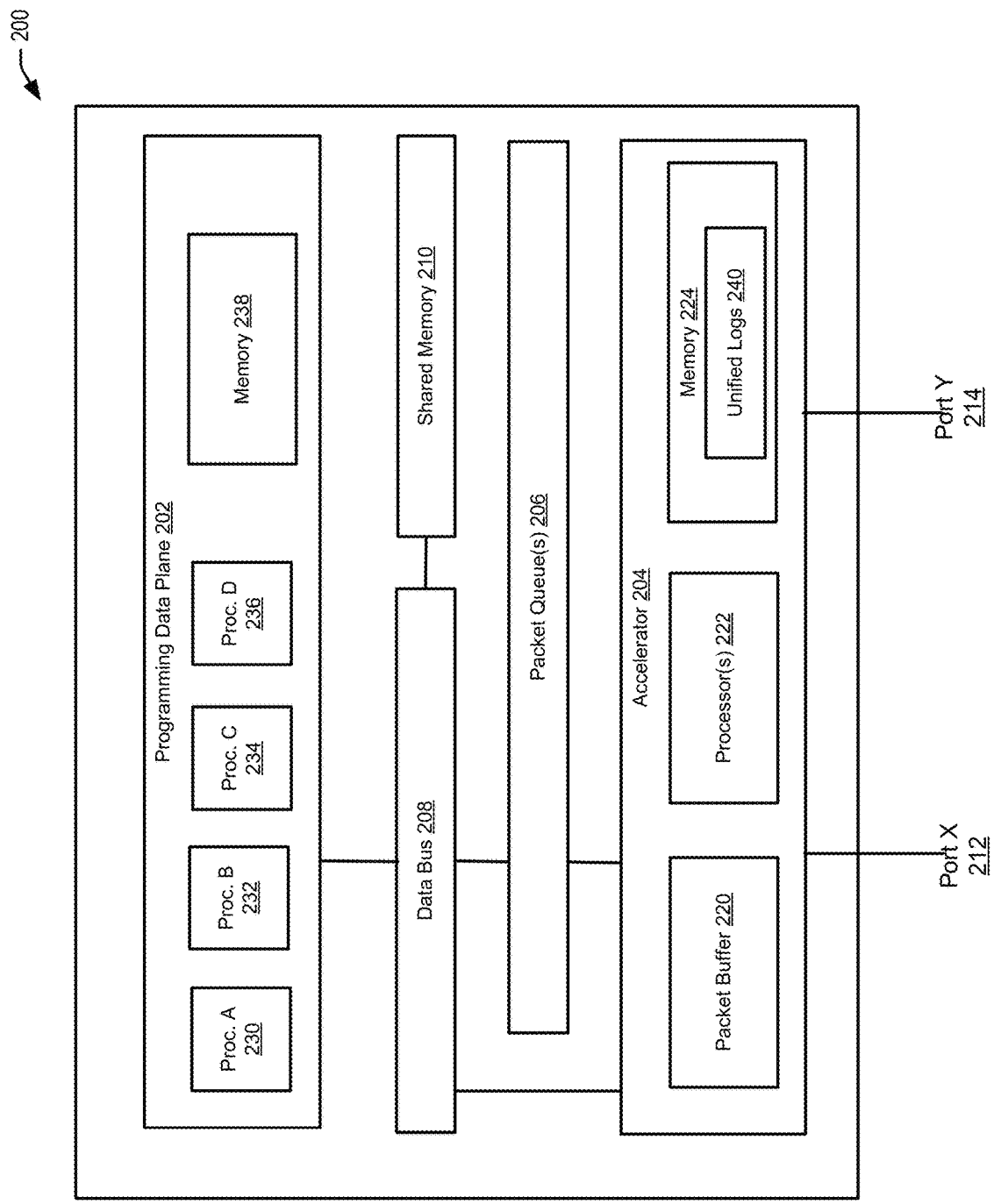
FIG. 2 is another simplified block diagram illustrating an example architecture of an NVD, according to some embodiments.

FIG. 2 is a simplified block diagram illustrating an example architecture of an NVD, according to some embodiments. In FIG. 2, a smartNIC 200 type of NVD is illustrated. The smartNIC 200 includes several elements, including one or more ports (e.g., port X 212 and port Y 214), an accelerator 204, one or more packet queues 206, a data bus 208, a shared memory 210, and a programming data plane 202. In some embodiments, the smartNIC 200 may be similar to the smartNIC 102 of FIG. 1, and/or may operate in a similar contextual environment (e.g., connected to a host computer and/or switch device, operating within a virtual network environment, etc.).

Turning to the elements of the smartNIC 200 in further detail, as described herein, the smartNIC 200 may contain one or more ports. For example, port X 212 may correspond to a host port that is connected (e.g., via an Ethernet cable) to a host computing device. Port Y 214 may correspond to a switch port that is connected to a switch device. In some embodiments, a port of the smartNIC 200 may be split (e.g., via a splitter device, such as an Ethernet splitter) into a plurality of ports (e.g., two ports). It should be understood that the smartNIC 200 may include any suitable number of ports. These ports may be physically native to the smartNIC 200, connected to the smartNIC 200 via an external splitter device (e.g., thus, extending the number of ports available to the smartNIC 200), and/or any suitable combination. It should be understood that any of the one or more ports of the smartNIC 200 may be configured to transmit and/or receive network traffic. In some embodiments, network traffic may be identified based in part on the particular port and/or the splitter device at which the traffic (e.g., packet data) was received/processed.

Turning to the accelerator 204 in further detail, the accelerator 204 may include one or more hardware and/or software components. For example, at depicted in FIG. 2, the accelerator 204 may include a packet buffer 220, one or more processors 222, and a memory 224. In some embodiments, a packet may be received at a port of the smartNIC 200 (e.g., port X 212), and then be transmitted to the packet buffer 220. In some embodiments, the packet buffer 220 itself may include memory (e.g., dynamic random access memory (DRAM), static random access memory (SRAM), etc.) and/or one or more processors. The packet buffer 220 may queue packets (e.g., utilizing one or more queues allocated in the memory) that are received from one or more ports of the smartNIC 200 for further processing by the accelerator 204, described further herein. The packet buffer 220 memory may also queue packets that have been processed (e.g., by the accelerator 204 and/or the programming data plane 202), and are ready to be routed to another computing device. For example, the packet buffer 220 may queue packets that are ready for transmission to either host A 104 of FIG. 1 or to switch 108 (e.g., for further routing to another host connected to the virtual network 110). In some embodiments, the packet buffer 220 may execute a traffic manager process/module that coordinates (e.g., including load-balancing) queueing and/or de-queueing packets that are processed by the accelerator 204 and/or the programming data plane 202.

Turning to the processing of a packet by the accelerator in further detail, consider an example in which a data packet is received from host B 112 at a port (e.g., port Y 214) and queued for processing by the traffic manager. In this example, the data packet may be associated with a request for content from a web page from a compute instance (e.g., operating a web server) of host A 104. It should be understood that a data packet may contain any suitable payload contents (e.g., text, video, audio, etc.) associated with a particular flow between endpoints. When the data packet is ready to be de-queued, the traffic manager may de-queue the packet and transmit it to a processor 222 of the accelerator 204. In some embodiments, the processor 222 may be specialized to perform match analysis on the packet to facilitate efficient processing of the packet. For example, the processor 222 may be programmable with instructions for performing analysis on a packet (e.g., analyzing packet headers to determine flow information, etc.), and then determining what actions to take (e.g., forwarding the packet, dropping the packet, etc.). When performing this analysis, the processor 222 may perform a look-up into the memory 224 to determine if the data packet is associated with a known (e.g., allowed) flow. As described herein, in some embodiments, the memory 224 may include a cache of the accelerator. The cache may include one or more cache entries. In some embodiments, as illustrated further below with respect to FIG. 3, the cache may include a hash table data structure. Each cache entry may correspond to a particular flow that is being managed by the accelerator 204 (e.g., as an allowed flow).

Figure 3:
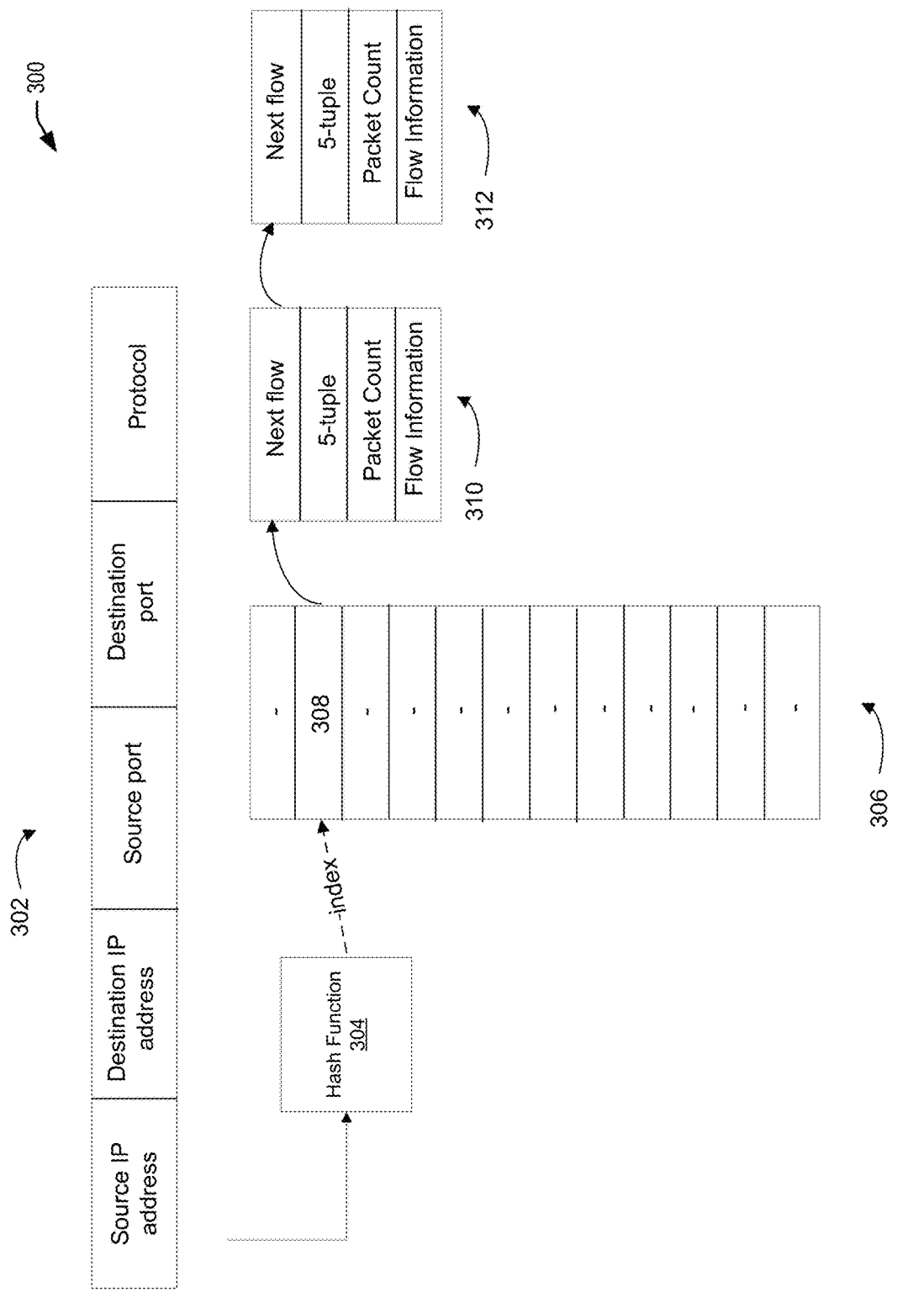
FIG. 3 is another simplified block diagram illustrating an example technique for managing a flow by an NVD, according to some embodiments.

FIG. 3 is a simplified block diagram illustrating utilization of a cache of the accelerator 204 of FIG. 2., according to some embodiments. The diagram 300 depicts a five-tuple 302, a hash function 304, and a hash table 306. The hash table 306 may correspond to a cache, and may include one or more entries (e.g., cache entries). In some embodiments, the hash table 306 may include one or more entries for a given hash (e.g., utilizing a chaining technique, in case there are hash collisions). For example, a hash table entry 308 of the hash table 306 may be associated with (e.g., include) one or more cache entries, for example, cache entry 310 and cache entry 312. A cache entry may include any suitable flow information. For example, as depicted in FIG. 3, the cache entry 310 and cache entry 312, respectively, includes a five-tuple (and/or associated hash) that corresponds to a particular flow, a packet count for the number of packets that have been received by the accelerator for the particular flow, and other flow information (e.g., other flow statistics, timer information, flow routing information, etc.). In some embodiments, a cache entry may include policy information associated with rules governing processing the flow. Each cache entry may also include a pointer to another cache entry (e.g., for another flow). It should be understood that any suitable data structure may be used to maintain the accelerator cache. As described herein, in some embodiments, a similar cache (e.g., including cache entries for currently managed flows) may be maintained by programming data plane. It should be understood that the content of the cache entries for respective caches may be the same or different.

Continuing with the operations of the accelerator 204 of FIG. 2, and, utilizing FIG. 3 for further illustration, upon receiving a data packet for analysis, the processor 222 of the accelerator 204 may perform a look-up into the accelerator cache (e.g., within the memory 224), which may correspond to the hash table 306. In one example, the processor 222 may analyze one or more headers of the data packet to obtain flow information (e.g., including a five-tuple), which may be similar to the five-tuple 302. For example, a header of the data packet may formatted according to a Transmission Control Protocol (TCP)/Internet Protocol (IP) header protocol, whereby the particular format of the header includes a plurality of different fields. The five-tuple 302 may include five of these fields, including a source IP address, a destination IP address, a source port, a destination port, and a protocol field. In some embodiments, the five-tuple may correspond to a particular (e.g., unique) flow (e.g., connection) between two endpoints. Upon obtaining the five-tuple, the processor 222 may generate a hash of the five-tuple 302 by executing a hash function 304. The output of the hash function 304 may be a hash (e.g., a hash value), which may correspond to any suitable identifier (e.g., a sequence of bits, an alphanumeric sequence, etc.). The hash may be used to index into the hash table 306. For example, suppose that this particular data packet is associated with a particular flow that is already being managed by the accelerator 204. The particular flow may be associated with the cache entry 312 of the hash table 306. In this example, the processor 222 may then identify how to process the data packet based in part on the data within the cache entry 312. For example, the processor 222 may increment the packet count of the particular flow and/or update statistical information associated with the flow. In some embodiments, the cache entry 312 may include further instructions for how to process the data packet. For example, the cache entry 312 may contain instructions indicating a particular host device to route the packet toward. In this example, because the data packet is already associated with a known flow in the accelerator cache (e.g., an approved flow), the accelerator 204 may efficiently forward the data packet to the appropriate destination. For example, as described earlier, the data packet may be forwarded via the host port (e.g., port X 212) to the NIC 106 of host A 104, whereby the web server executing within the compute instance may process the request indicated by the data packet.

In some embodiments, as described herein, the processor 222 may log flow information associated with the packet to a log maintained by the accelerator 204. For example, the processor 222 (e.g., via the traffic manager module of the accelerator 204) may log any suitable data (e.g., data associated with the five-tuple of the packet, cache entry data of the flow associated with the packet, etc.) to a unified log 240. In some embodiments, the unified log 240 may be similar to unified log 124 of FIG. 1. In some embodiments, the unified log 240 may be alternatively and/or additionally stored in the shared memory 210 of the smartNIC 200. In some embodiments, the unified log 240 may be stored any suitable location of the smartNIC 200 that is accessible for reading and writing by the accelerator 204. In some embodiments, the traffic manager may determine to log packet data to the unified log 240 upon determining that the packet is approved for forwarding (e.g., being associated with an approved flow). In some embodiments, as described herein traffic manager may determine to not log a packet to the unified log 240 unless and/or until further instructions are received from the programming data plane 202.

As described above, the accelerator 204 may thereby efficiently process packets of known (e.g., approved) flows that may be respectively be tracked (e.g., managed) based in part on the accelerator cache entry data. For example, the accelerator 204 may not transmit the data packet to the programming data plane 202 if the accelerator 204 already has instructions for routing packets associated with the flow. Furthermore, the accelerator 204 may efficiently log traffic data to the unified log 240 that represents an accounting of traffic handling (e.g., forwarding) by the smartNIC 200. In some embodiments, this log 240 may be subsequently used to generate a statistics report that represents any suitable flow statistics associated with packets processed by the smartNIC 200.

In some embodiments, the accelerator 204 may transmit data to and/or receive data from the programming data plane 202. For example, consider another case in which another data packet is received by the accelerator 204, for example, from host C 114 (e.g., via port Y 214). In this example, the accelerator 204 determines that this data packet is not associated with a flow already managed by the accelerator 204. In another embodiment, the accelerator 204 may determine that, even if the packet is associated with a flow already managed by the accelerator 204, the packet necessitate further review by the programming data plane 202 (e.g., the packet may not be in conformance with a policy associated with the flow). In one example, policy information may be programmed to the accelerator in the memory 224 (e.g., within the accelerator cache). In any case, the accelerator 204 may determine that programming data plane 202 is the proper entity for further processing of the packet. In this example, because the accelerator 204 does not yet have information about how to process the packet, the accelerator 204 does not yet log the packet (e.g., to the unified log 240).

Continuing with the example, the accelerator 204 may then input the data packet into a packet queue 206, which may be one of a plurality of data queues. For example, in some embodiments, each processor of the one or more processors of the programming data plane 202 may be associated with at least one queue per port. In some embodiments, the one or more packet queues 206 may be a component of the accelerator 204. In some embodiments, the packet queues 206 may be a separate component from the accelerator 204. In any case, the packet queues 206 may operate as an interface between the accelerator 204 and the programming data plane 202, whereby packet data (e.g., data packets and/or control packets) may be efficiently routed between the planes. In some embodiments, in part because there may be multiple processors of the programming data plane 202, with one or more corresponding packet queues per processor, the smartNIC may be able to efficiently process (e.g., in parallel) a large number of packets per second (e.g., 100 Gigabits/second, 200 Gigabits/second, etc.). For example, as described further herein, the smartNIC 200 (e.g., via the programming data plane 202) may be able to efficiently add new flows to be managed by the accelerator 204.

The data packet may subsequently be de-queued from the packet queue 206 and transmitted to the programming data plane 202 via a data bus 208. In some embodiments, the data bus 208 may correspond to any suitable physical medium that may transport data between elements of the smartNIC 200. For example, the data bus 208 may correspond to a network-on-a-chip (NOC) that includes a network-based subsystem on an integrated circuit of the smartNIC 200. In some embodiments, the data bus 208 may enable data to be transported between the accelerator 204, the programming data plane 202, the packet queue(s) 206, and/or the shared memory 210 of the smartNIC 200.

In some embodiments, the programming data plane 202 may include one or more processor units. As depicted in FIG. 2, the programming data plane 203 may include four processor units, for example, processor A 230, processor B 232, processor C 234, and processor D 236. In some embodiments, one or more of these processors may utilize an Advanced Reduced Instruction Set Computing (RISC) Machine (ARM) architecture. In some embodiments, any one or more of the processors may be configured to receive and/or process packets (e.g., data packets and/or control packets). The programming data plane 202 may also include a memory 238 (e.g., SRAM, DRAM, and/or any suitable type of memory). In some embodiments, the memory 238 may also include, among other things, a cache. The cache may be used to managed various flows by the programming data plane 202. In some embodiments, the programming data plane 202 may be configured to analyze packets received from the accelerator 204 and determine instructions for processing those packets. In some embodiments, the programming data plane 202 may itself forward packets (e.g., via the accelerator 204) to another device external to the smartNIC 200. In some embodiments, the programming data plane 202 may also and/or alternatively be configured to program the accelerator 204 with instructions for processing subsequent packets associated with particular flows. For example, the programming data plane 202 may instruct the accelerator 204 to add a cache entry for a flow that has been approved by the programming data plane 202.

Continuing with the example above, suppose that the data packet de-queued from the packet queue 206 is received by the programming data plane 202 via the data bus 208 by processor A 230. In this example, processor A 230 may analyze the data packet and determine that this packet is associated with a new flow (e.g., not previously authorized by the programming data plane 202). In another example, as described above, the packet may be associated with an already-authorized flow, but may necessitate further processing by the programming data plane 202. In any case, and, continuing with this example, it should be understood that processor A 230 may be a representative processor of the plurality of processors of the programming data plane 202. The processor A 230 may determine that this flow should not be allowed (e.g., not authorized), for example, based on a list of rules regarding types of flows and/or traffic patterns that are to be allowed (and/or disallowed). It should be understood that the programming data plane 202 may be configured to perform any suitable analysis and/or actions on the data packet and/or other network data traffic. For example, the programming data plane 202 may implement a firewall, compile statistical data in a statistics report regarding flow traffic (e.g., based on the unified log 240, as described herein), report flow data to customers, etc. In this example, having determined that this new flow is not to be allowed, the programming data plane 202 may determine instructions for instructing the accelerator 204 on how to further process the packet. For example, the instructions may instruct the accelerator 204 to log the packet to the unified log 240, but to not forward the packet. In this way, even those packets that may not be forwarded (e.g., may be dropped) by the accelerator 204 (e.g., to another host), but are still processed by the smartNIC (e.g., via the programming data plane 202), may be logged to a uniform log. Accordingly, aggregated statistics reporting may be more efficiently performed. As described herein (e.g., with respect to FIG. 6), the programming data plane 202 may modify the packet to include the instructions. For example, processor A 230 may prepend (and/or append) a header to the packet that includes the instructions. The header may be formatted according to any suitable format (e.g., a bitstring).

Upon generating the modified packet, the programming data plane 202 may transmit the modified packet to the accelerator 204. In one example, the programming data plane 202 may invoke an API call of an API that is implemented via the shared memory 210. For example, the processor A 230 may write the modified packet to the shared memory 210. In one embodiment, the accelerator 204 may poll the shared memory 210 to retrieve (e.g., read) the modified packet from the shared memory 210. In another example, the programming data plane 202 may transmit the modified packet to the accelerator 204 via the data bus 208. For example, the modified packet may be transmitted via the NOC and inserted into a packet queue 206, for subsequent de-queuing and analysis by the processor 222 of the accelerator 204. It should be understood that the modified packet may be transmitted to the accelerator 204 from the programming data plane 202 via any suitable one or more mechanisms and/or combinations thereof.

Upon the accelerator 204 receiving the modified packet, the accelerator 204 may process the modified packet. Continuing with the example above, the accelerator 204 may analyze the modified packet based on obtaining the instructions (e.g., from the bitstring in the prepended (or appended) header). For example, the bitstring may include instructions regarding whether to forward the packet or drop the packet. In some embodiments, the bitstring may further include instructions indicating information that should be logged (e.g., to the unified log 240), for example, as described further herein (e.g., with respect to FIG. 5). In this case, the instructions may indicate that the particular packet is to be dropped and also logged to the unified log 240. In some embodiments, the instructions may indicate that the packet (e.g., the original packet) should be forwarded to the intended destination (e.g., as indicated by the one or more original packet headers). In the case where the programming data plane 202 instructs the accelerator 204 to forward the packet, the accelerator 204 may forward the packet similarly as described herein (e.g., via the appropriate port and/or splitter). It should be understood that the packet may be logged to the unified log 240 at any suitable time. For example, in the example where the packet is to be dropped, the accelerator 204 may first log the packet to the unified log 240 and then clear the packet from memory (e.g., memory 224). In some embodiments, the accelerator 204 may further remove a cache entry (e.g., of the accelerator cache) for the flow associated with the packet, for example, if the instructions indicate that the flow is to be expired. In another example, where the packet is to be forwarded, the accelerator 204 may log the packet to the unified log 240 at any suitable time (e.g., before forwarding the packet or after forwarding the packet).

Accordingly, as described above, by utilizing existing communication channels (e.g., the data bus 208, packet queues 206, and/or an API via the shared memory 210), planes of the smartNIC 200 may be able to coordinate the logging of network traffic (e.g., packet-related data) to the unified log 240. It should be understood that the smartNIC 200 may maintain any suitable number and/or types of logs. For example, one unified log may be used to log traffic associated with a particular type of flow (e.g., video stream traffic), while another type of unified log may be used to log traffic associated with another type of flow (e.g., web page traffic). It should also be understood that some logs may not be unified logs. For example, the programming data plane 202 may determine to additionally (and/or alternatively) store a separate log (e.g., in memory 238) that stores certain types of information. For example, the programming data plane 202 may determine that some information (e.g., diagnostic information regarding processor and/or memory functionality) may not necessitate being aggregated with other traffic statistics. In this example, the programming data plane 202 may maintain a separate log from the unified log 240.

In some embodiments, the smartNIC 200 may include other hardware and/or software elements and/or implement other functions. For example, the smartNIC 200 may include one or more cryptographic functions that are configured to encrypt and/or decrypt packet data. In another example, the smartNIC 200 may include a function to compute a Cyclic Redundancy Check (CRC) code. In some embodiments, the smartNIC 200 may be configured to encapsulate and/or de-capsulate a packet (e.g., a data packet), for example, to facilitate packet routing over a virtual network. In some embodiments, any one or more of these functions may be implemented in any suitable component of the smartNIC 200 (e.g., the accelerator 204, the programming data plane 202, and/or another element of the smartNIC 200 (e.g., another memory and/or processor unit).

Figure 4:
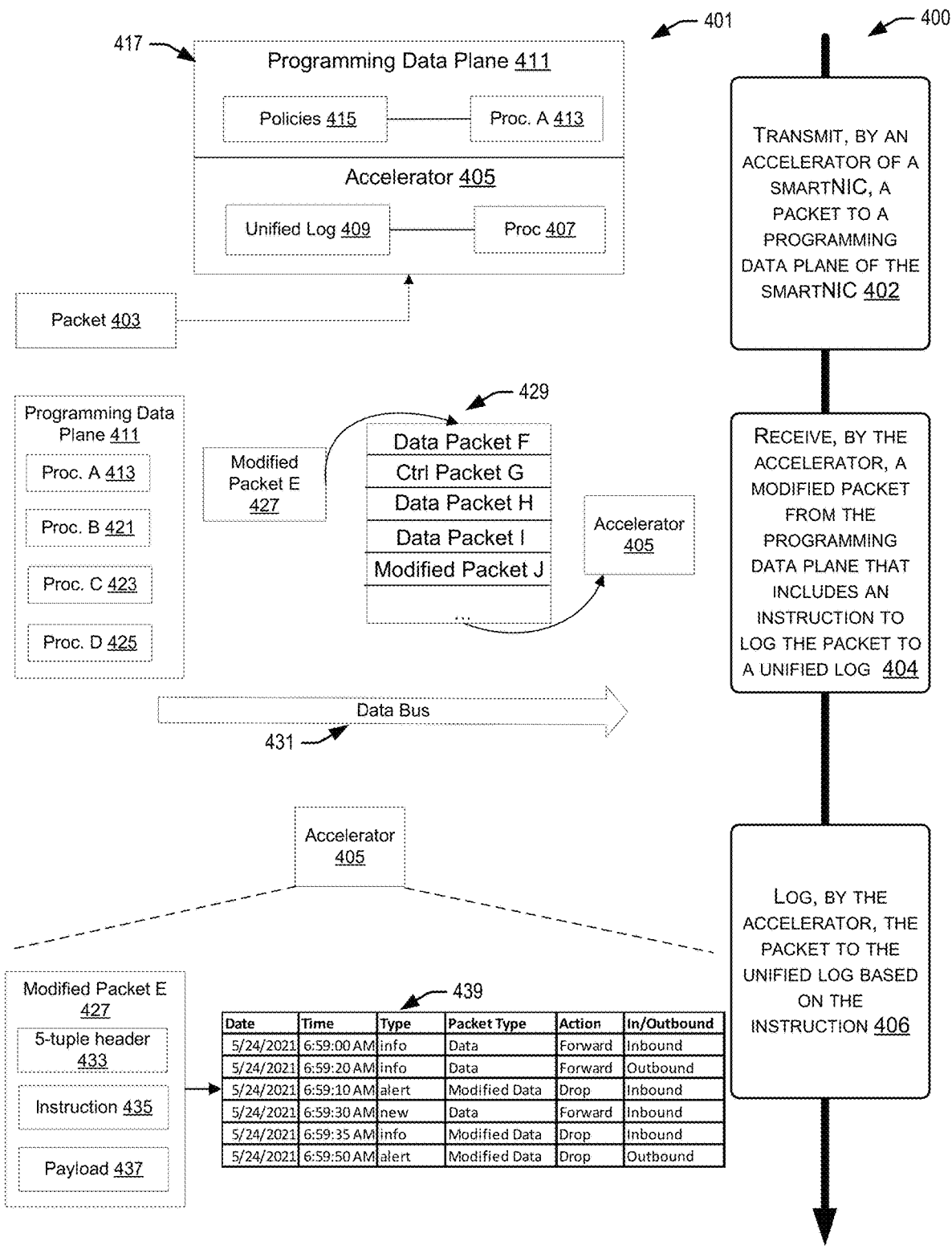
FIG. 4 is a simplified flow diagram illustrating an example process for efficiently coordinating unified logging among a plurality of planes of an NVD, according to some embodiments.

FIG. 4 is a simplified flow diagram 401 illustrating an example process 400 for coordinating unified logging by an NVD, according to some embodiments. In this example, the process 400 depicts an accelerator of a smartNIC type of NVD receiving a packet and then determining that the packet requires further processing by a programming data plane of the smartNIC. The programming data plane determines instructions that indicate that data associated with the packet should be logged to a unified log, generates a modified packet that includes the instructions, and then transmits the modified packet back to the accelerator. The accelerator then logs the packet to the unified log.

The diagram 401 depicts example states that correspond to the blocks of the process 400. The diagram 401 includes, among other elements, a smartNIC 417, whereby the smartNIC 417 includes a programming data plane 411, an accelerator (e.g., a data plane) 405, a data bus 431, and a packet queue 429. In some embodiments, these elements of the smartNIC 417 may be similar to other similarly referenced elements of the smartNIC 200 of FIG. 2 (and/or any other smartNIC described herein).

Turning to the process 400 in further detail, the process 400 begins at block 402, whereby an accelerator of a smartNIC transmits a packet to a programming data plane of the smartNIC. For example, using diagram 401 for illustration, packet 403 may be received by the accelerator 405 of smartNIC 417 (e.g., at a particular port and/or via a particular switch). For example, the packet 403 may be transmitted to the smartNIC 417 by host B 112 of FIG. 1 and intended for host A 104 (e.g., to request a video stream). A processor 407 of the accelerator 405 inspects the packet 403 and determines that the programming data plane 411 should further process the packet 403. In some embodiments, this may be because the packet 403 is not associated with a current authorized flow (e.g., not associated with an existing cache entry of the accelerator cache, for example, as described in reference to FIG. 3). In some embodiments, this may be because the packet 403 is associated with a known flow, but the packet 403 triggers further inspection (e.g., potentially violating a policy (e.g., a QoS policy or security policy) for the flow). In any case, the accelerator 405 determines to transmit the packet 403 to the programming data plane 411 for further processing. For example, as described further herein, the programming data plane 411 may maintain a list (e.g., a policy list 415), whereby a processor 413 of the programming data plane 411 may verify the packet 403 against the policy list. In this illustration, because the accelerator 405 has not yet obtained information regarding how to process the packet 403, the accelerator 405 does not yet log the packet to a unified log 409. In some embodiments, if the accelerator 405 is able to process the packet (e.g., based on cache information), the accelerator 405 may log the packet to the unified log 409 and/or forward the packet to the appropriate destination (e.g., host A 104).

At block 404, the accelerator may receive a modified packet from the programming data plane that includes an instruction to log the packet to a unified log. Continuing with the illustration of diagram 401, and, as introduced above, a processor of the programming data plane 411 (e.g., processor A 413) may receive the packet 403 (e.g., via a data bus, such as a NOC) and then analyze the packet 403. It should be understood that any suitable processor (e.g., processor A 413, processor B 421, processor C 423, or processor D 425) may be enabled to process the packet 403. In this way, the programming data plane 411 may efficiently support parallel processing of multiple packets. It should be understood that the accelerator 405 may also support parallel processing of packets by the one or more processors of the accelerator 405. Continuing with this illustration, suppose that processor A 413 of the programming data plane 411 determines that the packet 403 should not be forwarded to the intended destination. For example, the processor A 413 may determine that the particular host (e.g., host B 112) and/or client application that transmitted the packet is not authorized for receiving a video stream from host A 104. In some embodiments, this may be programmed within the policy list 415 (e.g., and/or any suitable list of rules) that is maintained by the programming data plane 411 in memory.

The processor A 413 of the programming data plane 411 may then determine an instruction for the accelerator 405 to further process the packet, and include the instruction within a modified packet (e.g., modified packet E 427). In some embodiments, and, as illustrated further with respect to FIG. 5, the modified packet E 427 may be formatted similarly to a data packet.

Figure 5:
FIG. 5 is another simplified block diagram illustrating an example format for a modified packet, according to some embodiments.

FIG. 5 is another simplified block diagram illustrating an example format for a modified packet, according to some embodiments. The packet format 500 of FIG. 5 includes a plurality of headers and a payload data 510. The plurality of headers includes an instruction header 502, a Media Access Control (MAC) header 504, an Internet Protocol (IP) header 506, and a Transmission Control Protocol (TCP) header 508. In some embodiments, the MAC header 504, the IP header 506, and/or the TCP header 508 may be formatted, according to industry standards, for example, according to the Open System Interconnection (OSI) Model. In some embodiments, any suitable packet header(s) may be utilized for the packet format 500. For example, in a case where an Ethernet frame may utilize a VLAN tag, an Institute of Electrical and Electronics Engineers (IEEE) 802.1Q standard may be used within a modified Ethernet frame header (e.g., a modified MAC header 504). As described herein, a VLAN tag may be used, for example, to identify which VLAN a particular packet belongs, thus enabling the smartNIC (and other computing resources of the CSPI) to support virtual network routing. In some embodiments, any one or more fields of the packet headers and/or payload data 510 may be associated with flow information that may be used to identify a particular flow associated with a given packet. In some embodiments, other information may be further be used to identify a packet and/or flow, including, for example, a port (e.g., of a smartNIC) at which the packet was received. This information may be included within one of the headers of packet format 500 and/or any additional suitable header.

It should be understood that one or more of the headers of the packet format 500 for a modified packet may be similar (e.g., same) as the packet format for a typical data packet (e.g., used to transmit payload data between hosts of a network), described herein. For example, as referenced with respect to the five-tuple 302 of FIG. 3, the one or more headers of the packet format 500 may include fields that may be used to determine a five-tuple. As described herein, the five-tuple may be used to identify a particular flow. For example, the five-tuple may be used to generate a hash that indexes into a cache (e.g., a cache of an accelerator and/or a cache of a programming data plane). In some embodiments, based at least in part on the modified packet format and the data packet format utilizing a similar (e.g., same) format, both packet types may utilize the same channel (e.g., queuing mechanism and/or NOC) to transmit and analyze packets between the planes of a smartNIC.

In some embodiments, the instruction header 502 may be prepended or appended to the data packet. The instruction header 502 may correspond to any suitable format, for example, a bit string of N bits (e.g., 8 bits) that is prepended (or appended) to the packet. In some embodiments, the bitstring may indicate one or more instructions for the accelerator. For example, an instruction to forward the packet may correspond to a "1," while an instruction to drop the packet may correspond to a "0." In another example, the bitstring may further include a bit that indicates whether information should be logged (e.g., to a unified log, such as unified log 409 of FIG. 4). In yet another example, one or more bits may respectively indicate particular types of information that should be logged to the unified log 409 (e.g., a packet type, a log time, the source/destination IP address, a flow type, etc.). In some embodiments, the instruction header 502 may also (and/or alternatively) contain any other suitable instructions (e.g., instructions for expiring a flow, removing an associated cache entry, updating the cache entry, etc.).

Continuing with block 404 of FIG. 4, upon generating the modified data packet E 427, the programming data plane 411 may queue the modified packet 427 within queue 429. For example, the modified data packet E may be transmitted via the data bus 431 (e.g., a NOC) and then may be inserted within queue 429. In some embodiments, queue 429 may correspond to one of the packet queues 206 of FIG. 2, for example, associated with a particular smartNIC port and/or processor (e.g., processor A 413). As depicted in diagram 401, the queue 429 may contain one or more packets, each packet corresponding to a particular packet type. For example, in some embodiments, data packet F (and/or data packet H, and I) may respectively correspond to a packet that contains any suitable payload data that is intended for forwarding to another host (e.g., as typical Internet traffic). In some embodiments, a control packet (e.g., control packet G) may also be queued. In some embodiments, the control packet may include any suitable control information, including, but not limited to, flow expiry data, flow statistics, security list updates, and/or other flow metadata associated with the routing and/or scheduling of data packets and/or associated flows. In some embodiments, the control packet may not include payload data, and may be intended primarily for internal communications between components of the smartNIC. In some embodiments, a modified data packet (which may also be described herein as a "modified packet," such as modified packet E 427) may otherwise correspond to a typical data packet (e.g., including payload data), but may also include an instruction header (e.g., as described in reference to FIG. 5). In any case, continuing with block 404, the modified data packet E 427 may be queued in queue 429 for subsequent de-queuing by the accelerator 405.

At block 406, the accelerator may log the data associated with the packet to the unified log based on the instruction included within the modified packet. For example, as described above, the accelerator 405 may de-queue the modified packet E 427 from queue 429, which, in this example, may include at least a five-tuple header 433 (e.g., as described in reference to FIG. 3), an instruction 435 (e.g., included in the modified packet E 427 at block 404), and a data payload 437. In some embodiments, the accelerator 405 may then obtain the instruction (e.g., the bitstring) from the instruction 435. As depicted in diagram 401, the instruction 435 may instruct the accelerator to log the packet to the unified log 409. A table 439 of the unified log 409 is depicted in diagram 401, which may correspond to a table of log entries. The table 439 may include any suitable number of log entries (e.g., rows) and may contain any suitable number and/or type of fields, as described further in reference to FIG. 6. In some embodiments, the instruction 435 may instruct the accelerator to log information to table 439 based any one or more of the instruction 535 itself, the payload 537, and/or the five-tuple header 533. In some embodiments, any suitable packet and/or flow related information (e.g., metadata obtained from packet headers) may be logged to the unified log.

FIG. 6 is another simplified block diagram illustrating an example unified log of an NVD, according to some embodiments. In some embodiments, table 600 of FIG. 6 may be similar to table 439 of FIG. 4, and may correspond to a portion (e.g., a sample) of a unified log, as described herein. In some embodiments, an accelerator (e.g., accelerator 405 of FIG. 4) of a smartNIC (e.g., smartNIC 417) may operate a module (e.g., a traffic manager module, as described in reference to FIG. 2) to generate table 600. In table 600, a plurality of representative data field types are depicted (e.g., as columns), including a date 601, a time 603, a log entry type 605, a packet type 607, an action performed 609, a packet direction 611, a packet header type 613, a source address 615, a destination address 617, and a column including additional information 619. In some embodiments, one or more of these field types may correspond to data (e.g., and/or metadata) that is obtained from the packet. In some embodiments, data (and/or metadata) that is logged may be also (and/or alternatively) obtained from a cache entry for a flow.

Turning to the representative data field types in further detail, the date 601 column and the time 603 column may respectively correspond to a date and time that a packet was received by the accelerator (e.g., at the smartNIC port from an external host and/or being returned back to the accelerator from the programming data plane) for logging. It should be understood that any suitable date/time(s) may be logged. In some embodiments, the log entry type 605 may indicate the type of log entry (e.g., Informational, Alert, New Flow, etc.). In some embodiments, the packet type 607 may indicate the type of packet (e.g., a data packet type, a modified data packet type, a control packet, etc.). In some embodiments, the action performed 609 column may indicate the type of action that is performed by the accelerator with respect to the particular packet (e.g., forwarding the packet, dropping the packet, etc.). In some embodiments, the packet direction 611 column may indicate a direction in which the packet is being transmitted. For example, an "outbound" identifier may indicate that the packet is being sent (e.g., outbound) from a host (e.g., associated with the NVD (e.g., host A 104)) to another host in a virtual network (e.g., host B 112 or host C 114 of FIG. 1). Meanwhile an "inbound" identifier may indicate that the packet is received by the smartNIC from another host (e.g., host C 114) and intended for forwarding to the particular host that offloads processing to the smartNIC (e.g., host A 104). It should be understood that, in some embodiments, a virtual host of host A 104 may transmit a data packet to another virtual host of host A 104 via the smartNIC. In this example, there may be two entries (e.g., outbound and inbound) entered into the table 600. It should be understood that any suitable nomenclature may be used to categorize traffic directions and/or data fields, in general. Continuing with the description of table 600 data field types, the packet header type 611 may indicate a type of header(s) that is present within the packet (e.g., an IP header, a MAC header, etc.). In some embodiments, the source address 615 and destination address 617 columns, respectively, may indicate an IP address for the origination host and destination host of the packet. In some embodiments, the additional information 619 column may indicate additional information about the flow and/or the packet being processed (e.g., a destination client application, a switch that the packet should be forwarded towards, a reason that the packet was dropped, a class of quality of service that a flow should receive, etc.). It should be understood that any suitable data fields may be included within a unified log. It should be further be understood that the unified log may be stored utilizing any suitable data structure and/or data format (e.g., a tree structure, instead of a table).

Turning to representative log entries (e.g., depicted as respective rows) of table 600 in further detail, log entry 602 may correspond to a log entry for a data packet that was received by the accelerator (e.g., from port Y 214 of FIG. 2) on 5/24/2021 at 6:59:00 AM. In some embodiments, log entry 602 (and log entry 604) are informational log entries (e.g., associated with packets for already-approved/managed flows). In some embodiments, as depicted in table 600, log entry 602 may indicate that the respective data packet was received by the smartNIC (e.g., inbound from source host B 112, which may have IP address 10.0.1.146) and forwarded to a host (e.g., destination host A 104 of FIG. 1, which may have IP address 10.0.1.201) that is connected to the smartNIC (e.g., via NIC 106). Meanwhile, log entry 604 may indicate that the respective data packet was received by the smartNIC from host A 104 for forwarding (e.g., outbound) to host B 112. In this example, host A 104 may maintain a web server, and the particular packet associated with log entry 602 may correspond to a request for a web page to be served from the web server (e.g., as indicated by additional information 619). Meanwhile, the outbound packet of log entry 604 may correspond to a response to the request for the web page, and the response may be routed via "Switch #1" of a plurality of potential switches.

In some embodiments, log entry 608 may represent another type of entry in which a data packet for a new flow is received by the accelerator. In this case, the data packet may be received from another source host (e.g., with IP address 10.0.1.148) and intended for forwarding to destination host A 104, with IP address 10.0.1.201. In this case, prior to generating the log entry 604, the accelerator may have transmitted the data packet to a programming data plane for further processing, as described herein. For example, the programming data plane may have approved the flow and generated an instruction for the accelerator to add the flow the accelerator cache, forward the data packet, and then log the data packet. As described herein, the instruction may be included within a modified packet, whereby an instruction header is added (e.g., prepended) to the existing data packet. The accelerator may then receive the modified packet from the programming data plane, generate log entry 608, and then forward the packet. In some embodiments, the instruction may be additionally (and/or alternatively) included within a separate control packet, as described herein. In the example of log entry 608, the instruction further includes information indicating that the newly approved flow is associated with a particular level of quality of service (QoS) (e.g., "class A" service), which may be higher (or lower) than other levels of service guaranteed to other flows. This information may be logged to the "additional information" data field. In some embodiments, this information may be used for future auditing, customer service reporting, network issue diagnosis, and/or any suitable purpose. As noted above, it should be understood that any suitable data may be logged.

In some embodiments, log entry 606, log entry 610, and log entry 612 may represent sample entries of packets that are respectively determined to be dropped. For example, with respect to log entry 606, an "alert" (e.g., warning) type of log entry is created (e.g., in log entry type 605 column), signifying an alert that a packet was dropped by the smartNIC, which may (or may not) prompt further investigation by an administrator. The corresponding data packet may have been received from another source host (e.g., host C 114), which may have a source address of 10.0.1.147, and whereby the packet is intended for destination host A 104 (e.g., with IP address 10.0.1.201). In this case, similar to as described herein, the accelerator may perform a lookup in the cache and determine that the packet is not associated with an allowed flow. The accelerator may transmit the packet to the programming data plane for further instructions. The programming data plane may determine that this particular source host IP address is not allowed to transmit packets to the destination host A 104 (e.g., due to an administrative policy). In some embodiments, the programming data plane may reference a security list (e.g., of allowed and/or disallowed addresses) to make this determination. The programming data plane may generate an instruction to log and drop this packet, and include the instruction in a modified packet that is transmitted to the accelerator. Upon receiving the modified packet, the accelerator may generate log entry 606, as depicted. Note that, in this example, the "additional information" 619 column indicates that the packet was dropped due to violating a security list policy.

In some embodiments, log entry 610 may be similar to log entry 606, for example, involving a data packet is dropped (and logged) by the accelerator upon receiving instructions within a modified packet from the programming data plane. In this case, the associated flow may be similar to (e.g., the same as) the flow associated with log entry 608. In this case, even though the associated flow may be an approved flow (e.g., with an associated accelerator cache entry), the particular data packet of log entry 610 may not conform to a particular flow policy. For example, the data packet may exceed an allowed rate (e.g., the rate corresponding to QoS class A, as described in reference to log entry 608). In another example, the data packet may include a payload that contains content that may violate a particular flow policy. Accordingly, the programming data plane may instruct the accelerator to drop the packet and also to log the packet (e.g., via log entry 610).

In some embodiments, and, as depicted in table 600, the accelerator (e.g., accelerator 405) may log the log entries sequentially (e.g., by date and time). Accordingly, log entry 612 may represent the most recent log entry of table 600. In some embodiments, log entry 612 may be similar to log entry 606, for example, whereby the accelerator logs and drops a data packet upon receiving instructions within a modified data packet from the programming data plane. In this case, the data packet is an "outbound" data packet that was originally sent by the host associated with the smartNIC (e.g., a virtual host of host A 104, with IP address 10.0.1.202), intended for host C 114 (e.g., destination IP address 10.0.1.147). The programming data plane may determine (e.g., based on the security list) that data packets from this source host should not be allowed to be transmitted to the particular destination host, and thus, may drop the packet.

It should be understood that, while various examples of log entries have been described with respect to table 600, any suitable data may be recorded/stored to a log entry of a unified log. Furthermore, a unified log may be structured, maintained, and/or updated according to any suitable method.

Figure 7:
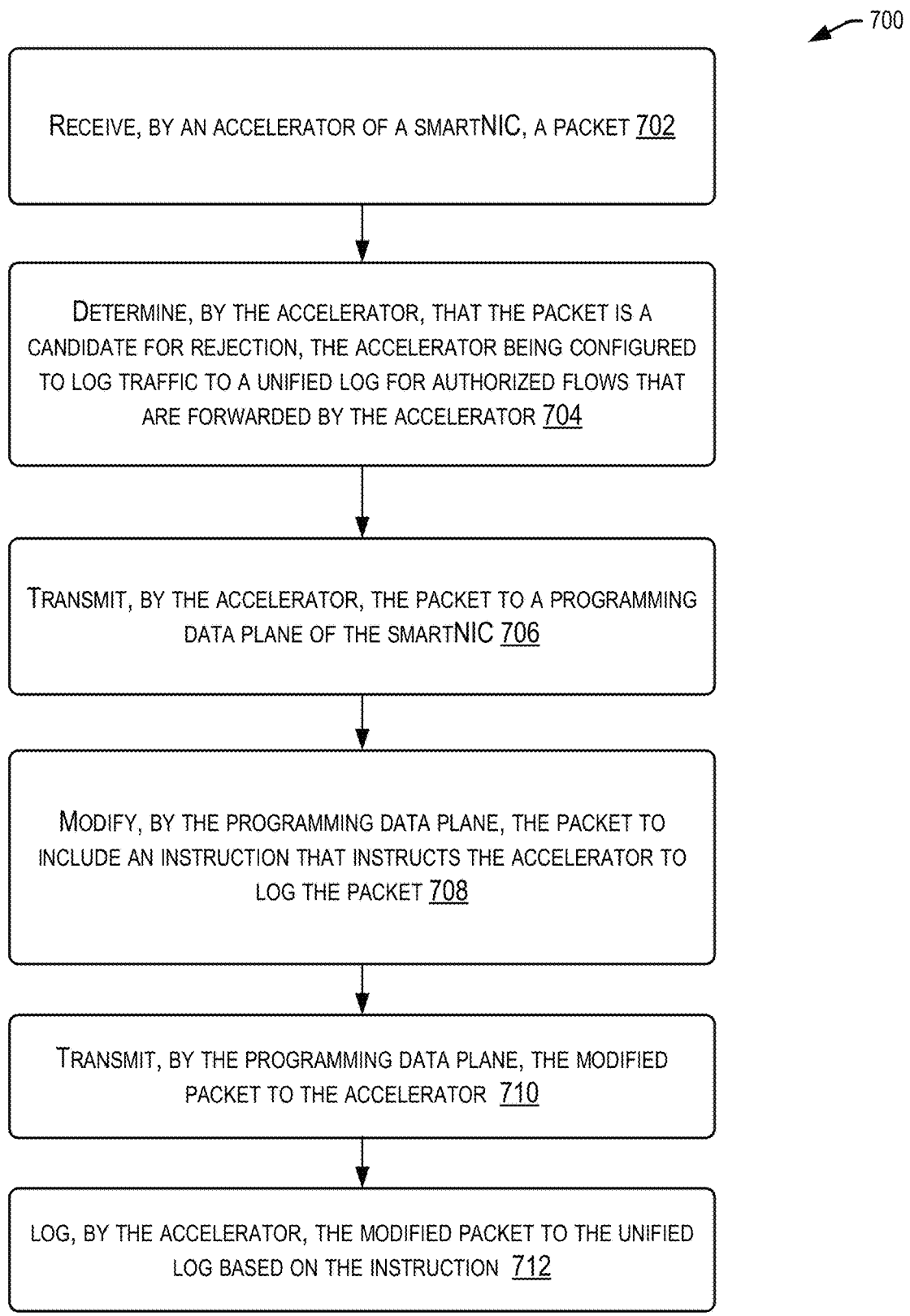
FIG. 7 is another simplified flow diagram illustrating an example process for efficiently coordinating unified logging among a plurality of planes of an NVD, according to some embodiments.

FIG. 7 is another simplified flow diagram illustrating an example process for efficiently coordinating unified logging among a plurality of planes of an NVD, according to some embodiments. In some embodiments, process 700 of FIG. 7 may be performed by an NVD (e.g., a smartNIC device), which may be similar to any of the NVD's described herein.

Process 700 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

At block 702, an accelerator of a smartNIC may receive a packet. In some embodiments, the packet may be intended (e.g., by a sending device, such as host B 112 of FIG. 1) for receipt by a destination device (e.g., host A 104). In some embodiments, the sending host may transmit the packet to the smartNIC for forwarding by the smartNIC to the destination host. It should be understood that the packet may be transmitted from any suitable recipient device (and/or virtual host, client application, etc.) to any suitable destination device (and/or virtual host, client application, etc.).

At block 704, the accelerator may determine that the packet is a candidate for rejection. For example, in some embodiments, the accelerator may maintain cache entries of a cache, whereby a cache entry stores flow state of a particular authorized flow. In this case, the accelerator may determine that the packet is not associated with an authorized flow (e.g., and thus, may be a candidate for rejection and/or further processing) based in part on determining that the packet is not associated with a cache entry of the cache. In another example, the accelerator may determine that the packet is associated with an authorized flow, but may require further processing to determine if the packet should be forwarded or rejected (e.g., dropped). For example, the accelerator may determine that the packet does not conform to a rule (e.g., a policy) that is programmed to a memory of the accelerator, and thus, may necessitate further processing (e.g., by a programming data plane). In some embodiments, the accelerator may be configured to log traffic to a unified log for authorized flows that are forwarded by the accelerator. In some embodiments, the accelerator may postpone a determination of whether and/or how to log traffic data for an incoming packet, pending further processing (e.g., by the programming data plane) for packets that are candidates for rejection.

At block 706, the accelerator may transmit the packet to the programming data plane of the smartNIC. For example, the accelerator may transmit the packet via a data bus that is configured to route packets that utilize a particular header format (e.g., IP header, etc.) between the accelerator and the programming data plane. In some embodiments, the data bus may include and/or utilize a NOC. In some embodiments, the packet may also be queued, as described in reference to FIGS. 2 and 4.

At block 708, the programming data plane may modify the packet to include an instruction that instructs the accelerator to log the packet. In some embodiments, the instruction may include any suitable one or more instructions for the accelerator to utilize in further processing of the packet. For example, the programming data plane may maintain a security list that includes, among other things, a list of approved (and/or disallowed) entities (e.g., hosts, IP addresses, client applications, etc.). In some embodiments, the programming data plane may determine that the packet should not be forwarded based at least in part on determining that the packet is not in conformance with a rule of the security list. In some embodiments, the programming data plane may implement any suitable list of rules and/or algorithms that are used to determine whether a packet should be forwarded, dropped, or otherwise processed (e.g., by the accelerator). In some embodiments, if the programming data plane determines that the packet should not be forwarded, it may include an instruction to not forward the packet within the modified packet (e.g., with an instruction header (e.g., a bitstring that includes a plurality/sequence of bits) of the modified packet). In some embodiments, the instruction header may be prepended or appended to the original data packet. In some embodiments, the original data packet may be modified in any suitable way to include the instruction. In some embodiments, the programming data plane may determine to forward the packet, and include that information within the instruction. In some embodiments, the instruction may include information regarding whether the accelerator should log the packet (e.g., to the unified log). In some embodiments, the instruction may instruct the accelerator to log data associated with the modified packet (and, thus, associated with the original data packet) even though the instruction further instructs the accelerator to drop the packet. In this way, the accelerator and the programming data plane may efficiently coordinate logging to the unified log, whereby both forwarded packets and dropped packets may be logged to the unified log.

At block 710, the programming data plane may transmit the modified packet to the accelerator. In some embodiments, as described in reference to FIGS. 2 and 4, the programming data plane may transmit the modified packet via the data bus and/or a queueing mechanism. In some embodiments, the programming data plane may transmit the modified packet by invoking one or more functions of an API (e.g., accessible via a shared memory, that is shared between the accelerator and the programming data plane).

At block 712, the accelerator may log the modified packet to the unified log based on the instruction. In some embodiments, as described in reference to FIG. 6, the accelerator may log metadata associated with the modified packet to the unified log. In some embodiments, the metadata may include packet header information (e.g., included within the instruction header, the IP header, the MAC header, etc.). In some embodiments, the accelerator may log to the unified log any other suitable data, including, but not limited to, data obtained from the packet payload, data obtained from other modules of the smartNIC (e.g., indicating a port and/or switch that the packet was originally received at/from), data obtained from the accelerator cache, etc. In some embodiments, depending on the instruction, the packet may forward (or not forward) the packet to the intended destination host. In some embodiments, the accelerator may log the packet at any suitable time (e.g., before or after dropping (or forwarding) the packet). In some embodiments, the programming data plane may subsequently retrieve the unified log. For example, the unified log may be copied by the accelerator to shared memory, whereby the programming data plane reads the unified log and generates a statistics report based on the log. For example, in some embodiments, each log entry for a packet may include a flow counter that may be associated with a particular flow. For multiple log entries for the same particular flow, the flow counters (e.g., a first flow counter, a second flow counter, etc.) may be aggregated and included within the statistics report. It should be understood that any suitable statistic information may be computed for inclusion within the statistics report. In some embodiments, by maintaining a unified log as described herein, the smartNIC may more efficiently generate and report aggregate flow statistics to customers (e.g., end-user customers, administrators of the network, etc.).

The term cloud service is generally used to refer to a service that is made available by a cloud services provider (CSP) to users or customers on demand (e.g., via a subscription model) using systems and infrastructure (cloud infrastructure) provided by the CSP. Typically, the servers and systems that make up the CSP's infrastructure are separate from the customer's own on-premise servers and systems. Customers can thus avail themselves of cloud services provided by the CSP without having to purchase separate hardware and software resources for the services. Cloud services are designed to provide a subscribing customer easy, scalable access to applications and computing resources without the customer having to invest in procuring the infrastructure that is used for providing the services.

There are several cloud service providers that offer various types of cloud services. There are various different types or models of cloud services including Software-as-a-Service (SaaS), Platform-as-a-Service (PaaS), Infrastructure-as-a-Service (IaaS), and others.

A customer can subscribe to one or more cloud services provided by a CSP. The customer can be any entity such as an individual, an organization, an enterprise, and the like. When a customer subscribes to or registers for a service provided by a CSP, a tenancy or an account is created for that customer. The customer can then, via this account, access the subscribed-to one or more cloud resources associated with the account.

As noted above, infrastructure as a service (IaaS) is one particular type of cloud computing service. In an IaaS model, the CSP provides infrastructure (referred to as cloud services provider infrastructure or CSPI) that can be used by customers to build their own customizable networks and deploy customer resources. The customer's resources and networks are thus hosted in a distributed environment by infrastructure provided by a CSP. This is different from traditional computing, where the customer's resources and networks are hosted by infrastructure provided by the customer.

The CSPI may comprise interconnected high-performance compute resources including various host machines, memory resources, and network resources that form a physical network, which is also referred to as a substrate network or an underlay network. The resources in CSPI may be spread across one or more data centers that may be geographically spread across one or more geographical regions. Virtualization software may be executed by these physical resources to provide a virtualized distributed environment. The virtualization creates an overlay network (also known as a software-based network, a software-defined network, or a virtual network) over the physical network. The CSPI physical network provides the underlying basis for creating one or more overlay or virtual networks on top of the physical network. The virtual or overlay networks can include one or more virtual cloud networks (VCNs). The virtual networks are implemented using software virtualization technologies (e.g., hypervisors, functions performed by network virtualization devices (NVDs) (e.g., smartNICs), top-of-rack (TOR) switches, smart TORs that implement one or more functions performed by an NVD, and other mechanisms) to create layers of network abstraction that can be run on top of the physical network. Virtual networks can take on many forms, including peer-to-peer networks, IP networks, and others. Virtual networks are typically either Layer-3 IP networks or Layer-2 VLANs. This method of virtual or overlay networking is often referred to as virtual or overlay Layer-3 networking. Examples of protocols developed for virtual networks include IP-in-IP (or Generic Routing Encapsulation (GRE)), Virtual Extensible LAN (VXLAN IETF RFC 7348), Virtual Private Networks (VPNs) (e.g., MPLS Layer-3 Virtual Private Networks (RFC 4364)), VMware's NSX, GENEVE (Generic Network Virtualization Encapsulation), and others.

For IaaS, the infrastructure (CSPI) provided by a CSP can be configured to provide virtualized computing resources over a public network (e.g., the Internet). In an IaaS model, a cloud computing services provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance. CSPI provides infrastructure and a set of complementary cloud services that enable customers to build and run a wide range of applications and services in a highly available hosted distributed environment. CSPI offers high-performance compute resources and capabilities and storage capacity in a flexible virtual network that is securely accessible from various networked locations such as from a customer's on-premises network. When a customer subscribes to or registers for an IaaS service provided by a CSP, the tenancy created for that customer is a secure and isolated partition within the CSPI where the customer can create, organize, and administer their cloud resources.

Customers can build their own virtual networks using compute, memory, and networking resources provided by CSPI. One or more customer resources or workloads, such as compute instances, can be deployed on these virtual networks. For example, a customer can use resources provided by CSPI to build one or multiple customizable and private virtual network(s) referred to as virtual cloud networks (VCNs). A customer can deploy one or more customer resources, such as compute instances, on a customer VCN. Compute instances can take the form of virtual machines, bare metal instances, and the like. The CSPI thus provides infrastructure and a set of complementary cloud services that enable customers to build and run a wide range of applications and services in a highly available virtual hosted environment. The customer does not manage or control the underlying physical resources provided by CSPI but has control over operating systems, storage, and deployed applications; and possibly limited control of select networking components (e.g., firewalls).

The CSP may provide a console that enables customers and network administrators to configure, access, and manage resources deployed in the cloud using CSPI resources. In certain embodiments, the console provides a web-based user interface that can be used to access and manage CSPJ. In some implementations, the console is a web-based application provided by the CSP.

CSPI may support single-tenancy or multi-tenancy architectures. In a single tenancy architecture, a software (e.g., an application, a database) or a hardware component (e.g., a host machine or a server) serves a single customer or tenant. In a multi-tenancy architecture, a software or a hardware component serves multiple customers or tenants. Thus, in a multi-tenancy architecture, CSPI resources are shared between multiple customers or tenants. In a multi-tenancy situation, precautions are taken and safeguards put in place within CSPI to ensure that each tenant's data is isolated and remains invisible to other tenants.

In a physical network, a network endpoint ("endpoint") refers to a computing device or system that is connected to a physical network and communicates back and forth with the network to which it is connected. A network endpoint in the physical network may be connected to a Local Area Network (LAN), a Wide Area Network (WAN), or other type of physical network. Examples of traditional endpoints in a physical network include modems, hubs, bridges, switches, routers, and other networking devices, physical computers (or host machines), and the like. Each physical device in the physical network has a fixed network address that can be used to communicate with the device. This fixed network address can be a Layer-2 address (e.g., a MAC address), a fixed Layer-3 address (e.g., an IP address), and the like. In a virtualized environment or in a virtual network, the endpoints can include various virtual endpoints such as virtual machines that are hosted by components of the physical network (e.g., hosted by physical host machines). These endpoints in the virtual network are addressed by overlay addresses such as overlay Layer-2 addresses (e.g., overlay MAC addresses) and overlay Layer-3 addresses (e.g., overlay IP addresses). Network overlays enable flexibility by allowing network managers to move around the overlay addresses associated with network endpoints using software management (e.g., via software implementing a control plane for the virtual network). Accordingly, unlike in a physical network, in a virtual network, an overlay address (e.g., an overlay IP address) can be moved from one endpoint to another using network management software. Since the virtual network is built on top of a physical network, communications between components in the virtual network involves both the virtual network and the underlying physical network. In order to facilitate such communications, the components of CSPI are configured to learn and store mappings that map overlay addresses in the virtual network to actual physical addresses in the substrate network, and vice versa. These mappings are then used to facilitate the communications. Customer traffic is encapsulated to facilitate routing in the virtual network.

Accordingly, physical addresses (e.g., physical IP addresses) are associated with components in physical networks and overlay addresses (e.g., overlay IP addresses) are associated with entities in virtual networks. Both the physical IP addresses and overlay IP addresses are types of real IP addresses. These are separate from virtual IP addresses, where a virtual IP address maps to multiple real IP addresses. A virtual IP address provides a 1-to-many mapping between the virtual IP address and multiple real IP addresses.

The cloud infrastructure or CSPI is physically hosted in one or more data centers in one or more regions around the world. The CSPI may include components in the physical or substrate network and virtualized components (e.g., virtual networks, compute instances, virtual machines, etc.) that are in an virtual network built on top of the physical network components. In certain embodiments, the CSPI is organized and hosted in realms, regions and availability domains. A region is typically a localized geographic area that contains one or more data centers. Regions are generally independent of each other and can be separated by vast distances, for example, across countries or even continents. For example, a first region may be in Australia, another one in Japan, yet another one in India, and the like. CSPI resources are divided among regions such that each region has its own independent subset of CSPI resources. Each region may provide a set of core infrastructure services and resources, such as, compute resources (e.g., bare metal servers, virtual machine, containers and related infrastructure, etc.); storage resources (e.g., block volume storage, file storage, object storage, archive storage); networking resources (e.g., virtual cloud networks (VCNs), load balancing resources, connections to on-premise networks), database resources; edge networking resources (e.g., DNS); and access management and monitoring resources, and others. Each region generally has multiple paths connecting it to other regions in the realm.

Generally, an application is deployed in a region (i.e., deployed on infrastructure associated with that region) where it is most heavily used, because using nearby resources is faster than using distant resources. Applications can also be deployed in different regions for various reasons, such as redundancy to mitigate the risk of region-wide events such as large weather systems or earthquakes, to meet varying requirements for legal jurisdictions, tax domains, and other business or social criteria, and the like.

The data centers within a region can be further organized and subdivided into availability domains (ADs). An availability domain may correspond to one or more data centers located within a region. A region can be composed of one or more availability domains. In such a distributed environment, CSPI resources are either region-specific, such as a virtual cloud network (VCN), or availability domain-specific, such as a compute instance.

ADs within a region are isolated from each other, fault tolerant, and are configured such that they are very unlikely to fail simultaneously. This is achieved by the ADs not sharing critical infrastructure resources such as networking, physical cables, cable paths, cable entry points, etc., such that a failure at one AD within a region is unlikely to impact the availability of the other ADs within the same region. The ADs within the same region may be connected to each other by a low latency, high bandwidth network, which makes it possible to provide high-availability connectivity to other networks (e.g., the Internet, customers' on-premise networks, etc.) and to build replicated systems in multiple ADs for both high-availability and disaster recovery. Cloud services use multiple ADs to ensure high availability and to protect against resource failure. As the infrastructure provided by the IaaS provider grows, more regions and ADs may be added with additional capacity. Traffic between availability domains is usually encrypted.

In certain embodiments, regions are grouped into realms. A realm is a logical collection of regions. Realms are isolated from each other and do not share any data. Regions in the same realm may communicate with each other, but regions in different realms cannot. A customer's tenancy or account with the CSP exists in a single realm and can be spread across one or more regions that belong to that realm. Typically, when a customer subscribes to an IaaS service, a tenancy or account is created for that customer in the customer-specified region (referred to as the "home" region) within a realm. A customer can extend the customer's tenancy across one or more other regions within the realm. A customer cannot access regions that are not in the realm where the customer's tenancy exists.

An IaaS provider can provide multiple realms, each realm catered to a particular set of customers or users. For example, a commercial realm may be provided for commercial customers. As another example, a realm may be provided for a specific country for customers within that country. As yet another example, a government realm may be provided for a government, and the like. For example, the government realm may be catered for a specific government and may have a heightened level of security than a commercial realm. For example, Oracle Cloud Infrastructure (OCI) currently offers a realm for commercial regions and two realms (e.g., FedRAMP authorized and IL5 authorized) for government cloud regions.

In certain embodiments, an AD can be subdivided into one or more fault domains. A fault domain is a grouping of infrastructure resources within an AD to provide anti-affinity. Fault domains allow for the distribution of compute instances such that the instances are not on the same physical hardware within a single AD. This is known as anti-affinity. A fault domain refers to a set of hardware components (computers, switches, and more) that share a single point of failure. A compute pool is logically divided up into fault domains. Due to this, a hardware failure or compute hardware maintenance event that affects one fault domain does not affect instances in other fault domains. Depending on the embodiment, the number of fault domains for each AD may vary. For instance, in certain embodiments each AD contains three fault domains. A fault domain acts as a logical data center within an AD.

When a customer subscribes to an IaaS service, resources from CSPI are provisioned for the customer and associated with the customer's tenancy. The customer can use these provisioned resources to build private networks and deploy resources on these networks. The customer networks that are hosted in the cloud by the CSPI are referred to as virtual cloud networks (VCNs). A customer can set up one or more virtual cloud networks (VCNs) using CSPI resources allocated for the customer. A VCN is a virtual or software defined private network. The customer resources that are deployed in the customer's VCN can include compute instances (e.g., virtual machines, bare-metal instances) and other resources. These compute instances may represent various customer workloads such as applications, load balancers, databases, and the like. A compute instance deployed on a VCN can communicate with public accessible endpoints ("public endpoints") over a public network such as the Internet, with other instances in the same VCN or other VCNs (e.g., the customer's other VCNs, or VCNs not belonging to the customer), with the customer's on-premise data centers or networks, and with service endpoints, and other types of endpoints.

The CSP may provide various services using the CSPI. In some instances, customers of CSPI may themselves act like service providers and provide services using CSPI resources. A service provider may expose a service endpoint, which is characterized by identification information (e.g., an IP Address, a DNS name and port). A customer's resource (e.g., a compute instance) can consume a particular service by accessing a service endpoint exposed by the service for that particular service. These service endpoints are generally endpoints that are publicly accessible by users using public IP addresses associated with the endpoints via a public communication network such as the Internet. Network endpoints that are publicly accessible are also sometimes referred to as public endpoints.

In certain embodiments, a service provider may expose a service via an endpoint (sometimes referred to as a service endpoint) for the service. Customers of the service can then use this service endpoint to access the service. In certain implementations, a service endpoint provided for a service can be accessed by multiple customers that intend to consume that service. In other implementations, a dedicated service endpoint may be provided for a customer such that only that customer can access the service using that dedicated service endpoint.

In certain embodiments, when a VCN is created, it is associated with a private overlay Classless Inter-Domain Routing (CIDR) address space, which is a range of private overlay IP addresses that are assigned to the VCN (e.g., 10.0/16). A VCN includes associated subnets, route tables, and gateways. A VCN resides within a single region but can span one or more or all of the region's availability domains. A gateway is a virtual interface that is configured for a VCN and enables communication of traffic to and from the VCN to one or more endpoints outside the VCN. One or more different types of gateways may be configured for a VCN to enable communication to and from different types of endpoints.

A VCN can be subdivided into one or more sub-networks such as one or more subnets. A subnet is thus a unit of configuration or a subdivision that can be created within a VCN. A VCN can have one or multiple subnets. Each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN.

Each compute instance is associated with a virtual network interface card (VNIC), that enables the compute instance to participate in a subnet of a VCN. A VNIC is a logical representation of physical Network Interface Card (NIC). In general. a VNIC is an interface between an entity (e.g., a compute instance, a service) and a virtual network. A VNIC exists in a subnet, has one or more associated IP addresses, and associated security rules or policies. A VNIC is equivalent to a Layer-2 port on a switch. A VNIC is attached to a compute instance and to a subnet within a VCN. A VNIC associated with a compute instance enables the compute instance to be a part of a subnet of a VCN and enables the compute instance to communicate (e.g., send and receive packets) with endpoints that are on the same subnet as the compute instance, with endpoints in different subnets in the VCN, or with endpoints outside the VCN. The VNIC associated with a compute instance thus determines how the compute instance connects with endpoints inside and outside the VCN. A VNIC for a compute instance is created and associated with that compute instance when the compute instance is created and added to a subnet within a VCN. For a subnet comprising a set of compute instances, the subnet contains the VNICs corresponding to the set of compute instances, each VNIC attached to a compute instance within the set of computer instances.

Each compute instance is assigned a private overlay IP address via the VNIC associated with the compute instance. This private overlay IP address is assigned to the VNIC that is associated with the compute instance when the compute instance is created and used for routing traffic to and from the compute instance. All VNICs in a given subnet use the same route table, security lists, and DHCP options. As described above, each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN. For a VNIC on a particular subnet of a VCN, the private overlay IP address that is assigned to the VNIC is an address from the contiguous range of overlay IP addresses allocated for the subnet.

In certain embodiments, a compute instance may optionally be assigned additional overlay IP addresses in addition to the private overlay IP address, such as, for example, one or more public IP addresses if in a public subnet. These multiple addresses are assigned either on the same VNIC or over multiple VNICs that are associated with the compute instance. Each instance however has a primary VNIC that is created during instance launch and is associated with the overlay private IP address assigned to the instance—this primary VNIC cannot be removed. Additional VNICs, referred to as secondary VNICs, can be added to an existing instance in the same availability domain as the primary VNIC. All the VNICs are in the same availability domain as the instance. A secondary VNIC can be in a subnet in the same VCN as the primary VNIC, or in a different subnet that is either in the same VCN or a different one.

A compute instance may optionally be assigned a public IP address if it is in a public subnet. A subnet can be designated as either a public subnet or a private subnet at the time the subnet is created. A private subnet means that the resources (e.g., compute instances) and associated VNICs in the subnet cannot have public overlay IP addresses. A public subnet means that the resources and associated VNICs in the subnet can have public IP addresses. A customer can designate a subnet to exist either in a single availability domain or across multiple availability domains in a region or realm.

As described above, a VCN may be subdivided into one or more subnets. In certain embodiments, a Virtual Router (VR) configured for the VCN (referred to as the VCN VR or just VR) enables communications between the subnets of the VCN. For a subnet within a VCN, the VR represents a logical gateway for that subnet that enables the subnet (i.e., the compute instances on that subnet) to communicate with endpoints on other subnets within the VCN, and with other endpoints outside the VCN. The VCN VR is a logical entity that is configured to route traffic between VNICs in the VCN and virtual gateways ("gateways") associated with the VCN. Gateways are further described below with respect to FIG. 1. A VCN VR is a Layer-3/IP Layer concept. In one embodiment, there is one VCN VR for a VCN where the VCN VR has potentially an unlimited number of ports addressed by IP addresses, with one port for each subnet of the VCN. In this manner, the VCN VR has a different IP address for each subnet in the VCN that the VCN VR is attached to. The VR is also connected to the various gateways configured for a VCN. In certain embodiments, a particular overlay IP address from the overlay IP address range for a subnet is reserved for a port of the VCN VR for that subnet. For example, consider a VCN having two subnets with associated address ranges 10.0/16 and 10.1/16, respectively. For the first subnet within the VCN with address range 10.0/16, an address from this range is reserved for a port of the VCN VR for that subnet. In some instances, the first IP address from the range may be reserved for the VCN VR. For example, for the subnet with overlay IP address range 10.0/16, IP address 10.0.0.1 may be reserved for a port of the VCN VR for that subnet. For the second subnet within the same VCN with address range 10.1/16, the VCN VR may have a port for that second subnet with IP address 10.1.0.1. The VCN VR has a different IP address for each of the subnets in the VCN.

In some other embodiments, each subnet within a VCN may have its own associated VR that is addressable by the subnet using a reserved or default IP address associated with the VR. The reserved or default IP address may, for example, be the first IP address from the range of IP addresses associated with that subnet. The VNICs in the subnet can communicate (e.g., send and receive packets) with the VR associated with the subnet using this default or reserved IP address. In such an embodiment, the VR is the ingress/egress point for that subnet. The VR associated with a subnet within the VCN can communicate with other VRs associated with other subnets within the VCN. The VRs can also communicate with gateways associated with the VCN. The VR function for a subnet is running on or executed by one or more NVDs executing VNICs functionality for VNICs in the subnet.

Route tables, security rules, and DHCP options may be configured for a VCN. Route tables are virtual route tables for the VCN and include rules to route traffic from subnets within the VCN to destinations outside the VCN by way of gateways or specially configured instances. A VCN's route tables can be customized to control how packets are forwarded/routed to and from the VCN. DHCP options refers to configuration information that is automatically provided to the instances when they boot up.

Security rules configured for a VCN represent overlay firewall rules for the VCN. The security rules can include ingress and egress rules, and specify the types of traffic (e.g., based upon protocol and port) that is allowed in and out of the instances within the VCN. The customer can choose whether a given rule is stateful or stateless. For instance, the customer can allow incoming SSH traffic from anywhere to a set of instances by setting up a stateful ingress rule with source CIDR 0.0.0.0/0, and destination TCP port 22. Security rules can be implemented using network security groups or security lists. A network security group consists of a set of security rules that apply only to the resources in that group. A security list, on the other hand, includes rules that apply to all the resources in any subnet that uses the security list. A VCN may be provided with a default security list with default security rules. DHCP options configured for a VCN provide configuration information that is automatically provided to the instances in the VCN when the instances boot up.

In certain embodiments, the configuration information for a VCN is determined and stored by a VCN Control Plane. The configuration information for a VCN may include, for example, information about: the address range associated with the VCN, subnets within the VCN and associated information, one or more VRs associated with the VCN, compute instances in the VCN and associated VNICs, NVDs executing the various virtualization network functions (e.g., VNICs, VRs, gateways) associated with the VCN, state information for the VCN, and other VCN-related information. In certain embodiments, a VCN Distribution Service publishes the configuration information stored by the VCN Control Plane, or portions thereof, to the NVDs. The distributed information may be used to update information (e.g., forwarding tables, routing tables, etc.) stored and used by the NVDs to forward packets to and from the compute instances in the VCN.

In certain embodiments, the creation of VCNs and subnets are handled by a VCN Control Plane (CP) and the launching of compute instances is handled by a Compute Control Plane. The Compute Control Plane is responsible for allocating the physical resources for the compute instance and then calls the VCN Control Plane to create and attach VNICs to the compute instance. The VCN CP also sends VCN data mappings to the VCN data plane that is configured to perform packet forwarding and routing functions. In certain embodiments, the VCN CP provides a distribution service that is responsible for providing updates to the VCN data plane. Examples of a VCN Control Plane are also depicted in FIGS. 13, 1414, 15, and 16 (see references 1316, 141416, 1516, and 1616) and described below.

A customer may create one or more VCNs using resources hosted by CSPI. A compute instance deployed on a customer VCN may communicate with different endpoints. These endpoints can include endpoints that are hosted by CSPI and endpoints outside CSPI.

Figure 8:
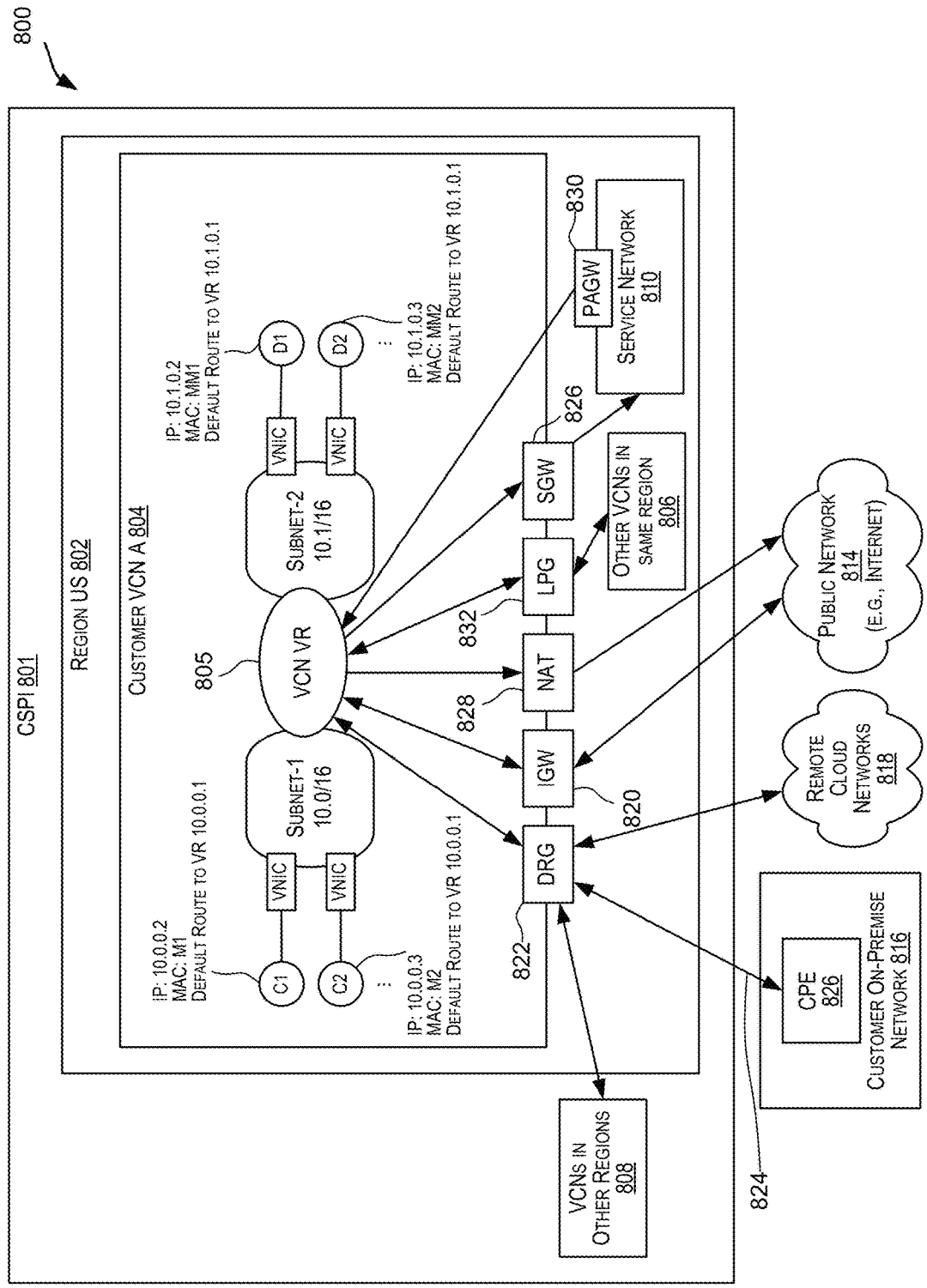
FIG. 8 is a high level diagram of a distributed environment showing a virtual or overlay cloud network hosted by a cloud service provider infrastructure according to certain embodiments.

Various different architectures for implementing cloud-based service using CSPI are depicted in FIGS. 8, 9, 10, 11, 12, 13, 14, 15, and 17, and are described below. FIG. 8 is a high level diagram of a distributed environment 800 showing an overlay or customer VCN hosted by CSPI according to certain embodiments. The distributed environment depicted in FIG. 8 includes multiple components in the overlay network. Distributed environment 800 depicted in FIG. 8 is merely an example and is not intended to unduly limit the scope of claimed embodiments. Many variations, alternatives, and modifications are possible. For example, in some implementations, the distributed environment depicted in FIG. 8 may have more or fewer systems or components than those shown in FIG. 1, may combine two or more systems, or may have a different configuration or arrangement of systems.

As shown in the example depicted in FIG. 8, distributed environment 800 comprises CSPI 801 that provides services and resources that customers can subscribe to and use to build their virtual cloud networks (VCNs). In certain embodiments, CSPI 801 offers IaaS services to subscribing customers. The data centers within CSPI 801 may be organized into one or more regions. One example region "Region US" 802 is shown in FIG. 8. A customer has configured a customer VCN 804 for region 802. The customer may deploy various compute instances on VCN 804, where the compute instances may include virtual machines or bare metal instances. Examples of instances include applications, database, load balancers, and the like.

In the embodiment depicted in FIG. 8, customer VCN 804 comprises two subnets, namely, "Subnet-1" and "Subnet-2", each subnet with its own CIDR IP address range. In FIG. 8, the overlay IP address range for Subnet-1 is 10.0/16 and the address range for Subnet-2 is 10.1/16. A VCN Virtual Router 805 represents a logical gateway for the VCN that enables communications between subnets of the VCN 804, and with other endpoints outside the VCN. VCN VR 805 is configured to route traffic between VNICs in VCN 804 and gateways associated with VCN 804. VCN VR 805 provides a port for each subnet of VCN 804. For example, VR 805 may provide a port with IP address 10.0.0.1 for Subnet-1 and a port with IP address 10.1.0.1 for Subnet-2.

Multiple compute instances may be deployed on each subnet, where the compute instances can be virtual machine instances, and/or bare metal instances. The compute instances in a subnet may be hosted by one or more host machines within CSPI 801. A compute instance participates in a subnet via a VNIC associated with the compute instance. For example, as shown in FIG. 8, a compute instance C1 is part of Subnet-1 via a VNIC associated with the compute instance. Likewise, compute instance C2 is part of Subnet-1 via a VNIC associated with C2. In a similar manner, multiple compute instances, which may be virtual machine instances or bare metal instances, may be part of Subnet-1. Via its associated VNIC, each compute instance is assigned a private overlay IP address and a MAC address. For example, in FIG. 8, compute instance C1 has an overlay IP address of 10.0.0.2 and a MAC address of M1, while compute instance C2 has an private overlay IP address of 10.0.0.3 and a MAC address of M2. Each compute instance in Subnet-1, including compute instances C1 and C2, has a default route to VCN VR 805 using IP address 10.0.0.1, which is the IP address for a port of VCN VR 805 for Subnet-1.

Subnet-2 can have multiple compute instances deployed on it, including virtual machine instances and/or bare metal instances. For example, as shown in FIG. 8, compute instances D1 and D2 are part of Subnet-2 via VNICs associated with the respective compute instances. In the embodiment depicted in FIG. 8, compute instance D1 has an overlay IP address of 10.1.0.2 and a MAC address of MM1, while compute instance D2 has an private overlay IP address of 10.1.0.3 and a MAC address of MM2. Each compute instance in Subnet-2, including compute instances D1 and D2, has a default route to VCN VR 805 using IP address 10.1.0.1, which is the IP address for a port of VCN VR 805 for Subnet-2.

VCN A 804 may also include one or more load balancers. For example, a load balancer may be provided for a subnet and may be configured to load balance traffic across multiple compute instances on the subnet. A load balancer may also be provided to load balance traffic across subnets in the VCN.

A particular compute instance deployed on VCN 804 can communicate with various different endpoints. These endpoints may include endpoints that are hosted by CSPI 900 and endpoints outside CSPI 900. Endpoints that are hosted by CSPI 801 may include: an endpoint on the same subnet as the particular compute instance (e.g., communications between two compute instances in Subnet-1); an endpoint on a different subnet but within the same VCN (e.g., communication between a compute instance in Subnet-1 and a compute instance in Subnet-2); an endpoint in a different VCN in the same region (e.g., communications between a compute instance in Subnet-1 and an endpoint in a VCN in the same region 806 or 810, communications between a compute instance in Subnet-1 and an endpoint in service network 810 in the same region); or an endpoint in a VCN in a different region (e.g., communications between a compute instance in Subnet-1 and an endpoint in a VCN in a different region 808). A compute instance in a subnet hosted by CSPI 801 may also communicate with endpoints that are not hosted by CSPI 801 (i.e., are outside CSPI 801). These outside endpoints include endpoints in the customer's on-premise network 816, endpoints within other remote cloud hosted networks 818, public endpoints 814 accessible via a public network such as the Internet, and other endpoints.

Communications between compute instances on the same subnet are facilitated using VNICs associated with the source compute instance and the destination compute instance. For example, compute instance C1 in Subnet-1 may want to send packets to compute instance C2 in Subnet-1. For a packet originating at a source compute instance and whose destination is another compute instance in the same subnet, the packet is first processed by the VNIC associated with the source compute instance. Processing performed by the VNIC associated with the source compute instance can include determining destination information for the packet from the packet headers, identifying any policies (e.g., security lists) configured for the VNIC associated with the source compute instance, determining a next hop for the packet, performing any packet encapsulation/decapsulation functions as needed, and then forwarding/routing the packet to the next hop with the goal of facilitating communication of the packet to its intended destination. When the destination compute instance is in the same subnet as the source compute instance, the VNIC associated with the source compute instance is configured to identify the VNIC associated with the destination compute instance and forward the packet to that VNIC for processing. The VNIC associated with the destination compute instance is then executed and forwards the packet to the destination compute instance.

For a packet to be communicated from a compute instance in a subnet to an endpoint in a different subnet in the same VCN, the communication is facilitated by the VNICs associated with the source and destination compute instances and the VCN VR. For example, if compute instance C1 in Subnet-1 in FIG. 8 wants to send a packet to compute instance D1 in Subnet-2, the packet is first processed by the VNIC associated with compute instance C1. The VNIC associated with compute instance C1 is configured to route the packet to the VCN VR 805 using default route or port 10.0.0.1 of the VCN VR. VCN VR 805 is configured to route the packet to Subnet-2 using port 10.1.0.1. The packet is then received and processed by the VNIC associated with D1 and the VNIC forwards the packet to compute instance D1.

For a packet to be communicated from a compute instance in VCN 804 to an endpoint that is outside VCN 804, the communication is facilitated by the VNIC associated with the source compute instance, VCN VR 805, and gateways associated with VCN 804. One or more types of gateways may be associated with VCN 804. A gateway is an interface between a VCN and another endpoint, where the another endpoint is outside the VCN. A gateway is a Layer-3/IP layer concept and enables a VCN to communicate with endpoints outside the VCN. A gateway thus facilitates traffic flow between a VCN and other VCNs or networks. Various different types of gateways may be configured for a VCN to facilitate different types of communications with different types of endpoints. Depending upon the gateway, the communications may be over public networks (e.g., the Internet) or over private networks. Various communication protocols may be used for these communications.

For example, compute instance C1 may want to communicate with an endpoint outside VCN 804. The packet may be first processed by the VNIC associated with source compute instance C1. The VNIC processing determines that the destination for the packet is outside the Subnet-1 of CL. The VNIC associated with C1 may forward the packet to VCN VR 805 for VCN 804. VCN VR 805 then processes the packet and as part of the processing, based upon the destination for the packet, determines a particular gateway associated with VCN 804 as the next hop for the packet. VCN VR 805 may then forward the packet to the particular identified gateway. For example, if the destination is an endpoint within the customer's on-premise network, then the packet may be forwarded by VCN VR 805 to Dynamic Routing Gateway (DRG) gateway 822 configured for VCN 804. The packet may then be forwarded from the gateway to a next hop to facilitate communication of the packet to it final intended destination.

Various different types of gateways may be configured for a VCN. Examples of gateways that may be configured for a VCN are depicted in FIG. 8 and described below. Examples of gateways associated with a VCN are also depicted in FIGS. 13, 14, 15, and 16 (for example, gateways referenced by reference numbers 1334, 1336, 1338, 1434, 1436, 1438, 1534, 1536, 1538, 1634, 1636, and 1638) and described below. As shown in the embodiment depicted in FIG. 8, a Dynamic Routing Gateway (DRG) 822 may be added to or be associated with customer VCN 804 and provides a path for private network traffic communication between customer VCN 804 and another endpoint, where the another endpoint can be the customer's on-premise network 816, a VCN 808 in a different region of CSPI 801, or other remote cloud networks 818 not hosted by CSPI 801. Customer on-premise network 816 may be a customer network or a customer data center built using the customer's resources. Access to customer on-premise network 816 is generally very restricted. For a customer that has both a customer on-premise network 816 and one or more VCNs 804 deployed or hosted in the cloud by CSPI 801, the customer may want their on-premise network 816 and their cloud-based VCN 804 to be able to communicate with each other. This enables a customer to build an extended hybrid environment encompassing the customer's VCN 804 hosted by CSPI 801 and their on-premises network 816. DRG 822 enables this communication. To enable such communications, a communication channel 824 is set up where one endpoint of the channel is in customer on-premise network 816 and the other endpoint is in CSPI 801 and connected to customer VCN 804. Communication channel 824 can be over public communication networks such as the Internet or private communication networks. Various different communication protocols may be used such as IPsec VPN technology over a public communication network such as the Internet, Oracle's FastConnect technology that uses a private network instead of a public network, and others. The device or equipment in customer on-premise network 816 that forms one end point for communication channel 824 is referred to as the customer premise equipment (CPE), such as CPE 826 depicted in FIG. 8. On the CSPI 801 side, the endpoint may be a host machine executing DRG 822.

In certain embodiments, a Remote Peering Connection (RPC) can be added to a DRG, which allows a customer to peer one VCN with another VCN in a different region. Using such an RPC, customer VCN 804 can use DRG 822 to connect with a VCN 808 in another region. DRG 822 may also be used to communicate with other remote cloud networks 818, not hosted by CSPI 801 such as a Microsoft Azure cloud, Amazon AWS cloud, and others.

As shown in FIG. 8, an Internet Gateway (IGW) 820 may be configured for customer VCN 804 the enables a compute instance on VCN 804 to communicate with public endpoints 814 accessible over a public network such as the Internet. IGW 8120 is a gateway that connects a VCN to a public network such as the Internet. IGW 820 enables a public subnet (where the resources in the public subnet have public overlay IP addresses) within a VCN, such as VCN 804, direct access to public endpoints 812 on a public network 814 such as the Internet. Using IGW 820, connections can be initiated from a subnet within VCN 804 or from the Internet.

A Network Address Translation (NAT) gateway 828 can be configured for customer's VCN 804 and enables cloud resources in the customer's VCN, which do not have dedicated public overlay IP addresses, access to the Internet and it does so without exposing those resources to direct incoming Internet connections (e.g., L4-L7 connections). This enables a private subnet within a VCN, such as private Subnet-1 in VCN 804, with private access to public endpoints on the Internet. In NAT gateways, connections can be initiated only from the private subnet to the public Internet and not from the Internet to the private subnet.

In certain embodiments, a Service Gateway (SGW) 826 can be configured for customer VCN 804 and provides a path for private network traffic between VCN 804 and supported services endpoints in a service network 810. In certain embodiments, service network 810 may be provided by the CSP and may provide various services. An example of such a service network is Oracle's Services Network, which provides various services that can be used by customers. For example, a compute instance (e.g., a database system) in a private subnet of customer VCN 804 can back up data to a service endpoint (e.g., Object Storage) without needing public IP addresses or access to the Internet. In certain embodiments, a VCN can have only one SGW, and connections can only be initiated from a subnet within the VCN and not from service network 810. If a VCN is peered with another, resources in the other VCN typically cannot access the SGW. Resources in on-premises networks that are connected to a VCN with FastConnect or VPN Connect can also use the service gateway configured for that VCN.

In certain implementations, SGW 826 uses the concept of a service Classless Inter-Domain Routing (CIDR) label, which is a string that represents all the regional public IP address ranges for the service or group of services of interest. The customer uses the service CIDR label when they configure the SGW and related route rules to control traffic to the service. The customer can optionally utilize it when configuring security rules without needing to adjust them if the service's public IP addresses change in the future.

A Local Peering Gateway (LPG) 832 is a gateway that can be added to customer VCN 804 and enables VCN 804 to peer with another VCN in the same region. Peering means that the VCNs communicate using private IP addresses, without the traffic traversing a public network such as the Internet or without routing the traffic through the customer's on-premises network 816. In preferred embodiments, a VCN has a separate LPG for each peering it establishes. Local Peering or VCN Peering is a common practice used to establish network connectivity between different applications or infrastructure management functions.

Service providers, such as providers of services in service network 810, may provide access to services using different access models. According to a public access model, services may be exposed as public endpoints that are publicly accessible by compute instance in a customer VCN via a public network such as the Internet and or may be privately accessible via SGW 826. According to a specific private access model, services are made accessible as private IP endpoints in a private subnet in the customer's VCN. This is referred to as a Private Endpoint (PE) access and enables a service provider to expose their service as an instance in the customer's private network. A Private Endpoint resource represents a service within the customer's VCN. Each PE manifests as a VNIC (referred to as a PE-VNIC, with one or more private IPs) in a subnet chosen by the customer in the customer's VCN. A PE thus provides a way to present a service within a private customer VCN subnet using a VNIC. Since the endpoint is exposed as a VNIC, all the features associates with a VNIC such as routing rules, security lists, etc., are now available for the PE VNIC.

A service provider can register their service to enable access through a PE. The provider can associate policies with the service that restricts the service's visibility to the customer tenancies. A provider can register multiple services under a single virtual IP address (VIP), especially for multi-tenant services. There may be multiple such private endpoints (in multiple VCNs) that represent the same service.

Compute instances in the private subnet can then use the PE VNIC's private IP address or the service DNS name to access the service. Compute instances in the customer VCN can access the service by sending traffic to the private IP address of the PE in the customer VCN. A Private Access Gateway (PAGW) 830 is a gateway resource that can be attached to a service provider VCN (e.g., a VCN in service network 810) that acts as an ingress/egress point for all traffic from/to customer subnet private endpoints. PAGW 830 enables a provider to scale the number of PE connections without utilizing its internal IP address resources. A provider needs only configure one PAGW for any number of services registered in a single VCN. Providers can represent a service as a private endpoint in multiple VCNs of one or more customers. From the customer's perspective, the PE VNIC, which, instead of being attached to a customer's instance, appears attached to the service with which the customer wishes to interact. The traffic destined to the private endpoint is routed via PAGW 830 to the service. These are referred to as customer-to-service private connections (C2S connections).

The PE concept can also be used to extend the private access for the service to customer's on-premises networks and data centers, by allowing the traffic to flow through FastConnect/IPsec links and the private endpoint in the customer VCN. Private access for the service can also be extended to the customer's peered VCNs, by allowing the traffic to flow between LPG 832 and the PE in the customer's VCN.

A customer can control routing in a VCN at the subnet level, so the customer can specify which subnets in the customer's VCN, such as VCN 804, use each gateway. A VCN's route tables are used to decide if traffic is allowed out of a VCN through a particular gateway. For example, in a particular instance, a route table for a public subnet within customer VCN 804 may send non-local traffic through IGW 820. The route table for a private subnet within the same customer VCN 804 may send traffic destined for CSP services through SGW 826. All remaining traffic may be sent via the NAT gateway 828. Route tables only control traffic going out of a VCN.

Security lists associated with a VCN are used to control traffic that comes into a VCN via a gateway via inbound connections. All resources in a subnet use the same route table and security lists. Security lists may be used to control specific types of traffic allowed in and out of instances in a subnet of a VCN. Security list rules may comprise ingress (inbound) and egress (outbound) rules. For example, an ingress rule may specify an allowed source address range, while an egress rule may specify an allowed destination address range. Security rules may specify a particular protocol (e.g., TCP, ICMP), a particular port (e.g., 22 for SSH, 3389 for Windows RDP), etc. In certain implementations, an instance's operating system may enforce its own firewall rules that are aligned with the security list rules. Rules may be stateful (e.g., a connection is tracked and the response is automatically allowed without an explicit security list rule for the response traffic) or stateless.

Access from a customer VCN (i.e., by a resource or compute instance deployed on VCN 804) can be categorized as public access, private access, or dedicated access. Public access refers to an access model where a public IP address or a NAT is used to access a public endpoint. Private access enables customer workloads in VCN 804 with private IP addresses (e.g., resources in a private subnet) to access services without traversing a public network such as the Internet. In certain embodiments, CSPI 801 enables customer VCN workloads with private IP addresses to access the (public service endpoints of) services using a service gateway. A service gateway thus offers a private access model by establishing a virtual link between the customer's VCN and the service's public endpoint residing outside the customer's private network.

Additionally, CSPI may offer dedicated public access using technologies such as FastConnect public peering where customer on-premises instances can access one or more services in a customer VCN using a FastConnect connection and without traversing a public network such as the Internet. CSPI also may also offer dedicated private access using FastConnect private peering where customer on-premises instances with private IP addresses can access the customer's VCN workloads using a FastConnect connection. FastConnect is a network connectivity alternative to using the public Internet to connect a customer's on-premise network to CSPI and its services. FastConnect provides an easy, elastic, and economical way to create a dedicated and private connection with higher bandwidth options and a more reliable and consistent networking experience when compared to Internet-based connections.

Figure 9:
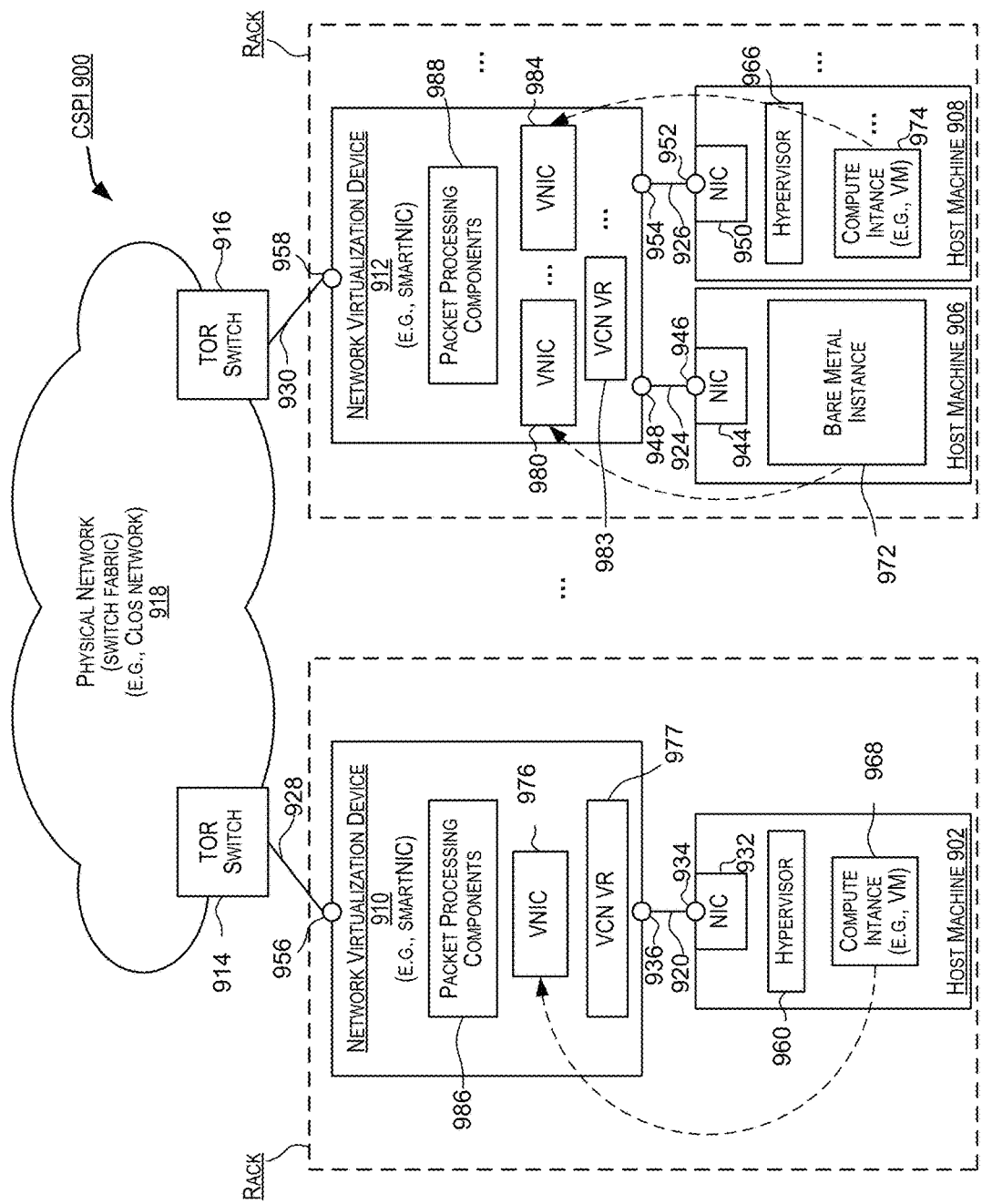
FIG. 9 depicts a simplified architectural diagram of the physical components in the physical network within CSPI according to certain embodiments.

FIG. 8 and the accompanying description above describes various virtualized components in an example virtual network. As described above, the virtual network is built on the underlying physical or substrate network. FIG. 9 depicts a simplified architectural diagram of the physical components in the physical network within CSPI 900 that provide the underlay for the virtual network according to certain embodiments. As shown, CSPI 900 provides a distributed environment comprising components and resources (e.g., compute, memory, and networking resources) provided by a cloud service provider (CSP). These components and resources are used to provide cloud services (e.g., IaaS services) to subscribing customers, i.e., customers that have subscribed to one or more services provided by the CSP. Based upon the services subscribed to by a customer, a subset of resources (e.g., compute, memory, and networking resources) of CSPI 900 are provisioned for the customer. Customers can then build their own cloud-based (i.e., CSPI-hosted) customizable and private virtual networks using physical compute, memory, and networking resources provided by CSPI 900. As previously indicated, these customer networks are referred to as virtual cloud networks (VCNs). A customer can deploy one or more customer resources, such as compute instances, on these customer VCNs. Compute instances can be in the form of virtual machines, bare metal instances, and the like. CSPI 900 provides infrastructure and a set of complementary cloud services that enable customers to build and run a wide range of applications and services in a highly available hosted environment.

In the example embodiment depicted in FIG. 9, the physical components of CSPI 900 include one or more physical host machines or physical servers (e.g., 902, 906, 908), network virtualization devices (NVDs) (e.g., 910, 912), top-of-rack (TOR) switches (e.g., 914, 916), and a physical network (e.g., 918), and switches in physical network 918. The physical host machines or servers may host and execute various compute instances that participate in one or more subnets of a VCN. The compute instances may include virtual machine instances, and bare metal instances. For example, the various compute instances depicted in FIG. 8 may be hosted by the physical host machines depicted in FIG. 9. The virtual machine compute instances in a VCN may be executed by one host machine or by multiple different host machines. The physical host machines may also host virtual host machines, container-based hosts or functions, and the like. The VNICs and VCN VR depicted in FIG. 8 may be executed by the NVDs depicted in FIG. 9. The gateways depicted in FIG. 8 may be executed by the host machines and/or by the NVDs depicted in FIG. 9.

The host machines or servers may execute a hypervisor (also referred to as a virtual machine monitor or VMM) that creates and enables a virtualized environment on the host machines. The virtualization or virtualized environment facilitates cloud-based computing. One or more compute instances may be created, executed, and managed on a host machine by a hypervisor on that host machine. The hypervisor on a host machine enables the physical computing resources of the host machine (e.g., compute, memory, and networking resources) to be shared between the various compute instances executed by the host machine.

For example, as depicted in FIG. 9, host machines 902 and 908 execute hypervisors 960 and 966, respectively. These hypervisors may be implemented using software, firmware, or hardware, or combinations thereof. Typically, a hypervisor is a process or a software layer that sits on top of the host machine's operating system (OS), which in turn executes on the hardware processors of the host machine. The hypervisor provides a virtualized environment by enabling the physical computing resources (e.g., processing resources such as processors/cores, memory resources, networking resources) of the host machine to be shared among the various virtual machine compute instances executed by the host machine. For example, in FIG. 9, hypervisor 960 may sit on top of the OS of host machine 902 and enables the computing resources (e.g., processing, memory, and networking resources) of host machine 902 to be shared between compute instances (e.g., virtual machines) executed by host machine 902. A virtual machine can have its own operating system (referred to as a guest operating system), which may be the same as or different from the OS of the host machine. The operating system of a virtual machine executed by a host machine may be the same as or different from the operating system of another virtual machine executed by the same host machine. A hypervisor thus enables multiple operating systems to be executed alongside each other while sharing the same computing resources of the host machine. The host machines depicted in FIG. 9 may have the same or different types of hypervisors.

A compute instance can be a virtual machine instance or a bare metal instance. In FIG. 9, compute instances 968 on host machine 902 and 974 on host machine 908 are examples of virtual machine instances. Host machine 906 is an example of a bare metal instance that is provided to a customer.

In certain instances, an entire host machine may be provisioned to a single customer, and all of the one or more compute instances (either virtual machines or bare metal instance) hosted by that host machine belong to that same customer. In other instances, a host machine may be shared between multiple customers (i.e., multiple tenants). In such a multi-tenancy scenario, a host machine may host virtual machine compute instances belonging to different customers. These compute instances may be members of different VCNs of different customers. In certain embodiments, a bare metal compute instance is hosted by a bare metal server without a hypervisor. When a bare metal compute instance is provisioned, a single customer or tenant maintains control of the physical CPU, memory, and network interfaces of the host machine hosting the bare metal instance and the host machine is not shared with other customers or tenants.

As previously described, each compute instance that is part of a VCN is associated with a VNIC that enables the compute instance to become a member of a subnet of the VCN. The VNIC associated with a compute instance facilitates the communication of packets or frames to and from the compute instance. A VNIC is associated with a compute instance when the compute instance is created. In certain embodiments, for a compute instance executed by a host machine, the VNIC associated with that compute instance is executed by an NVD connected to the host machine. For example, in FIG. 9, host machine 902 executes a virtual machine compute instance 968 that is associated with VNIC 976, and VNIC 976 is executed by NVD 910 connected to host machine 902. As another example, bare metal instance 972 hosted by host machine 906 is associated with VNIC 980 that is executed by NVD 912 connected to host machine 906. As yet another example, VNIC 984 is associated with compute instance 974 executed by host machine 908, and VNIC 984 is executed by NVD 912 connected to host machine 908.

For compute instances hosted by a host machine, an NVD connected to that host machine also executes VCN VRs corresponding to VCNs of which the compute instances are members. For example, in the embodiment depicted in FIG. 9, NVD 910 executes VCN VR 977 corresponding to the VCN of which compute instance 968 is a member. NVD 912 may also execute one or more VCN VRs 983 corresponding to VCNs corresponding to the compute instances hosted by host machines 906 and 908.

A host machine may include one or more network interface cards (NIC) that enable the host machine to be connected to other devices. A NIC on a host machine may provide one or more ports (or interfaces) that enable the host machine to be communicatively connected to another device. For example, a host machine may be connected to an NVD using one or more ports (or interfaces) provided on the host machine and on the NVD. A host machine may also be connected to other devices such as another host machine.

For example, in FIG. 9, host machine 902 is connected to NVD 910 using link 920 that extends between a port 934 provided by a NIC 932 of host machine 902 and between a port 936 of NVD 910. Host machine 906 is connected to NVD 912 using link 924 that extends between a port 946 provided by a NIC 944 of host machine 906 and between a port 948 of NVD 912. Host machine 908 is connected to NVD 912 using link 926 that extends between a port 952 provided by a NIC 950 of host machine 908 and between a port 954 of NVD 912.

The NVDs are in turn connected via communication links to top-of-the-rack (TOR) switches, which are connected to physical network 918 (also referred to as the switch fabric). In certain embodiments, the links between a host machine and an NVD, and between an NVD and a TOR switch are Ethernet links. For example, in FIG. 9, NVDs 910 and 912 are connected to TOR switches 914 and 916, respectively, using links 928 and 930. In certain embodiments, the links 920, 924, 926, 928, and 930 are Ethernet links. The collection of host machines and NVDs that are connected to a TOR is sometimes referred to as a rack.

Figure 12:
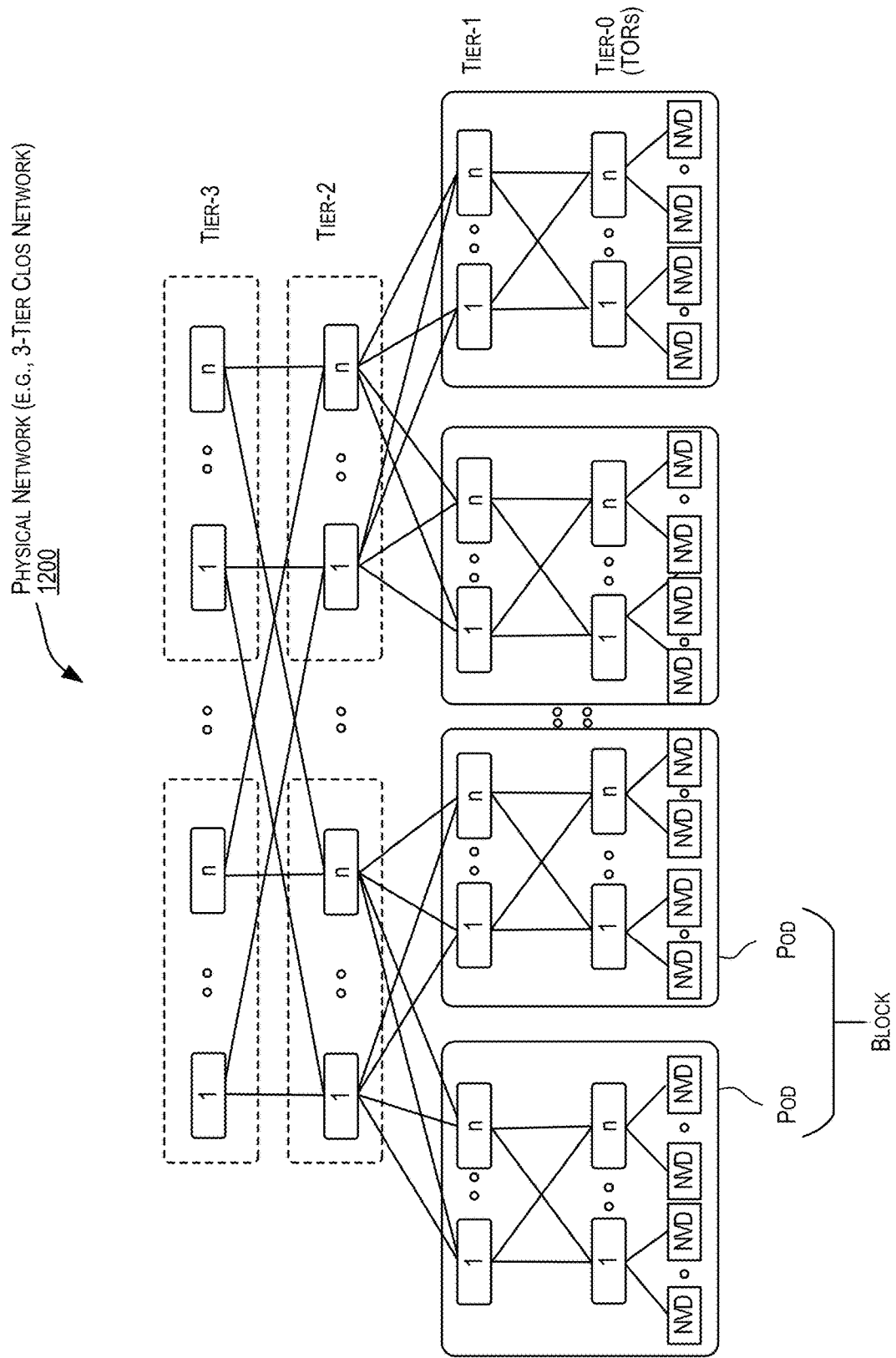
FIG. 12 depicts a simplified block diagram of a physical network provided by a CSPI according to certain embodiments.

Physical network 918 provides a communication fabric that enables TOR switches to communicate with each other. Physical network 918 can be a multi-tiered network. In certain implementations, physical network 918 is a multi-tiered Clos network of switches, with TOR switches 914 and 916 representing the leaf level nodes of the multi-tiered and multi-node physical switching network 918. Different Clos network configurations are possible including but not limited to a 2-tier network, a 3-tier network, a 4-tier network, a 5-tier network, and in general a "n"-tiered network. An example of a Clos network is depicted in FIG. 12 and described below.

Various different connection configurations are possible between host machines and NVDs such as one-to-one configuration, many-to-one configuration, one-to-many configuration, and others. In a one-to-one configuration implementation, each host machine is connected to its own separate NVD. For example, in FIG. 9, host machine 902 is connected to NVD 910 via NIC 932 of host machine 902. In a many-to-one configuration, multiple host machines are connected to one NVD. For example, in FIG. 9, host machines 906 and 908 are connected to the same NVD 912 via NICs 944 and 950, respectively.

Figure 10:
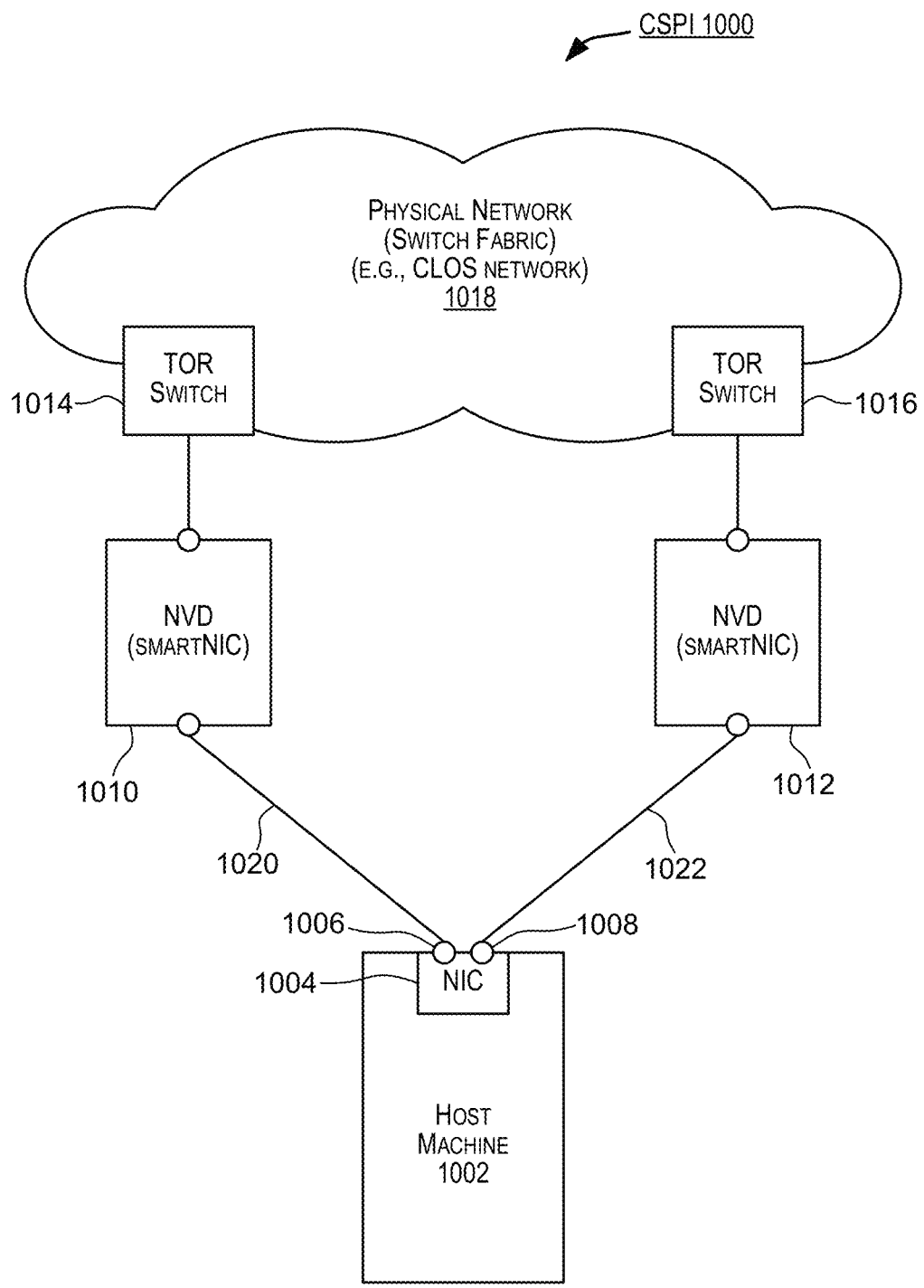
FIG. 10 shows an example arrangement within CSPI where a host machine is connected to multiple network virtualization devices (NVDs) according to certain embodiments.

In a one-to-many configuration, one host machine is connected to multiple NVDs. FIG. 10 shows an example within CSPI 1000 where a host machine is connected to multiple NVDs. As shown in FIG. 10, host machine 1002 comprises a network interface card (NIC) 1004 that includes multiple ports 1006 and 1008. Host machine 1002 is connected to a first NVD 1010 via port 1006 and link 1020, and connected to a second NVD 1012 via port 1008 and link 1022. Ports 1006 and 1008 may be Ethernet ports and the links 1020 and 1022 between host machine 1002 and NVDs 1010 and 1012 may be Ethernet links. NVD 1010 is in turn connected to a first TOR switch 1014 and NVD 1012 is connected to a second TOR switch 1016. The links between NVDs 1010 and 1012, and TOR switches 1014 and 1016 may be Ethernet links. TOR switches 1014 and 1016 represent the Tier-0 switching devices in multi-tiered physical network 1018.

The arrangement depicted in FIG. 10 provides two separate physical network paths to and from physical switch network 1018 to host machine 1002: a first path traversing TOR switch 1014 to NVD 1010 to host machine 1002, and a second path traversing TOR switch 1016 to NVD 1012 to host machine 1002. The separate paths provide for enhanced availability (referred to as high availability) of host machine 1002. If there are problems in one of the paths (e.g., a link in one of the paths goes down) or devices (e.g., a particular NVD is not functioning), then the other path may be used for communications to/from host machine 1002.

In the configuration depicted in FIG. 10, the host machine is connected to two different NVDs using two different ports provided by a NIC of the host machine. In other embodiments, a host machine may include multiple NICs that enable connectivity of the host machine to multiple NVDs.

Referring back to FIG. 9, an NVD is a physical device or component that performs one or more network and/or storage virtualization functions. An NVD may be any device with one or more processing units (e.g., CPUs, Network Processing Units (NPUs), FPGAs, packet processing pipelines, etc.), memory including cache, and ports. The various virtualization functions may be performed by software/firmware executed by the one or more processing units of the NVD.

An NVD may be implemented in various different forms. For example, in certain embodiments, an NVD is implemented as an interface card referred to as a smartNIC or an intelligent NIC with an embedded processor onboard. A smartNIC is a separate device from the NICs on the host machines. In FIG. 9, the NVDs 910 and 912 may be implemented as smartNICs that are connected to host machines 902, and host machines 906 and 908, respectively.

A smartNIC is however just one example of an NVD implementation. Various other implementations are possible. For example, in some other implementations, an NVD or one or more functions performed by the NVD may be incorporated into or performed by one or more host machines, one or more TOR switches, and other components of CSPI 900. For example, an NVD may be embodied in a host machine where the functions performed by an NVD are performed by the host machine. As another example, an NVD may be part of a TOR switch or a TOR switch may be configured to perform functions performed by an NVD that enables the TOR switch to perform various complex packet transformations that are used for a public cloud. A TOR that performs the functions of an NVD is sometimes referred to as a smart TOR. In yet other implementations, where virtual machines (VMs) instances, but not bare metal (BM) instances, are offered to customers, functions performed by an NVD may be implemented inside a hypervisor of the host machine. In some other implementations, some of the functions of the NVD may be offloaded to a centralized service running on a fleet of host machines.

In certain embodiments, such as when implemented as a smartNIC as shown in FIG. 9, an NVD may comprise multiple physical ports that enable it to be connected to one or more host machines and to one or more TOR switches. A port on an NVD can be classified as a host-facing port (also referred to as a "south port") or a network-facing or TOR-facing port (also referred to as a "north port"). A host-facing port of an NVD is a port that is used to connect the NVD to a host machine. Examples of host-facing ports in FIG. 9 include port 936 on NVD 910, and ports 948 and 954 on NVD 912. A network-facing port of an NVD is a port that is used to connect the NVD to a TOR switch. Examples of network-facing ports in FIG. 9 include port 956 on NVD 910, and port 958 on NVD 912. As shown in FIG. 9, NVD 910 is connected to TOR switch 914 using link 928 that extends from port 956 of NVD 910 to the TOR switch 914.

Likewise, NVD 912 is connected to TOR switch 916 using link 930 that extends from port 958 of NVD 912 to the TOR switch 916.

An NVD receives packets and frames from a host machine (e.g., packets and frames generated by a compute instance hosted by the host machine) via a host-facing port and, after performing the necessary packet processing, may forward the packets and frames to a TOR switch via a network-facing port of the NVD. An NVD may receive packets and frames from a TOR switch via a network-facing port of the NVD and, after performing the necessary packet processing, may forward the packets and frames to a host machine via a host-facing port of the NVD.

In certain embodiments, there may be multiple ports and associated links between an NVD and a TOR switch. These ports and links may be aggregated to form a link aggregator group of multiple ports or links (referred to as a LAG). Link aggregation allows multiple physical links between two end-points (e.g., between an NVD and a TOR switch) to be treated as a single logical link. All the physical links in a given LAG may operate in full-duplex mode at the same speed. LAGs help increase the bandwidth and reliability of the connection between two endpoints. If one of the physical links in the LAG goes down, traffic is dynamically and transparently reassigned to one of the other physical links in the LAG. The aggregated physical links deliver higher bandwidth than each individual link. The multiple ports associated with a LAG are treated as a single logical port. Traffic can be load-balanced across the multiple physical links of a LAG. One or more LAGs may be configured between two endpoints. The two endpoints may be between an NVD and a TOR switch, between a host machine and an NVD, and the like.

An NVD implements or performs network virtualization functions. These functions are performed by software/firmware executed by the NVD. Examples of network virtualization functions include without limitation: packet encapsulation and de-capsulation functions; functions for creating a VCN network; functions for implementing network policies such as VCN security list (firewall) functionality; functions that facilitate the routing and forwarding of packets to and from compute instances in a VCN; and the like. In certain embodiments, upon receiving a packet, an NVD is configured to execute a packet processing pipeline for processing the packet and determining how the packet is to be forwarded or routed. As part of this packet processing pipeline, the NVD may execute one or more virtual functions associated with the overlay network such as executing VNICs associated with cis in the VCN, executing a Virtual Router (VR) associated with the VCN, the encapsulation and decapsulation of packets to facilitate forwarding or routing in the virtual network, execution of certain gateways (e.g., the Local Peering Gateway), the implementation of Security Lists, Network Security Groups, network address translation (NAT) functionality (e.g., the translation of Public IP to Private IP on a host by host basis), throttling functions, and other functions.

In certain embodiments, the packet processing data path in an NVD may comprise multiple packet pipelines, each composed of a series of packet transformation stages. In certain implementations, upon receiving a packet, the packet is parsed and classified to a single pipeline. The packet is then processed in a linear fashion, one stage after another, until the packet is either dropped or sent out over an interface of the NVD. These stages provide basic functional packet processing building blocks (e.g., validating headers, enforcing throttle, inserting new Layer-2 headers, enforcing L4 firewall, VCN encapsulation/decapsulation, etc.) so that new pipelines can be constructed by composing existing stages, and new functionality can be added by creating new stages and inserting them into existing pipelines.

An NVD may perform both control plane and data plane functions corresponding to a control plane and a data plane of a VCN. Examples of a VCN Control Plane are also depicted in FIGS. 13, 14, 15, and 16 (see references 1316, 1416, 1516, and 1616) and described below. Examples of a VCN Data Plane are depicted in FIGS. 13, 14, 15, and 16 (see references 1318, 1418, 1518, and 1618) and described below. The control plane functions include functions used for configuring a network (e.g., setting up routes and route tables, configuring VNICs, etc.) that controls how data is to be forwarded. In certain embodiments, a VCN Control Plane is provided that computes all the overlay-to-substrate mappings centrally and publishes them to the NVDs and to the virtual network edge devices such as various gateways such as the DRG, the SGW, the IGW, etc. Firewall rules may also be published using the same mechanism. In certain embodiments, an NVD only gets the mappings that are relevant for that NVD. The data plane functions include functions for the actual routing/forwarding of a packet based upon configuration set up using control plane. A VCN data plane is implemented by encapsulating the customer's network packets before they traverse the substrate network. The encapsulation/decapsulation functionality is implemented on the NVDs. In certain embodiments, an NVD is configured to intercept all network packets in and out of host machines and perform network virtualization functions.

As indicated above, an NVD executes various virtualization functions including VNICs and VCN VRs. An NVD may execute VNICs associated with the compute instances hosted by one or more host machines connected to the VNIC. For example, as depicted in FIG. 9, NVD 910 executes the functionality for VNIC 976 that is associated with compute instance 968 hosted by host machine 902 connected to NVD 910. As another example, NVD 912 executes VNIC 980 that is associated with bare metal compute instance 972 hosted by host machine 906, and executes VNIC 984 that is associated with compute instance 974 hosted by host machine 908. A host machine may host compute instances belonging to different VCNs, which belong to different customers, and the NVD connected to the host machine may execute the VNICs (i.e., execute VNICs-relate functionality) corresponding to the compute instances.

An NVD also executes VCN Virtual Routers corresponding to the VCNs of the compute instances. For example, in the embodiment depicted in FIG. 9, NVD 910 executes VCN VR 977 corresponding to the VCN to which compute instance 968 belongs. NVD 912 executes one or more VCN VRs 983 corresponding to one or more VCNs to which compute instances hosted by host machines 906 and 908 belong. In certain embodiments, the VCN VR corresponding to that VCN is executed by all the NVDs connected to host machines that host at least one compute instance belonging to that VCN. If a host machine hosts compute instances belonging to different VCNs, an NVD connected to that host machine may execute VCN VRs corresponding to those different VCNs.

In addition to VNICs and VCN VRs, an NVD may execute various software (e.g., daemons) and include one or more hardware components that facilitate the various network virtualization functions performed by the NVD. For purposes of simplicity, these various components are grouped together as "packet processing components" shown in FIG. 9. For example, NVD 910 comprises packet processing components 986 and NVD 912 comprises packet processing components 988. For example, the packet processing components for an NVD may include a packet processor that is configured to interact with the NVD's ports and hardware interfaces to monitor all packets received by and communicated using the NVD and store network information. The network information may, for example, include network flow information identifying different network flows handled by the NVD and per flow information (e.g., per flow statistics). In certain embodiments, network flows information may be stored on a per VNIC basis. The packet processor may perform packet-by-packet manipulations as well as implement stateful NAT and L4 firewall (FW). As another example, the packet processing components may include a replication agent that is configured to replicate information stored by the NVD to one or more different replication target stores. As yet another example, the packet processing components may include a logging agent that is configured to perform logging functions for the NVD. The packet processing components may also include software for monitoring the performance and health of the NVD and, also possibly of monitoring the state and health of other components connected to the NVD.

FIG. 8 shows the components of an example virtual or overlay network including a VCN, subnets within the VCN, compute instances deployed on subnets, VNICs associated with the compute instances, a VR for a VCN, and a set of gateways configured for the VCN. The overlay components depicted in FIG. 8 may be executed or hosted by one or more of the physical components depicted in FIG. 9. For example, the compute instances in a VCN may be executed or hosted by one or more host machines depicted in FIG. 9. For a compute instance hosted by a host machine, the VNIC associated with that compute instance is typically executed by an NVD connected to that host machine (i.e., the VNIC functionality is provided by the NVD connected to that host machine). The VCN VR function for a VCN is executed by all the NVDs that are connected to host machines hosting or executing the compute instances that are part of that VCN. The gateways associated with a VCN may be executed by one or more different types of NVDs. For example, certain gateways may be executed by smartNICs, while others may be executed by one or more host machines or other implementations of NVDs.

As described above, a compute instance in a customer VCN may communicate with various different endpoints, where the endpoints can be within the same subnet as the source compute instance, in a different subnet but within the same VCN as the source compute instance, or with an endpoint that is outside the VCN of the source compute instance. These communications are facilitated using VNICs associated with the compute instances, the VCN VRs, and the gateways associated with the VCNs.

For communications between two compute instances on the same subnet in a VCN, the communication is facilitated using VNICs associated with the source and destination compute instances. The source and destination compute instances may be hosted by the same host machine or by different host machines. A packet originating from a source compute instance may be forwarded from a host machine hosting the source compute instance to an NVD connected to that host machine. On the NVD, the packet is processed using a packet processing pipeline, which can include execution of the VNIC associated with the source compute instance. Since the destination endpoint for the packet is within the same subnet, execution of the VNIC associated with the source compute instance results in the packet being forwarded to an NVD executing the VNIC associated with the destination compute instance, which then processes and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs). The VNICs may use routing/forwarding tables stored by the NVD to determine the next hop for the packet.

For a packet to be communicated from a compute instance in a subnet to an endpoint in a different subnet in the same VCN, the packet originating from the source compute instance is communicated from the host machine hosting the source compute instance to the NVD connected to that host machine. On the NVD, the packet is processed using a packet processing pipeline, which can include execution of one or more VNICs, and the VR associated with the VCN. For example, as part of the packet processing pipeline, the NVD executes or invokes functionality corresponding to the VNIC (also referred to as executes the VNIC) associated with source compute instance. The functionality performed by the VNIC may include looking at the VLAN tag on the packet. Since the packet's destination is outside the subnet, the VCN VR functionality is next invoked and executed by the NVD. The VCN VR then routes the packet to the NVD executing the VNIC associated with the destination compute instance. The VNIC associated with the destination compute instance then processes the packet and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs).

If the destination for the packet is outside the VCN of the source compute instance, then the packet originating from the source compute instance is communicated from the host machine hosting the source compute instance to the NVD connected to that host machine. The NVD executes the VNIC associated with the source compute instance. Since the destination end point of the packet is outside the VCN, the packet is then processed by the VCN VR for that VCN. The NVD invokes the VCN VR functionality, which may result in the packet being forwarded to an NVD executing the appropriate gateway associated with the VCN. For example, if the destination is an endpoint within the customer's on-premise network, then the packet may be forwarded by the VCN VR to the NVD executing the DRG gateway configured for the VCN. The VCN VR may be executed on the same NVD as the NVD executing the VNIC associated with the source compute instance or by a different NVD. The gateway may be executed by an NVD, which may be a smartNIC, a host machine, or other NVD implementation. The packet is then processed by the gateway and forwarded to a next hop that facilitates communication of the packet to its intended destination endpoint. For example, in the embodiment depicted in FIG. 9, a packet originating from compute instance 968 may be communicated from host machine 902 to NVD 910 over link 920 (using NIC 932). On NVD 910, VNIC 976 is invoked since it is the VNIC associated with source compute instance 968. VNIC 976 is configured to examine the encapsulated information in the packet, and determine a next hop for forwarding the packet with the goal of facilitating communication of the packet to its intended destination endpoint, and then forward the packet to the determined next hop.

A compute instance deployed on a VCN can communicate with various different endpoints. These endpoints may include endpoints that are hosted by CSPI 900 and endpoints outside CSPI 900. Endpoints hosted by CSPI 900 may include instances in the same VCN or other VCNs, which may be the customer's VCNs, or VCNs not belonging to the customer. Communications between endpoints hosted by CSPI 900 may be performed over physical network 918. A compute instance may also communicate with endpoints that are not hosted by CSPI 900, or are outside CSPI 900. Examples of these endpoints include endpoints within a customer's on-premise network or data center, or public endpoints accessible over a public network such as the Internet. Communications with endpoints outside CSPI 900 may be performed over public networks (e.g., the Internet) (not shown in FIG. 9) or private networks (not shown in FIG. 9) using various communication protocols.

The architecture of CSPI 900 depicted in FIG. 9 is merely an example and is not intended to be limiting. Variations, alternatives, and modifications are possible in alternative embodiments. For example, in some implementations, CSPI 900 may have more or fewer systems or components than those shown in FIG. 9, may combine two or more systems, or may have a different configuration or arrangement of systems. The systems, subsystems, and other components depicted in FIG. 9 may be implemented in software (e.g., code, instructions, program) executed by one or more processing units (e.g., processors, cores) of the respective systems, using hardware, or combinations thereof. The software may be stored on a non-transitory storage medium (e.g., on a memory device).

Figure 11:
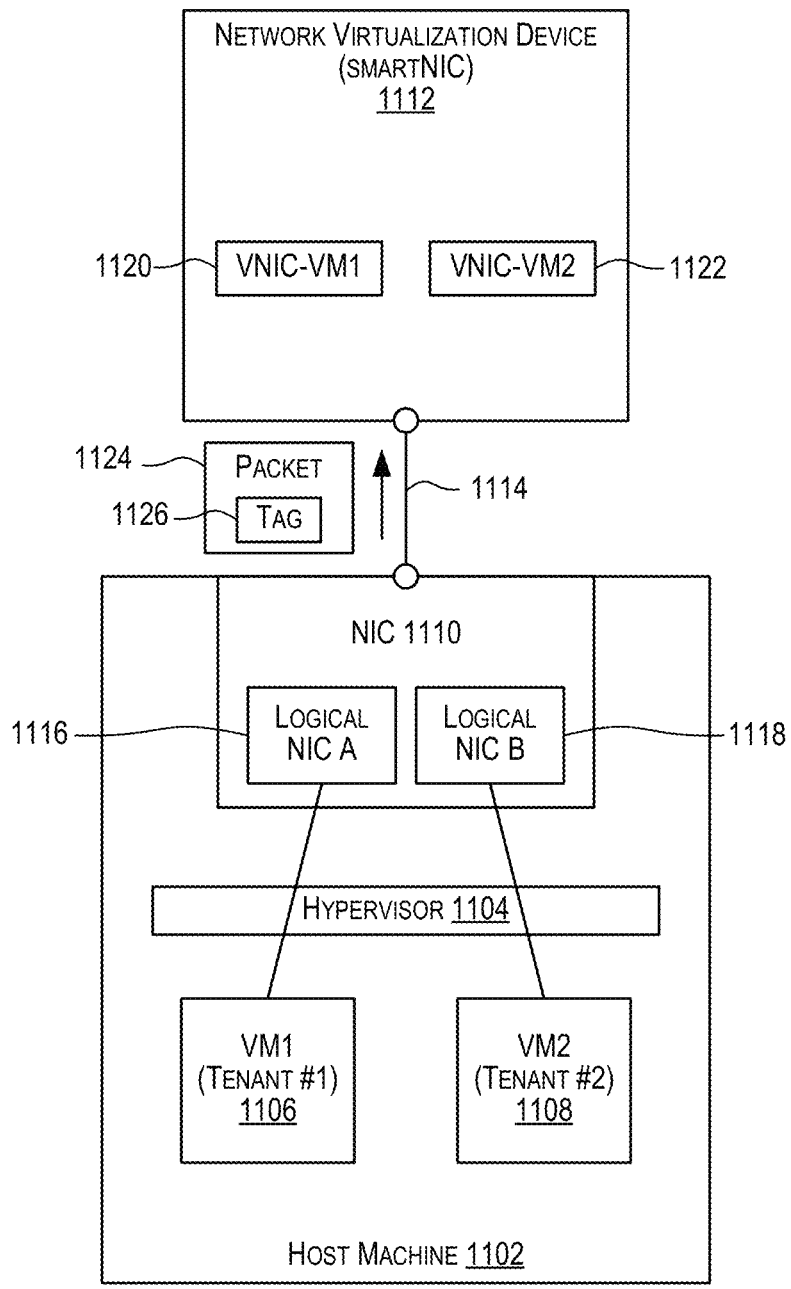
FIG. 11 depicts connectivity between a host machine and an NVD for providing I/O virtualization for supporting multitenancy according to certain embodiments.

FIG. 11 depicts connectivity between a host machine and an NVD for providing I/O virtualization for supporting multitenancy according to certain embodiments. As depicted in FIG. 11, host machine 1102 executes a hypervisor 1104 that provides a virtualized environment. Host machine 1102 executes two virtual machine instances, VM1 1106 belonging to customer/tenant #1 and VM2 1108 belonging to customer/tenant #2. Host machine 1102 comprises a physical NIC 1110 that is connected to an NVD 1112 via link 1114. Each of the compute instances is attached to a VNIC that is executed by NVD 1112. In the embodiment in FIG. 11, VM1 1106 is attached to VNIC-VM1 1120 and VM2 1108 is attached to VNIC-VM2 1122.

As shown in FIG. 11, NIC 1110 comprises two logical NICs, logical NIC A 1116 and logical NIC B 1118. Each virtual machine is attached to and configured to work with its own logical NIC. For example, VM1 1106 is attached to logical NIC A 1116 and VM2 1108 is attached to logical NIC B 1118. Even though host machine 1102 comprises only one physical NIC 1110 that is shared by the multiple tenants, due to the logical NICs, each tenant's virtual machine believes they have their own host machine and NIC.

In certain embodiments, each logical NIC is assigned its own VLAN ID. Thus, a specific VLAN ID is assigned to logical NIC A 1116 for Tenant #1 and a separate VLAN ID is assigned to logical NIC B 1118 for Tenant #2. When a packet is communicated from VM1 1106, a tag assigned to Tenant #1 is attached to the packet by the hypervisor and the packet is then communicated from host machine 1102 to NVD 1112 over link 1114. In a similar manner, when a packet is communicated from VM2 1108, a tag assigned to Tenant #2 is attached to the packet by the hypervisor and the packet is then communicated from host machine 1102 to NVD 1112 over link 1114. Accordingly, a packet 1124 communicated from host machine 1102 to NVD 1112 has an associated tag 1126 that identifies a specific tenant and associated VM. On the NVD, for a packet 1124 received from host machine 1102, the tag 1126 associated with the packet is used to determine whether the packet is to be processed by VNIC-VM1 1120 or by VNIC-VM2 1122. The packet is then processed by the corresponding VNIC. The configuration depicted in FIG. 11 enables each tenant's compute instance to believe that they own their own host machine and NIC. The setup depicted in FIG. 11 provides for I/O virtualization for supporting multi-tenancy.

FIG. 12 depicts a simplified block diagram of a physical network 1200 according to certain embodiments. The embodiment depicted in FIG. 12 is structured as a Clos network. A Clos network is a particular type of network topology designed to provide connection redundancy while maintaining high bisection bandwidth and maximum resource utilization. A Clos network is a type of non-blocking, multistage or multi-tiered switching network, where the number of stages or tiers can be two, three, four, five, etc. The embodiment depicted in FIG. 12 is a 3-tiered network comprising tiers 1, 2, and 3. The TOR switches 1204 represent Tier-0 switches in the Clos network. One or more NVDs are connected to the TOR switches. Tier-0 switches are also referred to as edge devices of the physical network. The Tier-0 switches are connected to Tier-1 switches, which are also referred to as leaf switches. In the embodiment depicted in FIG. 12, a set of "n" Tier-0 TOR switches are connected to a set of "n" Tier-1 switches and together form a pod. Each Tier-0 switch in a pod is interconnected to all the Tier-1 switches in the pod, but there is no connectivity of switches between pods. In certain implementations, two pods are referred to as a block. Each block is served by or connected to a set of "n" Tier-2 switches (sometimes referred to as spine switches). There can be several blocks in the physical network topology. The Tier-2 switches are in turn connected to "n" Tier-3 switches (sometimes referred to as super-spine switches). Communication of packets over physical network 1200 is typically performed using one or more Layer-3 communication protocols. Typically, all the layers of the physical network, except for the TORs layer are n-ways redundant thus allowing for high availability. Policies may be specified for pods and blocks to control the visibility of switches to each other in the physical network so as to enable scaling of the physical network.

A feature of a Clos network is that the maximum hop count to reach from one Tier-0 switch to another Tier-0 switch (or from an NVD connected to a Tier-0-switch to another NVD connected to a Tier-0 switch) is fixed. For example, in a 3-Tiered Clos network at most seven hops are needed for a packet to reach from one NVD to another NVD, where the source and target NVDs are connected to the leaf tier of the Clos network. Likewise, in a 4-tiered Clos network, at most nine hops are needed for a packet to reach from one NVD to another NVD, where the source and target NVDs are connected to the leaf tier of the Clos network. Thus, a Clos network architecture maintains consistent latency throughout the network, which is important for communication within and between data centers. A Clos topology scales horizontally and is cost effective. The bandwidth/throughput capacity of the network can be easily increased by adding more switches at the various tiers (e.g., more leaf and spine switches) and by increasing the number of links between the switches at adjacent tiers.

In certain embodiments, each resource within CSPI is assigned a unique identifier called a Cloud Identifier (CID). This identifier is included as part of the resource's information and can be used to manage the resource, for example, via a Console or through APIs. An example syntax for a CID is:

ocid1.<RESOURCE TYPE>.<REALM>.[REGION] [.FUTURE USE].<UNIQUE ID> where,
 ocid1: The literal string indicating the version of the CID;
 resource type: The type of resource (for example, instance, volume, VCN, subnet, user, group, and so on);
 realm: The realm the resource is in. Example values are "c1" for the commercial realm, "c2" for the Government Cloud realm, or "c3" for the Federal Government Cloud realm, etc. Each realm may have its own domain name;
 region: The region the resource is in. If the region is not applicable to the resource, this part might be blank;
 future use: Reserved for future use.
 unique ID: The unique portion of the ID. The format may vary depending on the type of resource or service.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 13:
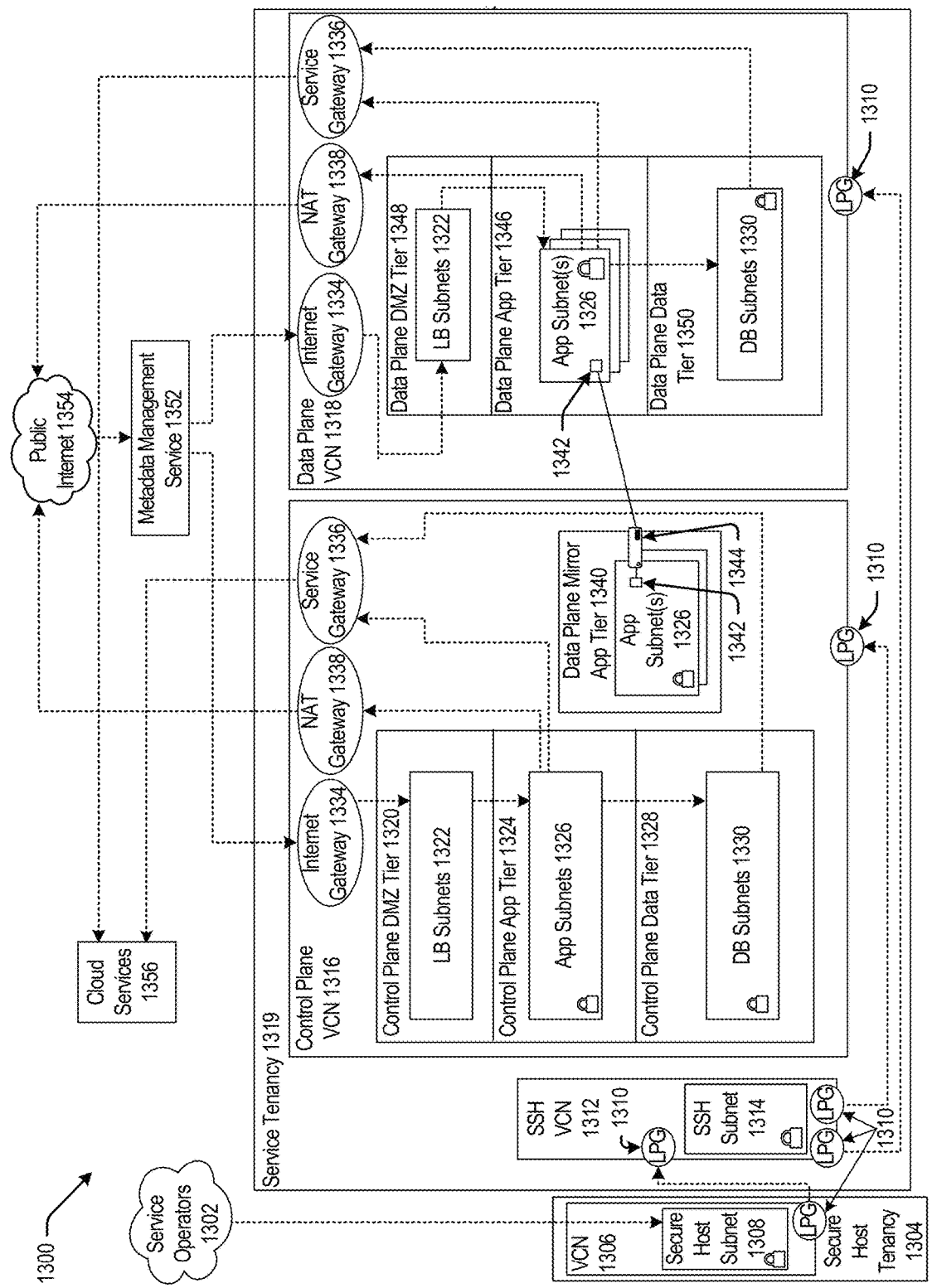
FIG. 13 is a block diagram illustrating one pattern for implementing a cloud infrastructure as a service system, according to at least one embodiment.

FIG. 13 is a block diagram 1300 illustrating an example pattern of an IaaS architecture, according to at least one embodiment. Service operators 1302 can be communicatively coupled to a secure host tenancy 1304 that can include a virtual cloud network (VCN) 1306 and a secure host subnet 1308. In some examples, the service operators 1302 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1306 and/or the Internet.

The VCN 1306 can include a local peering gateway (LPG) 1310 that can be communicatively coupled to a secure shell (SSH) VCN 1312 via an LPG 1310 contained in the SSH VCN 1312. The SSH VCN 1312 can include an SSH subnet 1314, and the SSH VCN 1312 can be communicatively coupled to a control plane VCN 1316 via the LPG 1310 contained in the control plane VCN 1316. Also, the SSH VCN 1312 can be communicatively coupled to a data plane VCN 1318 via an LPG 1310. The control plane VCN 1316 and the data plane VCN 1318 can be contained in a service tenancy 1319 that can be owned and/or operated by the IaaS provider.

The control plane VCN 1316 can include a control plane demilitarized zone (DMZ) tier 1320 that acts as a perimeter network (e.g., portions of a corporate network between the corporate intranet and external networks). The DMZ-based servers may have restricted responsibilities and help keep security breaches contained. Additionally, the DMZ tier 1320 can include one or more load balancer (LB) subnet(s) 1322, a control plane app tier 1324 that can include app subnet(s) 1326, a control plane data tier 1328 that can include database (DB) subnet(s) 1330 (e.g., frontend DB subnet(s) and/or backend DB subnet(s)). The LB subnet(s) 1322 contained in the control plane DMZ tier 1320 can be communicatively coupled to the app subnet(s) 1326 contained in the control plane app tier 1324 and an Internet gateway 1334 that can be contained in the control plane VCN 1316, and the app subnet(s) 1326 can be communicatively coupled to the DB subnet(s) 1330 contained in the control plane data tier 1328 and a service gateway 1336 and a network address translation (NAT) gateway 1338. The control plane VCN 1316 can include the service gateway 1336 and the NAT gateway 1338.

The control plane VCN 1316 can include a data plane mirror app tier 1340 that can include app subnet(s) 1326. The app subnet(s) 1326 contained in the data plane mirror app tier 1340 can include a virtual network interface controller (VNIC) 1342 that can execute a compute instance 1344. The compute instance 1344 can communicatively couple the app subnet(s) 1326 of the data plane mirror app tier 1340 to app subnet(s) 1326 that can be contained in a data plane app tier 1346.

The data plane VCN 1318 can include the data plane app tier 1346, a data plane DMZ tier 1348, and a data plane data tier 1350. The data plane DMZ tier 1348 can include LB subnet(s) 1322 that can be communicatively coupled to the app subnet(s) 1326 of the data plane app tier 1346 and the Internet gateway 1334 of the data plane VCN 1318. The app subnet(s) 1326 can be communicatively coupled to the service gateway 1336 of the data plane VCN 1318 and the NAT gateway 1338 of the data plane VCN 1318. The data plane data tier 1350 can also include the DB subnet(s) 1330 that can be communicatively coupled to the app subnet(s) 1326 of the data plane app tier 1346.

The Internet gateway 1334 of the control plane VCN 1316 and of the data plane VCN 1318 can be communicatively coupled to a metadata management service 1352 that can be communicatively coupled to public Internet 1354. Public Internet 1354 can be communicatively coupled to the NAT gateway 1338 of the control plane VCN 1316 and of the data plane VCN 1318. The service gateway 1336 of the control plane VCN 1316 and of the data plane VCN 1318 can be communicatively couple to cloud services 1356.

In some examples, the service gateway 1336 of the control plane VCN 1316 or of the data plane VCN 1318 can make application programming interface (API) calls to cloud services 1356 without going through public Internet 1354. The API calls to cloud services 1356 from the service gateway 1336 can be one-way: the service gateway 1336 can make API calls to cloud services 1356, and cloud services 1356 can send requested data to the service gateway 1336. But, cloud services 1356 may not initiate API calls to the service gateway 1336.

In some examples, the secure host tenancy 1304 can be directly connected to the service tenancy 1319, which may be otherwise isolated. The secure host subnet 1308 can communicate with the SSH subnet 1314 through an LPG 1310 that may enable two-way communication over an otherwise isolated system. Connecting the secure host subnet 1308 to the SSH subnet 1314 may give the secure host subnet 1308 access to other entities within the service tenancy 1319.

The control plane VCN 1316 may allow users of the service tenancy 1319 to set up or otherwise provision desired resources. Desired resources provisioned in the control plane VCN 1316 may be deployed or otherwise used in the data plane VCN 1318. In some examples, the control plane VCN 1316 can be isolated from the data plane VCN 1318, and the data plane mirror app tier 1340 of the control plane VCN 1316 can communicate with the data plane app tier 1346 of the data plane VCN 1318 via VNICs 1342 that can be contained in the data plane mirror app tier 1340 and the data plane app tier 1346.

In some examples, users of the system, or customers, can make requests, for example create, read, update, or delete (CRUD) operations, through public Internet 1354 that can communicate the requests to the metadata management service 1352. The metadata management service 1352 can communicate the request to the control plane VCN 1316 through the Internet gateway 1334. The request can be received by the LB subnet(s) 1322 contained in the control plane DMZ tier 1320. The LB subnet(s) 1322 may determine that the request is valid, and in response to this determination, the LB subnet(s) 1322 can transmit the request to app subnet(s) 1326 contained in the control plane app tier 1324. If the request is validated and requires a call to public Internet 1354, the call to public Internet 1354 may be transmitted to the NAT gateway 1338 that can make the call to public Internet 1354. Memory that may be desired to be stored by the request can be stored in the DB subnet(s) 1330.

In some examples, the data plane mirror app tier 1340 can facilitate direct communication between the control plane VCN 1316 and the data plane VCN 1318. For example, changes, updates, or other suitable modifications to configuration may be desired to be applied to the resources contained in the data plane VCN 1318. Via a VNIC 1342, the control plane VCN 1316 can directly communicate with, and can thereby execute the changes, updates, or other suitable modifications to configuration to, resources contained in the data plane VCN 1318.

In some embodiments, the control plane VCN 1316 and the data plane VCN 1318 can be contained in the service tenancy 1319. In this case, the user, or the customer, of the system may not own or operate either the control plane VCN 1316 or the data plane VCN 1318. Instead, the IaaS provider may own or operate the control plane VCN 1316 and the data plane VCN 1318, both of which may be contained in the service tenancy 1319. This embodiment can enable isolation of networks that may prevent users or customers from interacting with other users', or other customers', resources. Also, this embodiment may allow users or customers of the system to store databases privately without needing to rely on public Internet 1354, which may not have a desired level of security, for storage.

In other embodiments, the LB subnet(s) 1322 contained in the control plane VCN 1316 can be configured to receive a signal from the service gateway 1336. In this embodiment, the control plane VCN 1316 and the data plane VCN 1318 may be configured to be called by a customer of the IaaS provider without calling public Internet 1354. Customers of the IaaS provider may desire this embodiment since database(s) that the customers use may be controlled by the IaaS provider and may be stored on the service tenancy 1319, which may be isolated from public Internet 1354.

Figure 14:
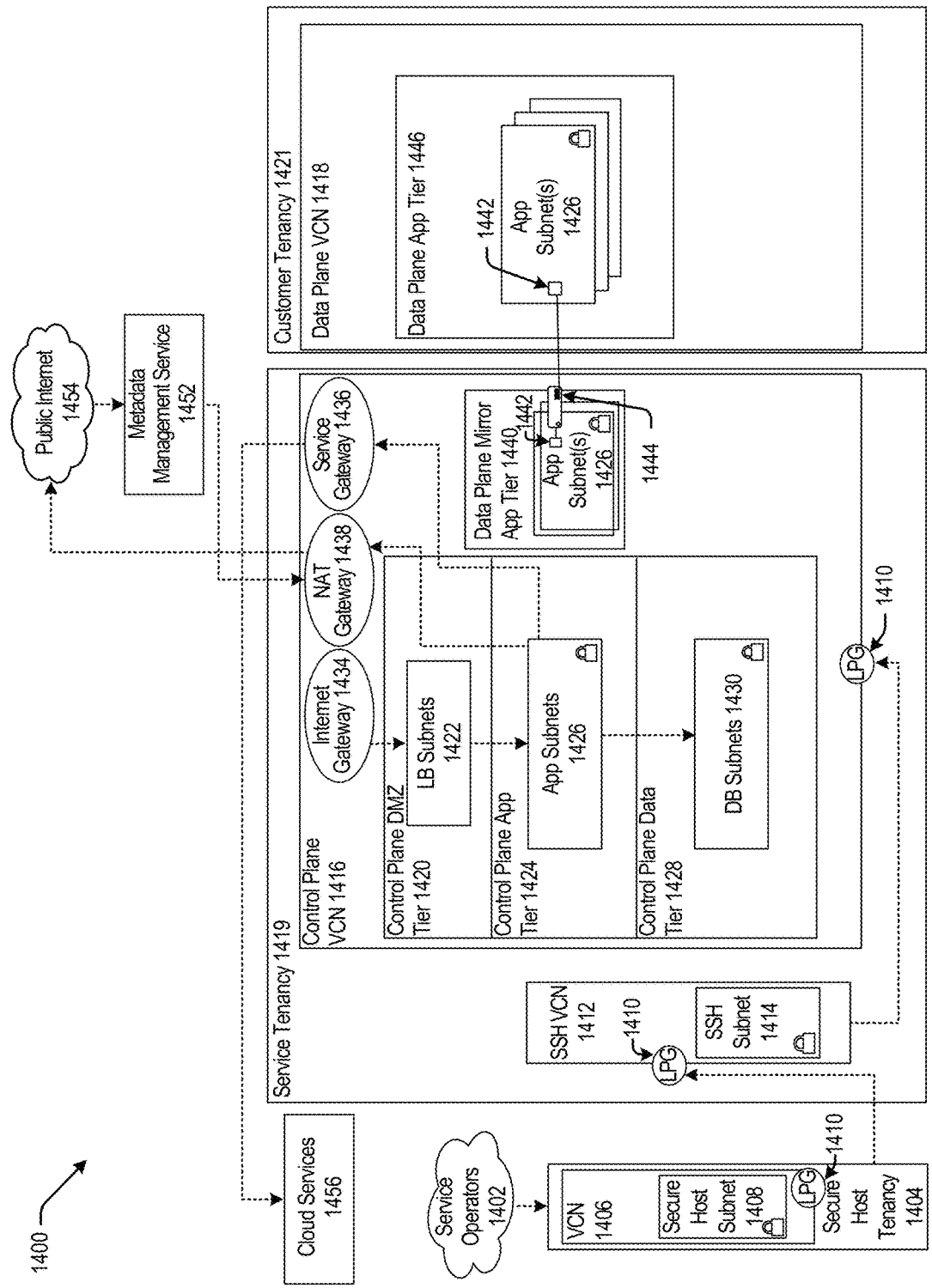
FIG. 14 is a block diagram illustrating another pattern for implementing a cloud infrastructure as a service system, according to at least one embodiment.

FIG. 14 is a block diagram 1400 illustrating another example pattern of an IaaS architecture, according to at least one embodiment. Service operators 1402 (e.g. service operators 1302 of FIG. 13) can be communicatively coupled to a secure host tenancy 1404 (e.g. the secure host tenancy 1304 of FIG. 13) that can include a virtual cloud network (VCN) 1406 (e.g. the VCN 1306 of FIG. 13) and a secure host subnet 1408 (e.g. the secure host subnet 1308 of FIG. 13). The VCN 1406 can include a local peering gateway (LPG) 1410 (e.g. the LPG 1310 of FIG. 13) that can be communicatively coupled to a secure shell (SSH) VCN 1412 (e.g. the SSH VCN 1312 of FIG. 13) via an LPG 1310 contained in the SSH VCN 1412. The SSH VCN 1412 can include an SSH subnet 1414 (e.g. the SSH subnet 1314 of FIG. 13), and the SSH VCN 1412 can be communicatively coupled to a control plane VCN 1416 (e.g. the control plane VCN 1316 of FIG. 13) via an LPG 1410 contained in the control plane VCN 1416. The control plane VCN 1416 can be contained in a service tenancy 1419 (e.g. the service tenancy 1319 of FIG. 13), and the data plane VCN 1418 (e.g. the data plane VCN 1318 of FIG. 13) can be contained in a customer tenancy 1421 that may be owned or operated by users, or customers, of the system.

The control plane VCN 1416 can include a control plane DMZ tier 1420 (e.g. the control plane DMZ tier 1320 of FIG. 13) that can include LB subnet(s) 1422 (e.g. LB subnet(s) 1322 of FIG. 13), a control plane app tier 1424 (e.g. the control plane app tier 1324 of FIG. 13) that can include app subnet(s) 1426 (e.g. app subnet(s) 1326 of FIG. 13), a control plane data tier 1428 (e.g. the control plane data tier 1328 of FIG. 13) that can include database (DB) subnet(s) 1430 (e.g. similar to DB subnet(s) 1330 of FIG. 13). The LB subnet(s) 1422 contained in the control plane DMZ tier 1420 can be communicatively coupled to the app subnet(s) 1426 contained in the control plane app tier 1424 and an Internet gateway 1434 (e.g. the Internet gateway 1334 of FIG. 13) that can be contained in the control plane VCN 1416, and the app subnet(s) 1426 can be communicatively coupled to the DB subnet(s) 1430 contained in the control plane data tier 1428 and a service gateway 1436 (e.g. the service gateway of FIG. 13) and a network address translation (NAT) gateway 1438 (e.g. the NAT gateway 1338 of FIG. 13). The control plane VCN 1416 can include the service gateway 1436 and the NAT gateway 1438.

The control plane VCN 1416 can include a data plane mirror app tier 1440 (e.g. the data plane mirror app tier 1340 of FIG. 13) that can include app subnet(s) 1426. The app subnet(s) 1426 contained in the data plane mirror app tier 1440 can include a virtual network interface controller (VNIC) 1442 (e.g. the VNIC of 1342) that can execute a compute instance 1444 (e.g. similar to the compute instance 1344 of FIG. 13). The compute instance 1444 can facilitate communication between the app subnet(s) 1426 of the data plane mirror app tier 1440 and the app subnet(s) 1426 that can be contained in a data plane app tier 1446 (e.g. the data plane app tier 1346 of FIG. 13) via the VNIC 1442 contained in the data plane mirror app tier 1440 and the VNIC 1442 contained in the data plane app tier 1446.

The Internet gateway 1434 contained in the control plane VCN 1416 can be communicatively coupled to a metadata management service 1452 (e.g. the metadata management service 1352 of FIG. 13) that can be communicatively coupled to public Internet 1454 (e.g. public Internet 1354 of FIG. 13). Public Internet 1454 can be communicatively coupled to the NAT gateway 1438 contained in the control plane VCN 1416. The service gateway 1436 contained in the control plane VCN 1416 can be communicatively couple to cloud services 1456 (e.g. cloud services 1356 of FIG. 13).

In some examples, the data plane VCN 1418 can be contained in the customer tenancy 1421. In this case, the IaaS provider may provide the control plane VCN 1416 for each customer, and the IaaS provider may, for each customer, set up a unique compute instance 1444 that is contained in the service tenancy 1419. Each compute instance 1444 may allow communication between the control plane VCN 1416, contained in the service tenancy 1419, and the data plane VCN 1418 that is contained in the customer tenancy 1421. The compute instance 1444 may allow resources, that are provisioned in the control plane VCN 1416 that is contained in the service tenancy 1419, to be deployed or otherwise used in the data plane VCN 1418 that is contained in the customer tenancy 1421.

In other examples, the customer of the IaaS provider may have databases that live in the customer tenancy 1421. In this example, the control plane VCN 1416 can include the data plane mirror app tier 1440 that can include app subnet(s) 1426. The data plane mirror app tier 1440 can reside in the data plane VCN 1418, but the data plane mirror app tier 1440 may not live in the data plane VCN 1418. That is, the data plane mirror app tier 1440 may have access to the customer tenancy 1421, but the data plane mirror app tier 1440 may not exist in the data plane VCN 1418 or be owned or operated by the customer of the IaaS provider. The data plane mirror app tier 1440 may be configured to make calls to the data plane VCN 1418 but may not be configured to make calls to any entity contained in the control plane VCN 1416. The customer may desire to deploy or otherwise use resources in the data plane VCN 1418 that are provisioned in the control plane VCN 1416, and the data plane mirror app tier 1440 can facilitate the desired deployment, or other usage of resources, of the customer.

In some embodiments, the customer of the IaaS provider can apply filters to the data plane VCN 1418. In this embodiment, the customer can determine what the data plane VCN 1418 can access, and the customer may restrict access to public Internet 1454 from the data plane VCN 1418. The IaaS provider may not be able to apply filters or otherwise control access of the data plane VCN 1418 to any outside networks or databases. Applying filters and controls by the customer onto the data plane VCN 1418, contained in the customer tenancy 1421, can help isolate the data plane VCN 1418 from other customers and from public Internet 1454.

In some embodiments, cloud services 1456 can be called by the service gateway 1436 to access services that may not exist on public Internet 1454, on the control plane VCN 1416, or on the data plane VCN 1418. The connection between cloud services 1456 and the control plane VCN 1416 or the data plane VCN 1418 may not be live or continuous. Cloud services 1456 may exist on a different network owned or operated by the IaaS provider. Cloud services 1456 may be configured to receive calls from the service gateway 1436 and may be configured to not receive calls from public Internet 1454. Some cloud services 1456 may be isolated from other cloud services 1456, and the control plane VCN 1416 may be isolated from cloud services 1456 that may not be in the same region as the control plane VCN 1416. For example, the control plane VCN 1416 may be located in "Region 1," and cloud service "Deployment 13," may be located in Region 1 and in "Region 2." If a call to Deployment 13 is made by the service gateway 1436 contained in the control plane VCN 1416 located in Region 1, the call may be transmitted to Deployment 13 in Region 1. In this example, the control plane VCN 1416, or Deployment 13 in Region 1, may not be communicatively coupled to, or otherwise in communication with, Deployment 13 in Region 2.

Figure 15:
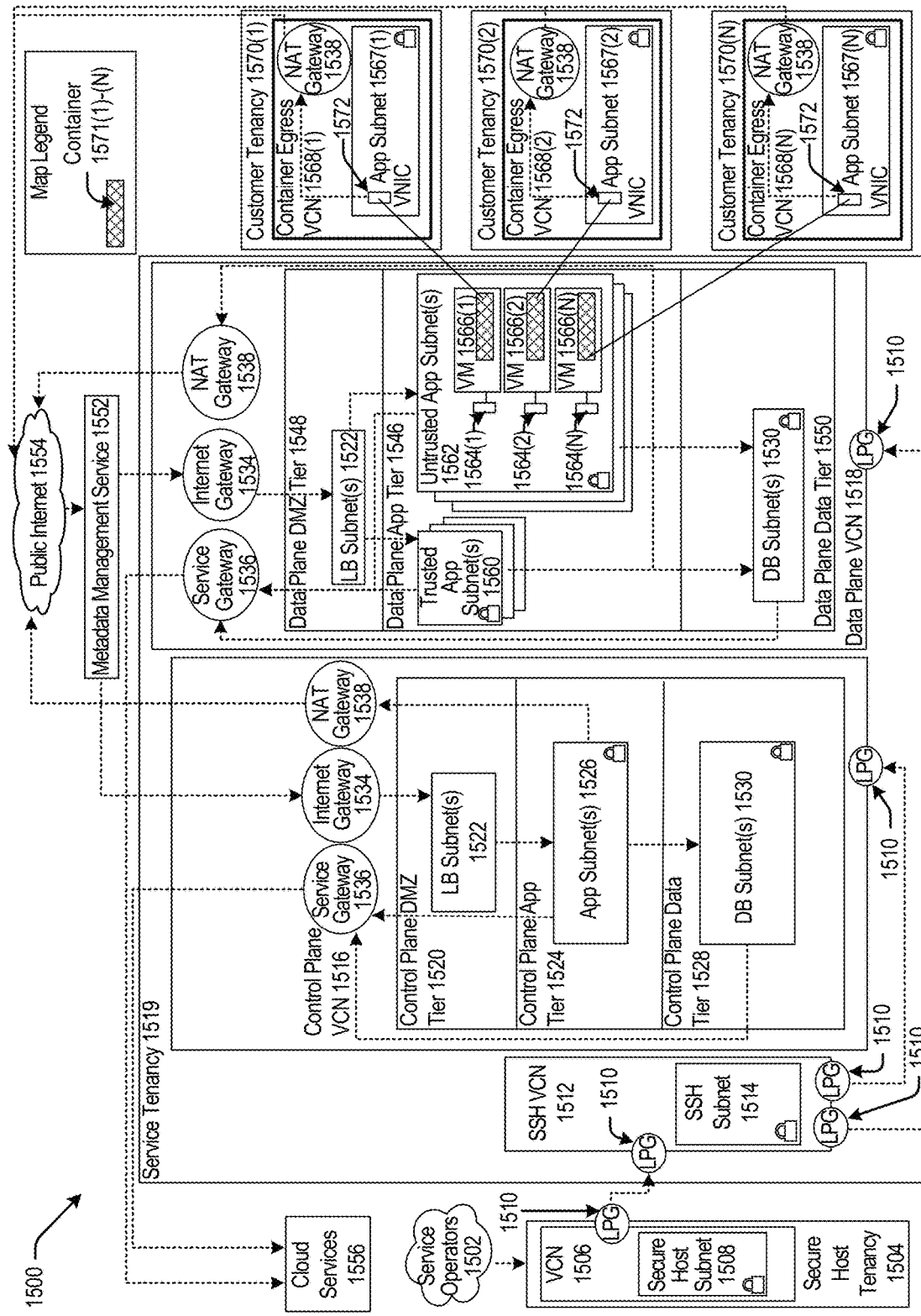
FIG. 15 is a block diagram illustrating another pattern for implementing a cloud infrastructure as a service system, according to at least one embodiment.

FIG. 15 is a block diagram 1500 illustrating another example pattern of an IaaS architecture, according to at least one embodiment. Service operators 1502 (e.g. service operators 1302 of FIG. 13) can be communicatively coupled to a secure host tenancy 1504 (e.g. the secure host tenancy 1304 of FIG. 13) that can include a virtual cloud network (VCN) 1506 (e.g. the VCN 1306 of FIG. 13) and a secure host subnet 1508 (e.g. the secure host subnet 1308 of FIG. 13). The VCN 1506 can include an LPG 1510 (e.g. the LPG 1310 of FIG. 13) that can be communicatively coupled to an SSH VCN 1512 (e.g. the SSH VCN 1312 of FIG. 13) via an LPG 1510 contained in the SSH VCN 1512. The SSH VCN 1512 can include an SSH subnet 1514 (e.g. the SSH subnet 1314 of FIG. 13), and the SSH VCN 1512 can be communicatively coupled to a control plane VCN 1516 (e.g. the control plane VCN 1316 of FIG. 13) via an LPG 1510 contained in the control plane VCN 1516 and to a data plane VCN 1518 (e.g. the data plane 1318 of FIG. 13) via an LPG 1510 contained in the data plane VCN 1518. The control plane VCN 1516 and the data plane VCN 1518 can be contained in a service tenancy 1519 (e.g. the service tenancy 1319 of FIG. 13).

The control plane VCN 1516 can include a control plane DMZ tier 1520 (e.g. the control plane DMZ tier 1320 of FIG. 13) that can include load balancer (LB) subnet(s) 1522 (e.g. LB subnet(s) 1322 of FIG. 13), a control plane app tier 1524 (e.g. the control plane app tier 1324 of FIG. 13) that can include app subnet(s) 1526 (e.g. similar to app subnet(s) 1326 of FIG. 13), a control plane data tier 1528 (e.g. the control plane data tier 1328 of FIG. 13) that can include DB subnet(s) 1530. The LB subnet(s) 1522 contained in the control plane DMZ tier 1520 can be communicatively coupled to the app subnet(s) 1526 contained in the control plane app tier 1524 and to an Internet gateway 1534 (e.g. the Internet gateway 1334 of FIG. 13) that can be contained in the control plane VCN 1516, and the app subnet(s) 1526 can be communicatively coupled to the DB subnet(s) 1530 contained in the control plane data tier 1528 and to a service gateway 1536 (e.g. the service gateway of FIG. 13) and a network address translation (NAT) gateway 1538 (e.g. the NAT gateway 1338 of FIG. 13). The control plane VCN 1516 can include the service gateway 1536 and the NAT gateway 1538.

The data plane VCN 1518 can include a data plane app tier 1546 (e.g. the data plane app tier 1346 of FIG. 13), a data plane DMZ tier 1548 (e.g. the data plane DMZ tier 1348 of FIG. 13), and a data plane data tier 1550 (e.g. the data plane data tier 1350 of FIG. 13). The data plane DMZ tier 1548 can include LB subnet(s) 1522 that can be communicatively coupled to trusted app subnet(s) 1560 and untrusted app subnet(s) 1562 of the data plane app tier 1546 and the Internet gateway 1534 contained in the data plane VCN 1518. The trusted app subnet(s) 1560 can be communicatively coupled to the service gateway 1536 contained in the data plane VCN 1518, the NAT gateway 1538 contained in the data plane VCN 1518, and DB subnet(s) 1530 contained in the data plane data tier 1550. The untrusted app subnet(s) 1562 can be communicatively coupled to the service gateway 1536 contained in the data plane VCN 1518 and DB subnet(s) 1530 contained in the data plane data tier 1550. The data plane data tier 1550 can include DB subnet(s) 1530 that can be communicatively coupled to the service gateway 1536 contained in the data plane VCN 1518.

The untrusted app subnet(s) 1562 can include one or more primary VNICs 1564(1)-(N) that can be communicatively coupled to tenant virtual machines (VMs) 1566(1)-(N). Each tenant VM 1566(1)-(N) can be communicatively coupled to a respective app subnet 1567(1)-(N) that can be contained in respective container egress VCNs 1568(1)-(N) that can be contained in respective customer tenancies 1570(1)-(N). Respective secondary VNICs 1572(1)-(N) can facilitate communication between the untrusted app subnet(s) 1562 contained in the data plane VCN 1518 and the app subnet contained in the container egress VCNs 1568(1)-(N). Each container egress VCNs 1568(1)-(N) can include a NAT gateway 1538 that can be communicatively coupled to public Internet 1554 (e.g. public Internet 1354 of FIG. 13).

The Internet gateway 1534 contained in the control plane VCN 1516 and contained in the data plane VCN 1518 can be communicatively coupled to a metadata management service 1552 (e.g. the metadata management system 1352 of FIG. 13) that can be communicatively coupled to public Internet 1554. Public Internet 1554 can be communicatively coupled to the NAT gateway 1538 contained in the control plane VCN 1516 and contained in the data plane VCN 1518. The service gateway 1536 contained in the control plane VCN 1516 and contained in the data plane VCN 1518 can be communicatively couple to cloud services 1556.

In some embodiments, the data plane VCN 1518 can be integrated with customer tenancies 1570. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1546. Code to run the function may be executed in the VMs 1566(1)-(N), and the code may not be configured to run anywhere else on the data plane VCN 1518. Each VM 1566(1)-(N) may be connected to one customer tenancy 1570. Respective containers 1571(1)-(N) contained in the VMs 1566(1)-(N) may be configured to run the code. In this case, there can be a dual isolation (e.g., the containers 1571(1)-(N) running code, where the containers 1571(1)-(N) may be contained in at least the VM 1566(1)-(N) that are contained in the untrusted app subnet(s) 1562), which may help prevent incorrect or otherwise undesirable code from damaging the network of the IaaS provider or from damaging a network of a different customer. The containers 1571(1)-(N) may be communicatively coupled to the customer tenancy 1570 and may be configured to transmit or receive data from the customer tenancy 1570. The containers 1571(1)-(N) may not be configured to transmit or receive data from any other entity in the data plane VCN 1518. Upon completion of running the code, the IaaS provider may kill or otherwise dispose of the containers 1571(1)-(N).

In some embodiments, the trusted app subnet(s) 1560 may run code that may be owned or operated by the IaaS provider. In this embodiment, the trusted app subnet(s) 1560 may be communicatively coupled to the DB subnet(s) 1530 and be configured to execute CRUD operations in the DB subnet(s) 1530. The untrusted app subnet(s) 1562 may be communicatively coupled to the DB subnet(s) 1530, but in this embodiment, the untrusted app subnet(s) may be configured to execute read operations in the DB subnet(s) 1530. The containers 1571(1)-(N) that can be contained in the VM 1566(1)-(N) of each customer and that may run code from the customer may not be communicatively coupled with the DB subnet(s) 1530.

In other embodiments, the control plane VCN 1516 and the data plane VCN 1518 may not be directly communicatively coupled. In this embodiment, there may be no direct communication between the control plane VCN 1516 and the data plane VCN 1518. However, communication can occur indirectly through at least one method. An LPG 1510 may be established by the IaaS provider that can facilitate communication between the control plane VCN 1516 and the data plane VCN 1518. In another example, the control plane VCN 1516 or the data plane VCN 1518 can make a call to cloud services 1556 via the service gateway 1536. For example, a call to cloud services 1556 from the control plane VCN 1516 can include a request for a service that can communicate with the data plane VCN 1518.

Figure 16:
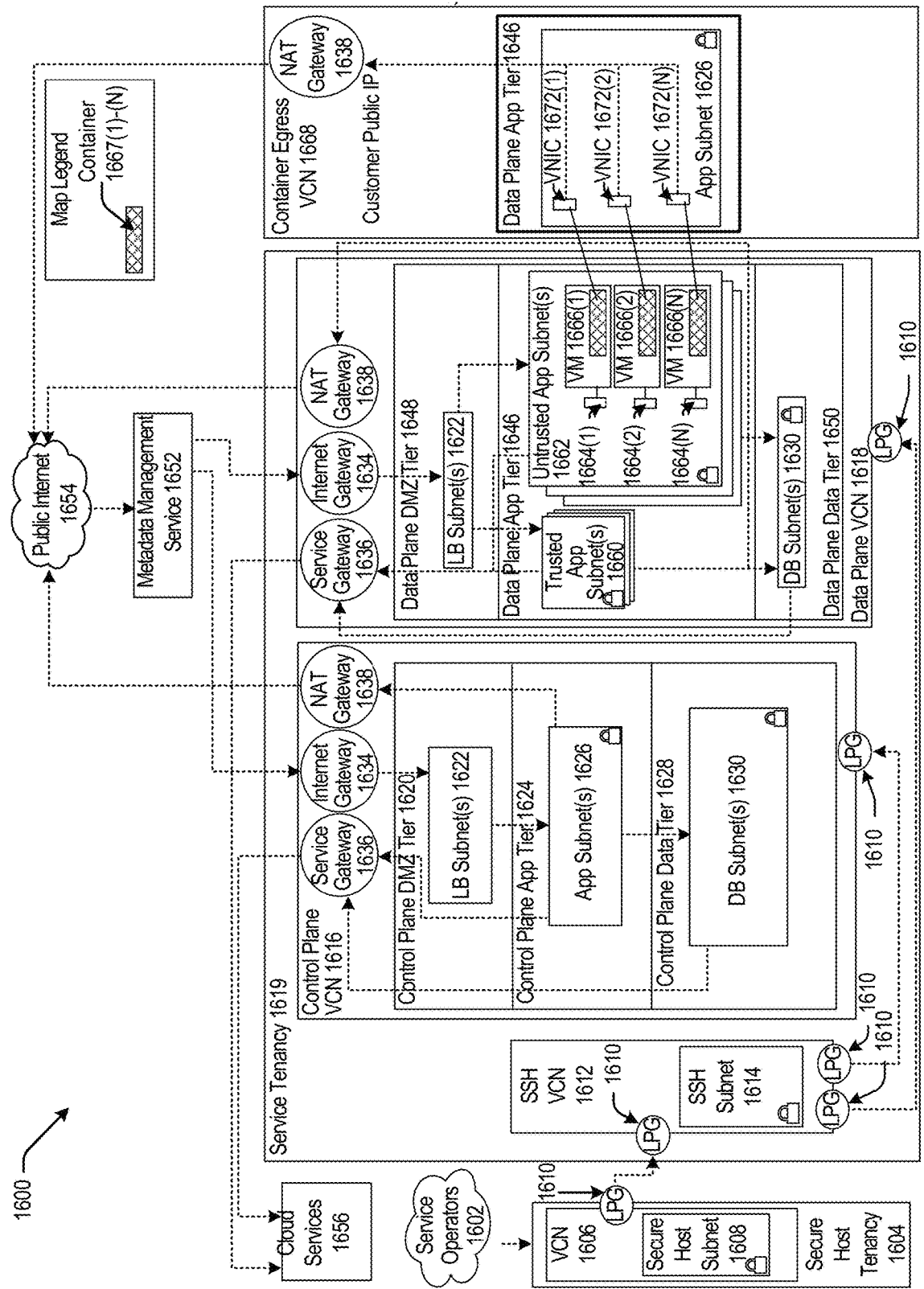
FIG. 16 is a block diagram illustrating another pattern for implementing a cloud infrastructure as a service system, according to at least one embodiment.

FIG. 16 is a block diagram 1600 illustrating another example pattern of an IaaS architecture, according to at least one embodiment. Service operators 1602 (e.g. service operators 1302 of FIG. 13) can be communicatively coupled to a secure host tenancy 1604 (e.g. the secure host tenancy 1304 of FIG. 13) that can include a virtual cloud network (VCN) 1606 (e.g. the VCN 1306 of FIG. 13) and a secure host subnet 1608 (e.g. the secure host subnet 1308 of FIG. 13). The VCN 1606 can include an LPG 1610 (e.g. the LPG 1310 of FIG. 13) that can be communicatively coupled to an SSH VCN 1612 (e.g. the SSH VCN 1312 of FIG. 13) via an LPG 1610 contained in the SSH VCN 1612. The SSH VCN 1612 can include an SSH subnet 1614 (e.g. the SSH subnet 1314 of FIG. 13), and the SSH VCN 1612 can be communicatively coupled to a control plane VCN 1616 (e.g. the control plane VCN 1316 of FIG. 13) via an LPG 1610 contained in the control plane VCN 1616 and to a data plane VCN 1618 (e.g. the data plane 1318 of FIG. 13) via an LPG 1610 contained in the data plane VCN 1618. The control plane VCN 1616 and the data plane VCN 1618 can be contained in a service tenancy 1619 (e.g. the service tenancy 1319 of FIG. 13).

The control plane VCN 1616 can include a control plane DMZ tier 1620 (e.g. the control plane DMZ tier 1320 of FIG. 13) that can include LB subnet(s) 1622 (e.g. LB subnet(s) 1322 of FIG. 13), a control plane app tier 1624 (e.g. the control plane app tier 1324 of FIG. 13) that can include app subnet(s) 1626 (e.g. app subnet(s) 1326 of FIG. 13), a control plane data tier 1628 (e.g. the control plane data tier 1328 of FIG. 13) that can include DB subnet(s) 1630 (e.g.

DB subnet(s) 1530 of FIG. 15). The LB subnet(s) 1622 contained in the control plane DMZ tier 1620 can be communicatively coupled to the app subnet(s) 1626 contained in the control plane app tier 1624 and to an Internet gateway 1634 (e.g. the Internet gateway 1334 of FIG. 13) that can be contained in the control plane VCN 1616, and the app subnet(s) 1626 can be communicatively coupled to the DB subnet(s) 1630 contained in the control plane data tier 1628 and to a service gateway 1636 (e.g. the service gateway of FIG. 13) and a network address translation (NAT) gateway 1638 (e.g. the NAT gateway 1338 of FIG. 13). The control plane VCN 1616 can include the service gateway 1636 and the NAT gateway 1638.

The data plane VCN 1618 can include a data plane app tier 1646 (e.g. the data plane app tier 1346 of FIG. 13), a data plane DMZ tier 1648 (e.g. the data plane DMZ tier 1348 of FIG. 13), and a data plane data tier 1650 (e.g. the data plane data tier 1350 of FIG. 13). The data plane DMZ tier 1648 can include LB subnet(s) 1622 that can be communicatively coupled to trusted app subnet(s) 1660 (e.g. trusted app subnet(s) 1560 of FIG. 15) and untrusted app subnet(s) 1662 (e.g. untrusted app subnet(s) 1562 of FIG. 15) of the data plane app tier 1646 and the Internet gateway 1634 contained in the data plane VCN 1618. The trusted app subnet(s) 1660 can be communicatively coupled to the service gateway 1636 contained in the data plane VCN 1618, the NAT gateway 1638 contained in the data plane VCN 1618, and DB subnet(s) 1630 contained in the data plane data tier 1650. The untrusted app subnet(s) 1662 can be communicatively coupled to the service gateway 1636 contained in the data plane VCN 1618 and DB subnet(s) 1630 contained in the data plane data tier 1650. The data plane data tier 1650 can include DB subnet(s) 1630 that can be communicatively coupled to the service gateway 1636 contained in the data plane VCN 1618.

The untrusted app subnet(s) 1662 can include primary VNICs 1664(1)-(N) that can be communicatively coupled to tenant virtual machines (VMs) 1666(1)-(N) residing within the untrusted app subnet(s) 1662. Each tenant VM 1666(1)-(N) can run code in a respective container 1667(1)-(N), and be communicatively coupled to an app subnet 1626 that can be contained in a data plane app tier 1646 that can be contained in a container egress VCN 1668. Respective secondary VNICs 1672(1)-(N) can facilitate communication between the untrusted app subnet(s) 1662 contained in the data plane VCN 1618 and the app subnet contained in the container egress VCN 1668. The container egress VCN can include a NAT gateway 1638 that can be communicatively coupled to public Internet 1654 (e.g. public Internet 1354 of FIG. 13).

The Internet gateway 1634 contained in the control plane VCN 1616 and contained in the data plane VCN 1618 can be communicatively coupled to a metadata management service 1652 (e.g. the metadata management system 1352 of FIG. 13) that can be communicatively coupled to public Internet 1654. Public Internet 1654 can be communicatively coupled to the NAT gateway 1638 contained in the control plane VCN 1616 and contained in the data plane VCN 1618. The service gateway 1636 contained in the control plane VCN 1616 and contained in the data plane VCN 1618 can be communicatively couple to cloud services 1656.

In some examples, the pattern illustrated by the architecture of block diagram 1600 of FIG. 16 may be considered an exception to the pattern illustrated by the architecture of block diagram 1500 of FIG. 15 and may be desirable for a customer of the IaaS provider if the IaaS provider cannot directly communicate with the customer (e.g., a disconnected region). The respective containers 1667(1)-(N) that are contained in the VMs 1666(1)-(N) for each customer can be accessed in real-time by the customer. The containers 1667(1)-(N) may be configured to make calls to respective secondary VNICs 1672(1)-(N) contained in app subnet(s) 1626 of the data plane app tier 1646 that can be contained in the container egress VCN 1668. The secondary VNICs 1672(1)-(N) can transmit the calls to the NAT gateway 1638 that may transmit the calls to public Internet 1654. In this example, the containers 1667(1)-(N) that can be accessed in real-time by the customer can be isolated from the control plane VCN 1616 and can be isolated from other entities contained in the data plane VCN 1618. The containers 1667(1)-(N) may also be isolated from resources from other customers.

In other examples, the customer can use the containers 1667(1)-(N) to call cloud services 1656. In this example, the customer may run code in the containers 1667(1)-(N) that requests a service from cloud services 1656. The containers 1667(1)-(N) can transmit this request to the secondary VNICs 1672(1)-(N) that can transmit the request to the NAT gateway that can transmit the request to public Internet 1654. Public Internet 1654 can transmit the request to LB subnet(s) 1622 contained in the control plane VCN 1616 via the Internet gateway 1634. In response to determining the request is valid, the LB subnet(s) can transmit the request to app subnet(s) 1626 that can transmit the request to cloud services 1656 via the service gateway 1636.

It should be appreciated that IaaS architectures 1300, 1400, 1500, 1600 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 17:
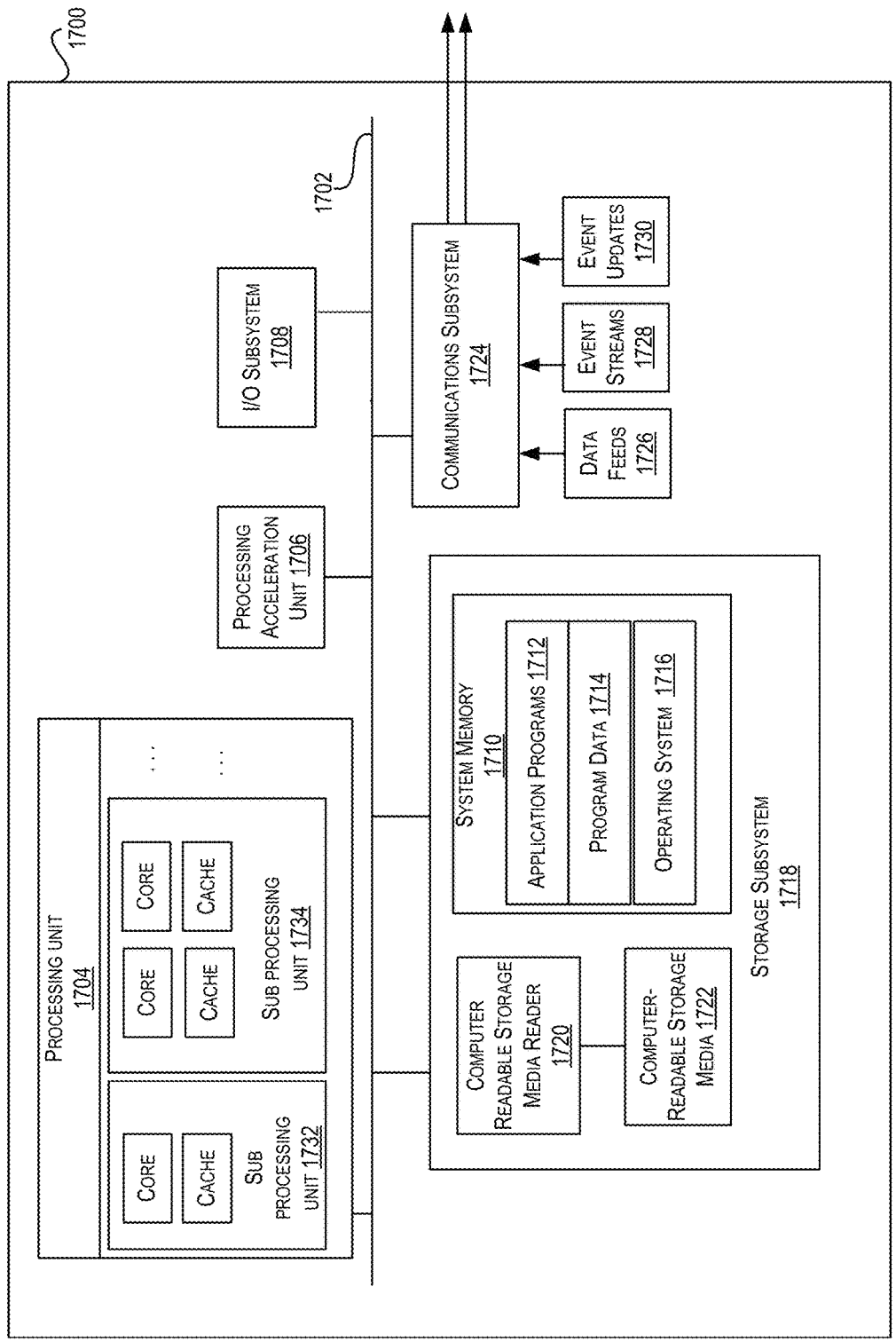
FIG. 17 is a block diagram illustrating an example computer system, according to at least one embodiment.

FIG. 17 illustrates an example computer system 1700, in which various embodiments may be implemented. The system 1700 may be used to implement any of the computer systems described above. As shown in the figure, computer system 1700 includes a processing unit 1704 that communicates with a number of peripheral subsystems via a bus subsystem 1702. These peripheral subsystems may include a processing acceleration unit 1706, an I/O subsystem 1708, a storage subsystem 1718 and a communications subsystem 1724. Storage subsystem 1718 includes tangible computer-readable storage media 1722 and a system memory 1710.

Bus subsystem 1702 provides a mechanism for letting the various components and subsystems of computer system 1700 communicate with each other as intended. Although bus subsystem 1702 is shown schematically as a single bus, alternative embodiments of the bus subsystem may utilize multiple buses. Bus subsystem 1702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1704, which can be implemented as one or more integrated circuits (e.g., a conventional microprocessor or microcontroller), controls the operation of computer system 1700. One or more processors may be included in processing unit 1704. These processors may include single core or multicore processors. In certain embodiments, processing unit 1704 may be implemented as one or more independent processing units 1732 and/or 1734 with single or multicore processors included in each processing unit. In other embodiments, processing unit 1704 may also be implemented as a quad-core processing unit formed by integrating two dual-core processors into a single chip.

In various embodiments, processing unit 1704 can execute a variety of programs in response to program code and can maintain multiple concurrently executing programs or processes. At any given time, some or all of the program code to be executed can be resident in processor(s) 1704 and/or in storage subsystem 1718. Through suitable programming, processor(s) 1704 can provide various functionalities described above. Computer system 1700 may additionally include a processing acceleration unit 1706, which can include a digital signal processor (DSP), a special-purpose processor, and/or the like.

I/O subsystem 1708 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1700 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1700 may comprise a storage subsystem 1718 that comprises software elements, shown as being currently located within a system memory 1710. System memory 1710 may store program instructions that are loadable and executable on processing unit 1704, as well as data generated during the execution of these programs.

Depending on the configuration and type of computer system 1700, system memory 1710 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1704. In some implementations, system memory 1710 may include multiple different types of memory, such as static random access memory (SRAM) or dynamic random access memory (DRAM). In some implementations, a basic input/output system (BIOS), containing the basic routines that help to transfer information between elements within computer system 1700, such as during start-up, may typically be stored in the ROM. By way of example, and not limitation, system memory 1710 also illustrates application programs 1712, which may include client applications, Web browsers, mid-tier applications, relational database management systems (RDBMS), etc., program data 1714, and an operating system 1716. By way of example, operating system 1716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 17 OS, and Palm® OS operating systems.

Storage subsystem 1718 may also provide a tangible computer-readable storage medium for storing the basic programming and data constructs that provide the functionality of some embodiments. Software (programs, code modules, instructions) that when executed by a processor provide the functionality described above may be stored in storage subsystem 1718. These software modules or instructions may be executed by processing unit 1704. Storage subsystem 1718 may also provide a repository for storing data used in accordance with the present disclosure.

Storage subsystem 1700 may also include a computer-readable storage media reader 1720 that can further be connected to computer-readable storage media 1722. Together and, optionally, in combination with system memory 1710, computer-readable storage media 1722 may comprehensively represent remote, local, fixed, and/or removable storage devices plus storage media for temporarily and/or more permanently containing, storing, transmitting, and retrieving computer-readable information.

Computer-readable storage media 1722 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1700.

By way of example, computer-readable storage media 1722 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1722 may include, but is not limited to, Zip® drives, flash memory cards, universal serial bus (USB) flash drives, secure digital (SD) cards, DVD disks, digital video tape, and the like. Computer-readable storage media 1722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1700.

Communications subsystem 1724 provides an interface to other computer systems and networks. Communications subsystem 1724 serves as an interface for receiving data from and transmitting data to other systems from computer system 1700. For example, communications subsystem 1724 may enable computer system 1700 to connect to one or more devices via the Internet. In some embodiments communications subsystem 1724 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1724 can provide wired network connectivity (e.g., Ethernet) in addition to or instead of a wireless interface.

In some embodiments, communications subsystem 1724 may also receive input communication in the form of structured and/or unstructured data feeds 1726, event streams 1728, event updates 1730, and the like on behalf of one or more users who may use computer system 1700.

By way of example, communications subsystem 1724 may be configured to receive data feeds 1726 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1724 may also be configured to receive data in the form of continuous data streams, which may include event streams 1728 of real-time events and/or event updates 1730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1724 may also be configured to output the structured and/or unstructured data feeds 1726, event streams 1728, event updates 1730, and the like to one or more databases that may be in communication with one or more streaming data source computers coupled to computer system 1700.

Computer system 1700 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1700 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
    transmitting, by an accelerator of a smart network interface card, a packet to a programming data plane of the smart network interface card;
    determining, by a programming data plane, whether the packet is to be forwarded; and
    in accordance with a determination that the packet is not be forwarded:
        modifying, by the programming data plane, the packet to include an instruction that instructs the accelerator to log the packet and to not forward the packet;
        transmitting, by the programming data plane, the modified packet to the accelerator; and
        logging, by the accelerator, data associated with the modified packet to a unified log based at least in part on the instruction.

2. The computer-implemented method of claim 1, wherein determining whether the packet is to be forwarded comprises:
    identifying an authorized flow; and
    determining whether the packet is associated with an authorized flow, wherein the packet is to be forwarded based at least in part on whether the packet is associated with the authorized flow.

3. The computer-implemented method of claim 1, wherein the accelerator manages cache entries of a cache, a cache entry storing flow state of an authorized flow associated with the packet, and wherein determining whether the packet is to be forwarded comprises:
    identifying a policy associated with the cache entry; and
    determining whether the packet conforms to the policy, wherein the packet is to be forwarded based at least in part on whether the packet conforms to the policy.

4. The computer-implemented method of claim 1, wherein determining whether the packet is to be forwarded comprises:
    accessing a security list stored at the programming data plane, the security list comprising a rule; and
    determining whether the packet conforms to the rule, wherein the packet is to be forwarded based at least in part on whether the packet conforms to the rule.

5. The computer-implemented method of claim 1, wherein the accelerator logs metadata associated with the modified packet to the unified log, the accelerator being configured to log metadata from packets processed by at least one of: the accelerator, or the programming data plane.

6. The computer-implemented method of claim 5, wherein the metadata indicates that the packet was not forwarded to another device, the indication based at least in part on the instruction.

7. The computer-implemented method of claim 1, wherein the programming data plane transmits the modified packet to the accelerator via a data bus that is configured to route packets that utilize a particular header format between the accelerator and the programming data plane.

8. A smart network interface card, comprising:
    one or more processors;
    one or more computer-readable media that, when executed by one or more processors, cause the smart network interface card to:

transmit, by an accelerator of the smart network interface card, a packet to a programming data plane of the smart network interface card;

determine, by a programming data plane, whether the packet should be forwarded based at least in part on whether the packet is associated with an authorized flow; and in accordance with a determination that the packet should not be forwarded:

modify, by the programming data plane, the packet to include an instruction that instructs the accelerator to log the packet and to not forward the packet;

transmit, by the programming data plane, the modified packet to the accelerator; and log, by the accelerator, data associated with the modified packet to a unified log based at least in part on the instruction.

9. The smart network interface card of claim 8, wherein determining whether the packet is to be forwarded comprises:

identifying an authorized flow; and determining whether the packet is associated with an authorized flow, wherein the packet is to be forwarded based at least in part on whether the packet is associated with the authorized flow.

10. The smart network interface card of claim 8, wherein the accelerator manages cache entries of a cache, a cache entry storing flow state of an authorized flow associated with the packet, and wherein determining whether the packet is to be forwarded comprises:

identifying a policy associated with the cache entry; and determining whether the packet conforms to the policy, wherein the packet is to be forwarded based at least in part on whether the packet conforms to the policy.

11. The smart network interface card of claim 8, wherein determining whether the packet is to be forwarded comprises:

accessing a security list stored at the programming data plane, the security list comprising a rule; and determining whether the packet conforms to the rule, wherein the packet is to be forwarded based at least in part on whether the packet conforms to the rule.

12. The smart network interface card of claim 8, wherein the accelerator logs metadata associated with the modified packet to the unified log, the accelerator being configured to log metadata from packets processed by at least one of: the accelerator, or the programming data plane.

13. The smart network interface card of claim 12, wherein the metadata indicates that the packet was not forwarded to another device, the indication based at least in part on the instruction.

14. The smart network interface card of claim 8, wherein the programming data plane transmits the modified packet to the accelerator via a data bus that is configured to route packets that utilize a particular header format between the accelerator and the programming data plane.

15. One or more non-transitory computer-readable storage media comprising a set of instructions that, when executed by one or more processors, cause a smart network interface card to:

transmit, by an accelerator of the smart network interface card, a packet to a programming data plane of the smart network interface card;

determine, by a programming data plane, whether the packet should be forwarded based at least in part on whether the packet is associated with an authorized flow; and in accordance with a determination that the packet should not be forwarded:

modify, by the programming data plane, the packet to include an instruction that instructs the accelerator to log the packet and to not forward the packet;

transmit, by the programming data plane, the modified packet to the accelerator; and log, by the accelerator, data associated with the modified packet to a unified log based at least in part on the instruction.

16. The one or more non-transitory computer-readable storage media of claim 15, wherein the accelerator manages cache entries of a cache, a cache entry storing flow state of a particular authorized flow, and wherein the accelerator determines that the packet is not associated with the authorized flow based at least in part on determining that the packet is not associated with a cache entry of the cache.

17. The one or more non-transitory computer-readable storage media of claim 15, wherein determining whether the packet is to be forwarded comprises:

identifying an authorized flow; and determining whether the packet is associated with an authorized flow, wherein the packet is to be forwarded based at least in part on whether the packet is associated with the authorized flow.

18. The one or more non-transitory computer-readable storage media of claim 15, wherein the accelerator manages cache entries of a cache, a cache entry storing flow state of an authorized flow associated with the packet, and wherein determining whether the packet is to be forwarded comprises:

identifying a policy associated with the cache entry; and determining whether the packet conforms to the policy, wherein the packet is to be forwarded based at least in part on whether the packet conforms to the policy.

19. The one or more non-transitory computer-readable storage media of claim 15, wherein determining whether the packet is to be forwarded comprises:

accessing a security list stored at the programming data plane, the security list comprising a rule; and determining whether the packet conforms to the rule, wherein the packet is to be forwarded based at least in part on whether the packet conforms to the rule.

20. The one or more non-transitory computer-readable storage media of claim 19, wherein the metadata indicates that the packet was not forwarded to another device, the indication based at least in part on the instruction.

* * * * *

UNITED STATES PATENT AND TRADEMARK OFFICE
CERTIFICATE OF CORRECTION

PATENT NO. : 12,355,669 B2
APPLICATION NO. : 18/657055
DATED : July 8, 2025
INVENTOR(S) : Singh et al.

It is certified that error appears in the above-identified patent and that said Letters Patent is hereby corrected as shown below:

On the Title Page

Column 2, item (74), under Attorney, Agent, or Firm, Line 2, delete "Stoctkon" and insert -- Stockton --, therefor.

In the Drawings

On sheet 9 of 17, in FIG. 9, under reference numeral 968, Line 2, delete "INTANCE" and insert -- INSTANCE --, therefor.

On sheet 9 of 17, in FIG. 9, under reference numeral 974, Line 2, delete "INTANCE" and insert -- INSTANCE --, therefor.

In the Specification

In Column 28, Line 44, delete "(VXLAN" and insert -- (VXLAN— --, therefor.

In Column 29, Line 30, delete "CSPJ." and insert -- CSPI. --, therefor.

In Column 33, Line 2, delete "general." and insert -- general, --, therefor.

In Column 38, Line 12, delete "CL." and insert -- C1. --, therefor.

In Column 40, Line 10, delete "and or" and insert -- and/or --, therefor.

Signed and Sealed this
Twenty-fifth Day of November, 2025

John A. Squires
*Director of the United States Patent and Trademark Office*